(12) United States Patent
Mori et al.

(10) Patent No.: US 11,346,316 B2
(45) Date of Patent: May 31, 2022

(54) IGNITION TIMING CONTROL DEVICE FOR INTERNAL COMBUSTION ENGINE

(71) Applicant: TOYOTA JIDOSHA KABUSHIKI KAISHA, Toyota (JP)

(72) Inventors: Masahiro Mori, Nisshin (JP); Akinori Kitazume, Nagoya (JP); Kenji Senda, Okazaki (JP); Daisuke Kobayashi, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/940,645

(22) Filed: Jul. 28, 2020

(65) Prior Publication Data

US 2021/0088021 A1    Mar. 25, 2021

(30) Foreign Application Priority Data

Sep. 24, 2019  (JP) .............................. JP2019-173434

(51) Int. Cl.
*F02P 5/152* (2006.01)
*F02P 5/06* (2006.01)
(Continued)

(52) U.S. Cl.
CPC ................. *F02P 5/152* (2013.01); *F02P 5/06* (2013.01); *F02P 5/142* (2013.01); *G06N 3/0454* (2013.01); *G06N 3/088* (2013.01)

(58) Field of Classification Search
CPC ... F02P 5/152; F02P 5/06; F02P 5/142; G06N 3/0454; G06N 3/088
(Continued)

(56) References Cited

U.S. PATENT DOCUMENTS

| 4,633,835 A | 1/1987 | Akasu |
| 4,899,710 A | 2/1990 | Takahashi |

(Continued)

FOREIGN PATENT DOCUMENTS

| EP | 3040544 A1 | 7/2016 |
| EP | 3 521 601 A1 | 8/2019 |

(Continued)

OTHER PUBLICATIONS

Andreas Kirschbaum et al., "Rapid Prototyping of a Co-Processor based Engine Knock Detection System", Rapid System Prototyping, 1998. Proceedings. 1998, Ninth International Workshop on Leuven, Gelgium Jun. 1998, pp. 124-129.

(Continued)

*Primary Examiner* — Mahmoud Gimie
(74) *Attorney, Agent, or Firm* — Oblon, McClelland, Maier & Neustadt, L.L.P.

(57) ABSTRACT

An ignition timing control device includes a storage device that stores a normal signal generation model configured to output, upon receiving an output value of a knocking sensor, a noise-removed output value therefrom which an unlearned noise component value has been removed, and a first learned neural network pre-learned to output, upon receiving one of the output value of the knocking sensor and the noise-removed output value, an estimated value of a knocking intensity representative value, and a processor that acquires the estimated value by inputting the output value of the knocking sensor to the normal signal generation model and inputting the noise-removed output value to the first learned neural network, and executes retarding control of an ignition timing based on the acquired estimated value.

15 Claims, 40 Drawing Sheets

(51) Int. Cl.
*F02P 5/14* (2006.01)
*G06N 3/04* (2006.01)
*G06N 3/08* (2006.01)

(58) Field of Classification Search
USPC .................................................... 123/406.16
See application file for complete search history.

(56) References Cited

U.S. PATENT DOCUMENTS

| | | | |
|---|---|---|---|
| 6,012,425 A | 1/2000 | Unland et al. | |
| 11,092,130 B2 | 8/2021 | Senda et al. | |
| 2002/0195085 A1 | 12/2002 | Katagami | |
| 2005/0126537 A1 | 6/2005 | Daniels et al. | |
| 2006/0185422 A1 | 8/2006 | Iwade et al. | |
| 2017/0076719 A1 | 3/2017 | Lee et al. | |
| 2019/0264624 A1* | 8/2019 | Hagari | G01L 1/183 |
| 2020/0256753 A1* | 8/2020 | Mohri | G01M 15/08 |
| 2021/0088019 A1* | 3/2021 | Senda | F02D 35/027 |
| 2021/0088020 A1* | 3/2021 | Mori | F02P 5/152 |

FOREIGN PATENT DOCUMENTS

| | | |
|---|---|---|
| JP | 59-193333 A | 11/1984 |
| JP | 10-252536 A | 9/1998 |
| JP | 2005-120896 A | 5/2005 |
| JP | 2006-226967 A | 8/2006 |
| JP | 2008-025510 A | 2/2008 |
| JP | 2015-75019 A | 4/2015 |
| JP | 2016-217338 A | 12/2016 |
| JP | 2017-54122 A | 3/2017 |
| JP | 2018-53748 A | 4/2018 |
| JP | 2018-53844 A | 4/2018 |

OTHER PUBLICATIONS

U.S. Office Action issued in U.S. Appl. No. 16/752,723, dated Aug. 17, 2021.
Notice of Allowance issued in U.S. Appl. No. 16/752,723 dated Dec. 8, 2021.
Corrected Notice of Allowability issued in U.S. Appl. No. 16/752,723 dated Feb. 9, 2022.
Corrected Notice of Allowability issued in U.S. Appl. No. 16/752,723 dated Mar. 22, 2022.

* cited by examiner

FIG. 9

| No. | $x_1$ | $x_2$ | · · · · · · · · · · · | $x_{n-1}$ | $x_n$ | $y_t$ |
|---|---|---|---|---|---|---|
| 1 | $x_{11}$ | $x_{21}$ | · · · · · · · · · · · | $x_{n-11}$ | $x_{n1}$ | $y_{t1}$ |
| 2 | $x_{12}$ | $x_{22}$ | · · · · · · · · · · · | $x_{n-12}$ | $x_{n2}$ | $y_{t2}$ |
| ⋮ | ⋮ | ⋮ | ⋮ | ⋮ | ⋮ | ⋮ |
| m−1 | $x_{1m-1}$ | $x_{2m-1}$ | · · · · · · · · · · · | $x_{n-1m-1}$ | $x_{nm-1}$ | $y_{tm-1}$ |
| m | $x_{1m}$ | $x_{2m}$ | · · · · · · · · · · · | $x_{n-1m}$ | $x_{nm}$ | $y_{tm}$ |

| | INPUT PARAMETERS |
|---|---|
| $xx_1$ | ENGINE SPEED $N_E$ |
| $xx_2$ | ENGINE LOAD L |
| $xx_3$ | EGR RATE ER |
| $xx_4$ | RETARDED AMOUNT $\alpha$ OR ADVANCED AMOUNT $\beta$ |
| $xx_5$ | ESTIMATED VALUE $y_{ee}$ |

FIG. 31

| CYCLE NUMBER | $N_E$ | L | ER | $y_e$ | α or β | $\Delta y_e$ |
|---|---|---|---|---|---|---|
| 1 | $N_{E1}$ | $L_1$ | $ER_1$ | $y_{e1}$ | | |
| 2 | $N_{E2}$ | $L_2$ | $ER_2$ | $y_{e2}$ | | |
| ⋮ | ⋮ | ⋮ | ⋮ | ⋮ | ⋮ | ⋮ |
| $k_{n-1}$ | $N_{En-1}$ | $L_{n-1}$ | $ER_{n-1}$ | $y_{en-1}$ | | |
| $k_n$ | $N_{En}$ | $L_n$ | $ER_n$ | $y_{en}$ | | |
| $k_{n+1}$ | $N_{En+1}$ | $L_{n+1}$ | $ER_{n+1}$ | $y_{en+1}$ | α | $\Delta y_{en+1} = y_{en} - y_{en+1}$ |
| $k_{n+2}$ | $N_{En+2}$ | $L_{n+2}$ | $ER_{n+2}$ | $y_{en+2}$ | α | $\Delta y_{en+2} = y_{en+1} - y_{en+2}$ |
| $k_{n+3}$ | $N_{En+3}$ | $L_{n+3}$ | $ER_{n+3}$ | $y_{en+3}$ | β2 | |
| $k_{n+4}$ | $N_{En+4}$ | $L_{n+4}$ | $ER_{n+4}$ | $y_{en+4}$ | β2 | |
| ⋮ | ⋮ | ⋮ | ⋮ | ⋮ | ⋮ | ⋮ |

FIG. 32

| No. | $xx_1$ | $xx_2$ | $xx_3$ | $xx_4$ | $xx_5$ | $y_t$ |
|---|---|---|---|---|---|---|
| 1 | $xx_{11}$ | $xx_{21}$ | $xx_{31}$ | $xx_{41}$ | $xx_{51}$ | $y_{t1}$ |
| 2 | $xx_{12}$ | $xx_{22}$ | $xx_{32}$ | $xx_{42}$ | $xx_{52}$ | $y_{t2}$ |
| ⋮ | ⋮ | ⋮ | ⋮ | ⋮ | ⋮ | ⋮ |
| m−1 | $xx_{1m-1}$ | $xx_{2m-1}$ | $xx_{3m-1}$ | $xx_{4m-1}$ | $xx_{5m-1}$ | $y_{tm-1}$ |
| m | $xx_{1m}$ | $xx_{2m}$ | $xx_{3m}$ | $xx_{4m}$ | $xx_{5m}$ | $y_{tm}$ |

FIG. 39

| | INPUT VALUE |
|---|---|
| $x_1^t$ | ESTIMATED VALUE $y_e$ AT TIME t |
| $x_2^t$ | RETARDED AMOUNT $\alpha$ OR ADVANCED AMOUNT $\beta$ AT TIME t |

| | OUTPUT VALUE |
|---|---|
| $y^{t+1}$ | PREDICTED VALUE $y_{ee}$ OF ESTIMATED VALUE $y_e$ AT TIME t+1 |

FIG. 40

| CYCLE NUMBER | $x_1^t$ | $x_2^t$ | $y_t$ |
|---|---|---|---|
| 1 | $y_{e1}$ | | $y_{e2}$ |
| 2 | $y_{e2}$ | | $y_{e3}$ |
| ⋮ | ⋮ | ⋮ | ⋮ |
| $k_n$ | $y_{en}$ | $\alpha$ | $y_{en+1}$ |
| $k_{n+1}$ | $y_{en+1}$ | $\alpha$ | $y_{en+2}$ |
| $k_{n+2}$ | $y_{en+2}$ | $\beta 2$ | $y_{en+3}$ |
| $k_{n+3}$ | $y_{en+3}$ | $\beta 2$ | $y_{en+4}$ |
| ⋮ | ⋮ | ⋮ | ⋮ |

FIG. 48A

| | | |
|---|---|---|
| $NN_{31}$ | $NN_{32}$ | $NN_{33}$ |
| $NN_{21}$ | $NN_{22}$ | $NN_{23}$ |
| $NN_{11}$ | $NN_{12}$ | $NN_{13}$ |

L (vertical axis), $N_E$ (horizontal axis)

FIG. 48B

| | | |
|---|---|---|
| $DS_{31}$ | $DS_{32}$ | $DS_{33}$ |
| $DS_{21}$ | $DS_{22}$ | $DS_{23}$ |
| $DS_{11}$ | $DS_{12}$ | $DS_{13}$ |

L (vertical axis), $N_E$ (horizontal axis)

FIG. 48C

| | | |
|---|---|---|
| $M_{31}$ | $M_{32}$ | $M_{33}$ |
| $M_{21}$ | $M_{22}$ | $M_{23}$ |
| $M_{11}$ | $M_{12}$ | $M_{13}$ |

L (vertical axis), $N_E$ (horizontal axis)

FIG. 51

| No. | $x_1$ | $x_2$ | $\cdots\cdots\cdots\cdots\cdots$ | $xx_{n-1}$ | $xx_n$ | $y_t$ |
|---|---|---|---|---|---|---|
| 1 | $x_{11}$ | $x_{21}$ | $\cdots\cdots\cdots\cdots\cdots$ | $xx_{n-11}$ | $xx_{n1}$ | $y_{t1}$ |
| 2 | $x_{12}$ | $x_{22}$ | $\cdots\cdots\cdots\cdots\cdots$ | $xx_{n-12}$ | $xx_{n2}$ | $y_{t2}$ |
| ⋮ | ⋮ | ⋮ | ⋮ | ⋮ | ⋮ | ⋮ |
| m−1 | $x_{1m-1}$ | $x_{2m-1}$ | $\cdots\cdots\cdots\cdots\cdots$ | $xx_{n-1m-1}$ | $xx_{nm-1}$ | $y_{tm-1}$ |
| m | $x_{1m}$ | $x_{2m}$ | $\cdots\cdots\cdots\cdots\cdots$ | $xx_{n-1m}$ | $xx_{nm}$ | $y_{tm}$ |

IGNITION TIMING CONTROL DEVICE FOR INTERNAL COMBUSTION ENGINE

CROSS-REFERENCE TO RELATED APPLICATION

This application claims priority to Japanese Patent Application No. 2019-173434 filed on Sep. 24, 2019, incorporated herein by reference in its entirety.

BACKGROUND

1. Technical Field

The present disclosure relates to an ignition timing control device for an internal combustion engine.

2. Description of Related Art

In an internal combustion engine, when a terminal gas self-ignites after an air-fuel mixture is ignited in a combustion chamber, a pressure wave is generated and knocking occurs. When knocking occurs, the engine body vibrates. In this case, the vibration of the engine body increases as the knocking intensity increases. An internal combustion engine is well known in which a knocking sensor that detects the vibration of the engine body is attached to the engine body, the knocking intensity is detected from intensity of the vibration of the engine body detected by the knocking sensor, and when the knocking intensity exceeds a threshold, it is determined that knocking has occurred and ignition timing is retarded (for example, refer to Japanese Unexamined Patent Application Publication No. 2006-226967). However, the engine body also vibrates due to mechanical operations, such as seating of an intake valve and an exhaust valve, and seating of a needle of a fuel injection valve. Therefore, if the knocking sensor that detects the vibration of the engine body is used, when the vibration intensity of the engine body increases due to such mechanical operations, the knocking intensity is falsely determined as being high even though the actual knocking intensity is lower.

On the other hand, when the knocking occurs, the pressure in the combustion chamber fluctuates more strongly as the knocking intensity increases. Therefore, in a case where a pressure sensor capable of detecting combustion pressure of the air-fuel mixture generated by ignition is used, the knocking intensity can be detected from intensity of fluctuations in an output value of the pressure sensor. In this case, for example, as the knocking intensity increases, a peak value of the output value of the pressure sensor increases. Accordingly, it can be understood that the peak value of the output value of the pressure sensor is one of values representing knocking intensity. Therefore, the knocking intensity can be detected from such a value representing knocking intensity. In this case, the vibration of the engine body caused by the mechanical operation does not affect the output value of the pressure sensor and thus does not affect the value representing knocking intensity, either. Accordingly, when the pressure sensor is used, the knocking intensity can be detected with high accuracy.

However, the pressure sensor is extremely expensive. Additionally, when the pressure sensor is used for a long time, deposits gradually adhere to the pressure sensor, and a combustion form of the air-fuel mixture in the combustion chamber is changed by the adhered deposits. Therefore, it is difficult to use such a pressure sensor for a commercially available vehicle. In the present disclosure, a value representing knocking intensity obtained from an output value of a pressure sensor is estimated from an output value of a knocking sensor using a neural network. That is, upon receiving the output value of the knocking sensor, a weight of the neural network is learned so that the estimated value for the value representing knocking intensity is output. The value representing knocking intensity is estimated from the output value of the knocking sensor using the learned neural network the weight of which has been completely learned.

However, an issue occurs when such a learned neural network is stored in a control device of a commercially available vehicle and the learned neural network stored is used to estimate the value representing knocking intensity from the output value of the knocking sensor. That is, there are tolerances in the components of the engine, and thus dimensions of the components of the engine vary depending on a type of the commercially available vehicle, whereby different engine vibrations occur in each commercially available vehicle. However, in the learned neural network, the weights are not learned for the different engine vibrations that occur for each commercially available vehicle, and thus, when the vibration of the engine for which the weight has not been learned, i.e. unlearned engine vibration occurs, the learned neural network may falsely determine that vibration occurs in the engine body due to the occurrence of the knocking.

If such a false determination is made, the ignition timing may be excessively retarded. That is, when the value representing knocking intensity exceeds the threshold due to the occurrence of the knocking and thus the ignition timing is retarded, the value representing knocking intensity decreases because a combustion pressure decreases as the ignition timing is retarded. As a result, the value representing knocking intensity becomes equal to or smaller than the threshold, and retarding of the ignition timing is ceased. Meanwhile, in a case where the unlearned engine vibration occurs and the value representing knocking intensity exceeds the threshold, the ignition timing is also retarded. However, at this time, when the unlearned engine vibration which is not affected by the ignition timing has occurred, the unlearned engine vibration is not reduced even if the ignition timing is retarded. Therefore, at this time, when the unlearned engine vibration which is not affected by the ignition timing continues to occur even after the ignition timing is retarded, the value representing knocking intensity will continue to exceed the threshold, and the ignition timing will be continuously retarded. As a result, the ignition timing is excessively retarded, thereby causing a problem that the output of the engine is greatly reduced.

According to an aspect of the present disclosure, an ignition timing control device for an internal combustion engine includes a storage unit that stores a pre-learned normal signal generation model configured to output, upon receiving an output value of a knocking sensor that detects vibration, a noise-removed output value from which an unlearned noise component value included in the output value of the knocking sensor has been removed, and a first learned neural network pre-learned to output, upon receiving one of the output value of the knocking sensor and the noise-removed output value of the normal signal generation model, an estimated value for a value representing knocking intensity, originally obtained from an output value of a pressure sensor that detects a combustion pressure of an air-fuel mixture generated by ignition, and a process configured to acquire the estimated value for the value representing knocking intensity output from the first learned neural network by inputting the output value of the knocking sensor, during operation of the internal combustion engine, to the normal signal generation model read out from the storage unit and inputting the noise-removed output value output from the normal signal generation model to the first learned neural network read out from the storage unit, and to execute retarding control of an ignition timing of the internal combustion engine based on the acquired estimated value for the value representing knocking intensity.

In the aspect of the present disclosure, the normal signal generation model may include an auto-encoder.

In the aspect of the present disclosure, the storage unit may store a second learned neural network pre-learned to estimate a predicted value or a predicted decrease amount of the estimated value for the value representing knocking intensity when the ignition timing of the internal combustion engine is retarded. The processor may be configured to execute, in a case where the estimated value for the value representing knocking intensity calculated using the first learned neural network read out from the storage unit exceeds a predetermined threshold during the operation of the internal combustion engine, retarding control of the ignition timing of the internal combustion engine in a next cycle of the internal combustion engine. The processor may be configured to, in the next cycle of the internal combustion engine, execute control of the ignition timing in a further next cycle of the internal combustion engine based on a difference between the predicted value of the estimated value for the value representing knocking intensity calculated using the second learned neural network read out from the storage unit and the estimated value for the value representing knocking intensity calculated using the first learned neural network read out from the storage unit. The processor may be configured to retard, in a case where the difference is smaller than a predetermined set value, when the estimated value for the value representing knocking intensity is larger than the predetermined threshold, the ignition timing in the further next cycle and not to retard, in case where the difference is larger than the predetermined set value, even when the estimated value for the value representing knocking intensity is larger than the predetermined threshold, the ignition timing in the further next cycle.

In the aspect of the present disclosure, the second learned neural network may include a neural network pre-learned to output the predicted value of the estimated value for the value representing knocking intensity when the ignition timing is retarded based on the predicted decrease amount of the estimated value for the value representing knocking intensity when the ignition timing is retarded, which is obtained when an operating state of the internal combustion engine, a retarded amount of the ignition timing of the internal combustion engine, and the estimated value for the value representing knocking intensity in a previous cycle of the internal combustion engine are input to the neural network.

In the aspect of the present disclosure, the operating state of the internal combustion engine may include engine speed, engine load, and exhaust gas recirculation rate.

In the aspect of the present disclosure the second learned neural network may include a recurrent neural network pre-learned to output the predicted value of the estimated value for the value representing knocking intensity in a current cycle when the retarded amount or advanced amount of the ignition timing and the estimated value for the value representing knocking intensity in each of cycles are input. The cycles are from a cycle in which the ignition has performed a predetermined number of times ago to the current cycle.

In the aspect of the present disclosure, the processor may be configured to start, after the ignition timing has been retarded, to advance the ignition timing when the estimated value for the value representing knocking intensity is equal to or smaller than the predetermined threshold. The processor may be configured to adjust an advanced amount of the ignition timing to be smaller in a case where the difference when the ignition timing is retarded is larger than the set value, as compared with a case where the difference is equal to or smaller than the set value.

In the aspect of the present disclosure, the value representing knocking intensity may be a peak value of the output value of the pressure sensor.

In the aspect of the present disclosure, the value representing knocking intensity may be an integral value of the output value of the pressure sensor.

In the aspect of the present disclosure, the output value of the knocking sensor may be an output value within a preset period.

In the aspect of the present disclosure, the output value of the knocking sensor may be an integral value of the output values of the knocking sensor within equally divided sections of a preset period.

In the aspect of the present disclosure, the preset period may be a predetermined crank angle range.

In the aspect of the present disclosure, the preset period may be a fixed time.

In the aspect of the present disclosure, the storage unit may store the normal signal generation model and the first learned neural network for each of a plurality of operating regions into which an operating region of the internal combustion engine is divided.

In the aspect of the present disclosure, the internal combustion engine may include a plurality of knocking sensors that detects the vibration of the body of the internal combustion engine. The first learned neural network may be a neural network pre-learned to output the estimated value for the value representing knocking intensity when receiving the output values of the knocking sensors through the normal signal generation model.

The vibration of the engine for which the weight has not been learned, i.e. the unlearned engine vibration occurs, and thus, the output value of the knocking sensor including the unlearned engine vibration component, i.e. the unlearned noise component, is input to the normal signal generation model. In this case, as in the aspect of the present disclosure, the noise-removed output value obtained by removing the unlearned noise component value from the output value of the knocking sensor is output from the normal signal generation model and the noise-removed output value is input to the learned neural network. Therefore, even when the output value of the knocking sensor includes the unlearned engine vibration, the estimated value for the value representing knocking intensity which is not affected by the unlearned engine vibration is output from the learned neural network. Accordingly, the value representing knocking intensity can be obtained with high accuracy without using the pressure sensor, and thus, it is possible to prevent the ignition timing from being excessively retarded.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a table illustrating a training dataset;

FIG. 31 is a table illustrating a data list;

FIG. 32 is a table illustrating a training dataset;

FIG. 39 is a set of tables respectively illustrating a list of input values and a list of output values;

FIG. 40 is a table illustrating a training dataset;

FIG. 48A is a diagram illustrating operating regions;

FIG. 48B is another diagram illustrating the operating regions;

FIG. 48C is still another diagram illustrating the operating regions;

FIG. 51 is a table illustrating a training dataset.

DETAILED DESCRIPTION OF EMBODIMENTS

Overall Configuration of Internal Combustion Engine

Figure 1:
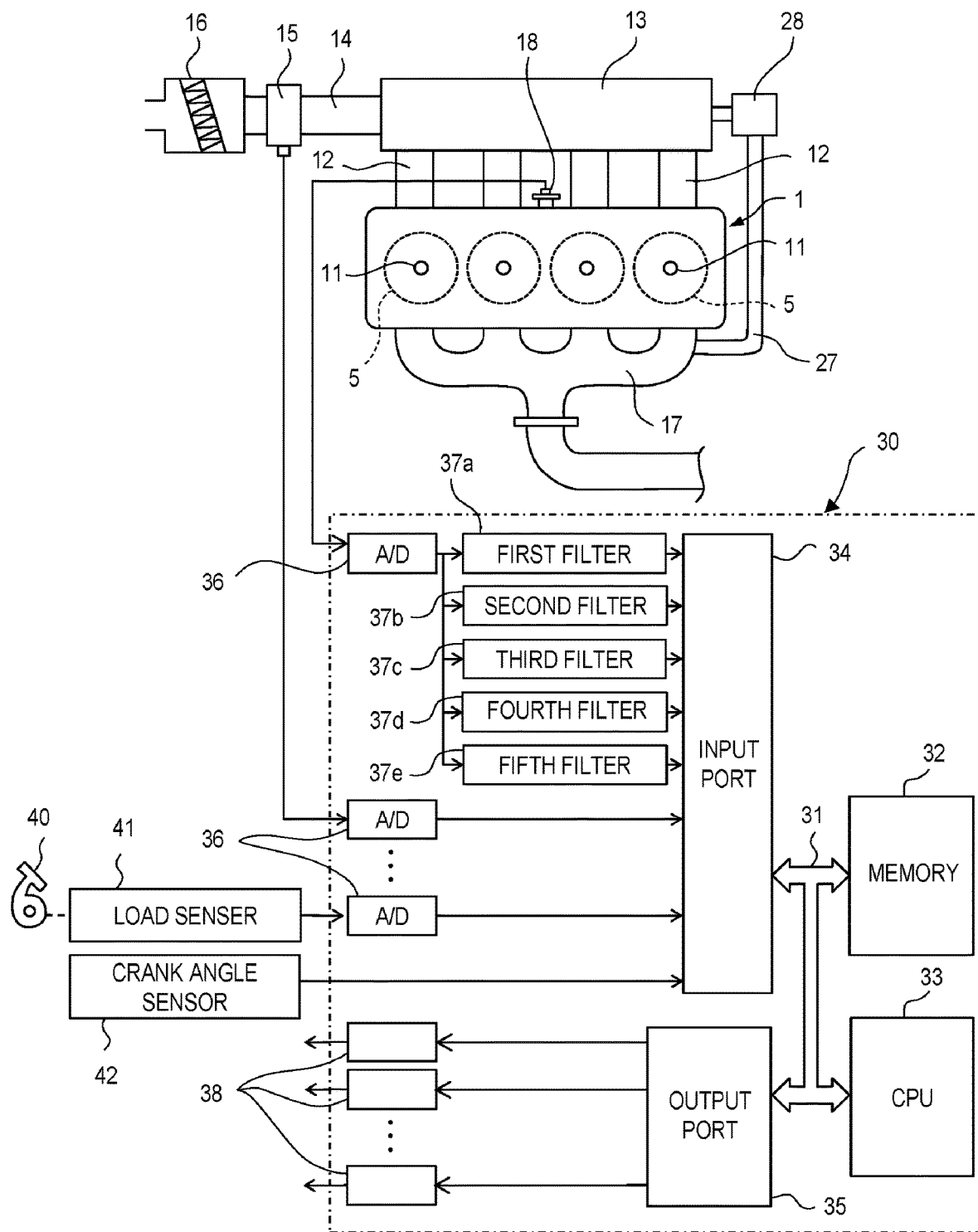
FIG. 1 is an overall view of an internal combustion engine.
Figure 2:
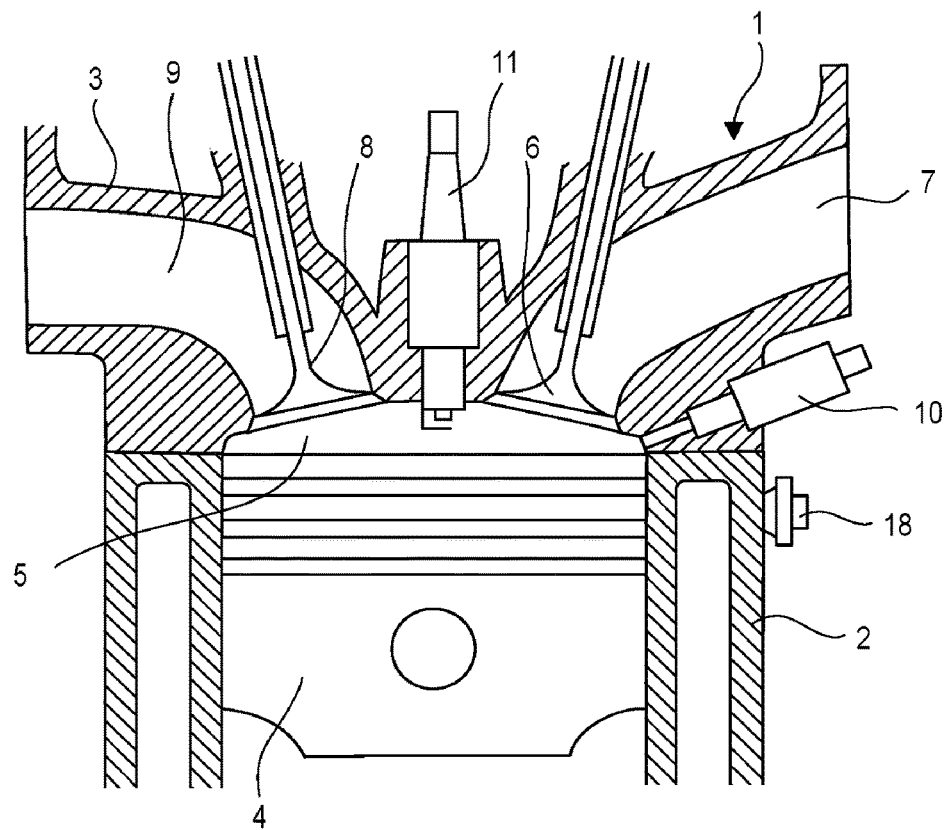
FIG. 2 is a side sectional view of the internal combustion engine illustrated in FIG. 1.

FIGS. 1 and 2 illustrate an overall view of an internal combustion engine. Referring to FIG. 2, reference number 1 indicates an engine body, 2 indicates a cylinder block, 3 indicates a cylinder head, 4 indicates a reciprocating piston in the cylinder block 2, 5 indicates a combustion chamber, 6 indicates an intake valve, 7 indicates an intake port, 8 indicates an exhaust valve, 9 indicates an exhaust port, 10 indicates a fuel injection valve used for supplying fuel, such as gasoline, into each combustion chamber 5, and 11 indicates a spark plug disposed in each combustion chamber 5. Referring to FIGS. 1 and 2, each intake port 7 is connected to a surge tank 13 via a corresponding intake branch pipe 12, and the surge tank 13 is connected to an air cleaner 16 via an intake duct 14 and an intake air amount detector 15.

On the other hand, the exhaust port 9 is connected to an exhaust manifold 17, and the exhaust manifold 17 is connected to the surge tank 13 via an exhaust gas recirculation (hereinafter, referred to as EGR) passage 27 used for recirculating exhaust gas in the exhaust manifold 17 into the surge tank 13. An EGR control valve 28 is disposed in the EGR passage 27. In the embodiment illustrated in FIG. 1, the EGR rate (=recirculated exhaust gas amount/(recirculated exhaust gas amount+intake air amount)) according to an operating state of the engine is set in advance, and the EGR control valve 28 is controlled such that the EGR rate becomes a preset EGR rate.

As illustrated in FIGS. 1 and 2, a knocking sensor 18 that detects vibration of the cylinder block 2, that is, vibration of the engine body 1, is attached to the cylinder block 2 in the embodiment illustrated in FIG. 1. In the example illustrated in FIG. 1, the knocking sensor 18 uses a piezoelectric element as a vibration detection element, and the knocking sensor 18 generates an output voltage proportional to the vibration of the engine body 1. When the knocking occurs, vibration having a frequency of about 5 kHz to 25 kHz occurs in the engine body 1, while the output voltage of the knocking sensor 18 fluctuates at a frequency of about 5 kHz to 25 kHz. Therefore, the occurrence of the knocking can be detected from the fluctuations in the output voltage of the knocking sensor 18, i.e. the fluctuations in the output value of the knocking sensor 18.

On the other hand, in FIG. 1, reference number 30 indicates an electronic control unit that controls the engine operation. As illustrated in FIG. 1, the electronic control unit 30 is composed of a digital computer and includes a storage unit 32, i.e. a memory 32, a CPU (microprocessor) 33, an input port 34 and an output port 35, which are connected to each other by a bidirectional bus 31. An output signal of the knocking sensor 18 is input to the input port 34 via a corresponding AD converter 36 and a digital bandpass filter 37 that passes only an input signal having a frequency of about 5 kHz to 25 kHz. Further, an output signal of the intake air amount detector 15 is input to the input port 34 via the corresponding AD converter 36. A load sensor 41 that generates an output voltage proportional to depressed amount of an accelerator pedal 40 is connected to the accelerator pedal 40, and an output voltage of the load sensor 41 is input to the input port 34 via the corresponding AD converter 36. Further, a crank angle sensor 42 that generates an output pulse every time the crankshaft rotates (for example, 30 degrees) is connected to the input port 34. The engine speed is calculated in the CPU 33 based on the output signal of the crank angle sensor 42. On the other hand, the output port 35 is connected to the fuel injection valve 10, the spark plug 11, and the EGR control valve 28 of each cylinder via a corresponding drive circuit 38.

Outline of Neural Network

Figure 3:
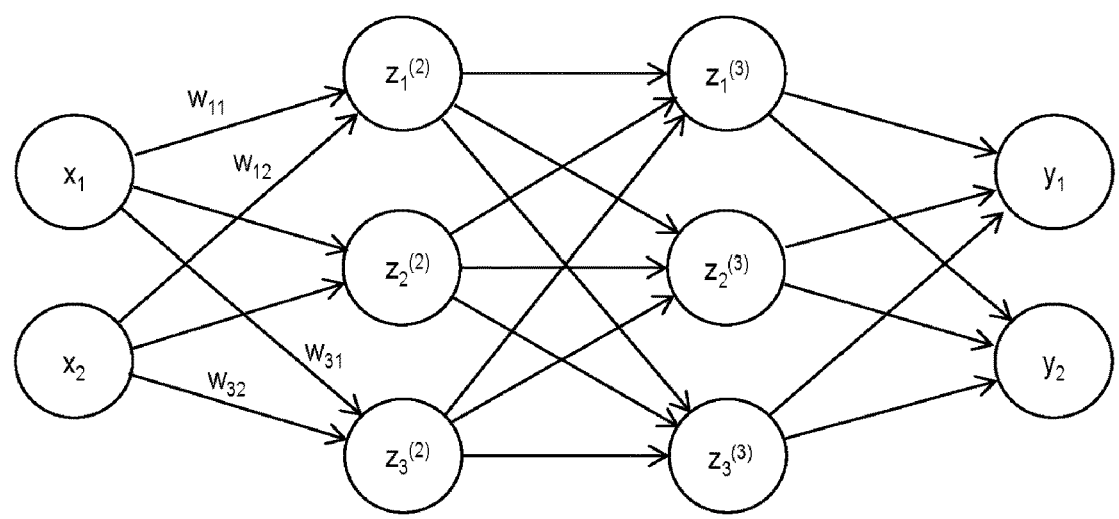
FIG. 3 is an explanatory diagram of a neural network.

In the embodiment of the present disclosure, the value representing knocking intensity is estimated using the neural network. First, the neural network will be briefly described. FIG. 3 illustrates a simple neural network. A circle in FIG. 3 represents an artificial neuron, and in a neural network, the artificial neuron is usually referred to as a node or a unit (hereinafter, referred to as a node). In FIG. 3, L=1 indicates an input layer, L=2 and L=3 indicate hidden layers, and L=4 indicates an output layer. Additionally, in FIG. 3, $x_1$ and $x_2$ indicate output values from each node of the input layer (L=1), and $y_1$ and $y_2$ indicate output values from respective nodes of the output layer (L=4). $z_1^{(2)}$, $z_2^{(2)}$, and $z_3^{(2)}$ indicate output values from respective nodes of the hidden layer (L=2), and $z_1^{(3)}$, $z_2^{(3)}$, and $z_3^{(3)}$ indicate output values from respective nodes of the hidden layer (L=3). The number of hidden layers can be one or any number, and the number of nodes in the input layer and the number of nodes in the hidden layer can also be any number. Further, the number of nodes in the output layer can be one or any number.

Each node of the input layer outputs an input value as it is. On the other hand, the output values $x_1$, $x_2$ of each node of the input layer are input to each node of the hidden layer (L=2). At each node of the hidden layer (L=2), the total input value u is calculated using a respectively corresponding weight w and bias b. For example, the total input value $u_k$ calculated at the node represented by $z_k^{(2)}$ (k=1, 2, 3) in the hidden layer (L=2) in FIG. 3 is represented by the following equation:

$$u_k = \Sigma_{m=1}^{n}(x_m \cdot w_{km}) + b_k \quad \text{[Formula 1]}$$

This total input value $u_k$ is converted by an activation function f, and is output as the output value $z_k^{(2)}$ (=f($u_k$)) from the node represented by $z_k^{(2)}$ in the hidden layer (L=2). On the other hand, the output values $z_1^{(2)}$, $z_2^{(2)}$, $z_3^{(2)}$ of each node of the hidden layer (L=2) are input to each node of the hidden layer (L=3). At each node of the hidden layer (L=3), the total input value u ($\Sigma_z \cdot w + b$) is calculated using the respectively corresponding weight w and bias b. This total input value u is similarly converted by the activation function and output from each node of the hidden layer (L=3) as the output values $z_1^{(3)}$, $z_2^{(3)}$, $z_3^{(3)}$. As the activation function, for example, a sigmoid function σ is used.

On the other hand, the output values $z_1^{(3)}$, $z_2^{(3)}$, $z_3^{(3)}$ of each node of the hidden layer (L=3) are input to each node of the output layer (L=4). At each node of the output layer, the total input value u ($\Sigma_z \cdot w + b$) is calculated using the respectively corresponding weight w and bias b, or the total input value u ($\Sigma_z \cdot w$) is calculated only using the respectively corresponding weight w. In the embodiment of the present disclosure, an identity function is used as the activation function at the node of the output layer. Therefore, the total input value u calculated at the output layer node is output from the node of the output layer as an output value y as it is.

Learning in Neural Network

Assuming that training data indicating a correct value of the output value y of the neural network is $y_t$, respective weights w and biases b in the neural network are learned using a back propagation algorithm so that a difference between the output value y and the training data $y_t$ decreases. The back propagation algorithm is already known, and thus a brief description of the back propagation algorithm will be provided below. Since the bias b is a kind of the weight w, hereinafter, the bias b is also referred to as the weight w. In the neural network as illustrated in FIG. 3, when the weight for the input value $u^{(L)}$ input to the node of each layer L=2, L=3, or L=4 is represented by $w^{(L)}$, a derivative of the error function E by the weight $w^{(L)}$, i.e. a gradient $\partial E / \partial w^{(L)}$, is rewritten as the following equation:

[Formula 2]

$$\partial E / \partial w^{(L)} = (\partial E / \partial u^{(L)})(\partial u^{(L)} / \partial w^{(L)}) \quad (1)$$

Here, since $z^{(L-1)} \cdot \partial w^{(L)} = \partial u^{(L)}$, if $(\partial E/\partial u^{(L)}) = \delta^{(L)}$, the equation (1) can be expressed by the following equation:

[Formula 3]

$$\partial E/\partial w^{(L)} = \delta^{(L)} \cdot z^{(L-1)} \quad (2)$$

Here, fluctuations in $u^{(L)}$ causes fluctuations in the error function E through fluctuations in the total input value $u^{(L+1)}$ of the next layer, so that $\delta^{(L)}$ can be expressed by the following equation:

[Formula 4]

$$\delta^{(L)} = (\partial E/\partial u^{(L)}) = \Sigma_{k=1}^{k}(\partial E/\partial u_k^{(L+1)})(\partial u_k^{(L+1)}/\partial u^{(L)})$$
$$(k=1,2 \ldots) \quad (3)$$

Here, when it is represented as $z^{(L)} = f(u^{(L)})$, the input value $u_k^{(L+1)}$ on the right side of the equation (3) can be expressed by the following equation:

[Formula 5]

$$\text{input value } u_k^{(L+1)} = \Sigma_{k=1}^{k} w_k^{(L+1)} \cdot z^{(L)} = \Sigma_{k=1}^{k} w_k^{(L+1)} \cdot f(u^{(L)}) \quad (4)$$

The first term on the right side of the equation (3) $(\partial E/\partial u^{(L+1)})$ is $\delta^{(L+1)}$, and the second term on the right side of the above equation (3) $(\partial u_k^{(L+1)}/\partial u^{(L)})$ can be expressed by the following equation:

[Formula 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is represented by the following equation:

[Formula 7]

$$\delta^{(L)} = \Sigma_{k=1}^{k} w_k^{(L+1)} \cdot \delta^{(L+1)} \cdot f'(u^{(L)})$$

i.e. $\delta^{(L-1)} = \Sigma_{k=1}^{k} w_k^{(L)} \cdot \delta^{(L)} \cdot f'(u^{(L-1)}) \quad (6)$ That is, when $\delta^{(L+1)}$ is obtained, $\delta^{(L)}$ can also be obtained.

In a case where the number of nodes in the output layer (L=4) is one, the training data $y_t$ is obtained for a certain input value, and the output value of this input value from the output layer is y, when the square error is used as the error function, the square error E is obtained by $E=\frac{1}{2}(y-y_t)^2$. In this case, at the node of the output layer (L=4), the output value y is $f(u^{(L)})$, and thus, the value of $\delta^{(L)}$ at the node of the output layer (L=4) is expressed by the following equation:

[Formula 8]

$$\delta^{(L)} = \partial E/\partial u^{(L)} = (\partial E/\partial y)(\partial y/\partial u^{(L)}) = (y-y_t) \cdot f'(u^{(L)}) \quad (7)$$

In this case, in the embodiment the present disclosure, $f(u^{(L)})$ is the identity function, and $f'(u^{(L)})=1$ as described above. Therefore, $\delta^{(L)}$ is calculated as $y-y_t$, thereby obtaining $\delta^{(L)}$.

When $\delta^{(L)}$ is obtained, $\delta^{(L-1)}$ of the preceding layer is obtained using the equation (6). In this way, $\delta$ of the preceding layer is sequentially obtained, and the derivative of the error function E, i.e. the gradient $\partial E/\partial w^{(L)}$, is obtained for each weight w using the equation (2) based on those values of $\delta$. When the gradient $\partial E/\partial w^{(L)}$ is obtained, the weight w is updated using the gradient $\partial E/\partial w^{(L)}$ so that the value of the error function E decreases. That is, the weight w is learned. As illustrated in FIG. 3, in a case where the output layer (L=4) has a plurality of nodes, output values from respective nodes are represented by $y_1$, $y_2$ . . . and the corresponding pieces of training data are respectively represented by $y_{t1}$, $y_{t2}$, . . . , the following error sum of squares (ESS) E is used as the error function E:

[Formula 9]

$$\text{ESS } E = \frac{1}{2}\Sigma_{k=1}^{n}(y_k - y_{tk})^2 (n \text{ is the number of nodes in the output layer}) \quad (8)$$

In this case, the value of $\delta^{(L)}$ at each node of the output layer (L=4) is calculated by $\delta^{(L)} = y - y_{tk}$ (k=1, 2, . . . , n). Based on those values of $\delta^{(L)}$, $\delta^{(L-1)}$ of the preceding layer is obtained using the equation (6).

Embodiment of Present Disclosure

In the internal combustion engine, the vibration of the engine body 1 increases as the knocking intensity increases. As illustrated in FIGS. 1 and 2, the knocking sensor 18 is attached to the engine body 1, and the knocking intensity can be detected from the vibration intensity of the engine body 1 detected by the knocking sensor 18. However, as described above, the engine body 1 also vibrates due to mechanical operations, such as seating of the intake valve 6 and the exhaust valve 8, and seating of a needle of the fuel injection valve 10. Therefore, if the knocking sensor 18 that detects the vibration of the engine body 1 is used, when the vibration intensity of the engine body 1 increases due to such mechanical operations, the knocking intensity is falsely determined as being high even though the actual knocking intensity is lower.

Meanwhile, as described above, in a case where the pressure sensor capable of detecting combustion pressure of the air-fuel mixture generated by ignition is used, the knocking intensity can be detected from intensity of fluctuations in an output value of the pressure sensor. In this case, for example, as the knocking intensity increases, a peak value of the output value of the pressure sensor increases. Accordingly, it can be understood that the peak value of the output value of the pressure sensor is one of values. Therefore, the knocking intensity can be detected from such a value representing knocking intensity. In this case, the vibration of the engine body 1 caused by the mechanical operation does not affect the output value of the pressure sensor and thus does not affect the value representing knocking intensity. Accordingly, when the pressure sensor is used, the knocking intensity can be detected with high accuracy.

However, the pressure sensor is expensive. Additionally, a combustion form of the air-fuel mixture in the combustion chamber 5 is changed by deposits which gradually adhere to the pressure sensor. Therefore, it is difficult to use such a pressure sensor for a commercially available vehicle. In the present disclosure, the value representing knocking intensity obtained from the output value of the pressure sensor is estimated from the output value of the knocking sensor using the neural network. Hereinbelow, referring to FIGS. 4, 5, and 6A to 6C, and FIGS. 7A to 7C, the output value of the knocking sensor, the output value of the pressure sensor, and the value representing knocking intensity obtained based on the output value of the pressure sensor will be described.

Figure 4:
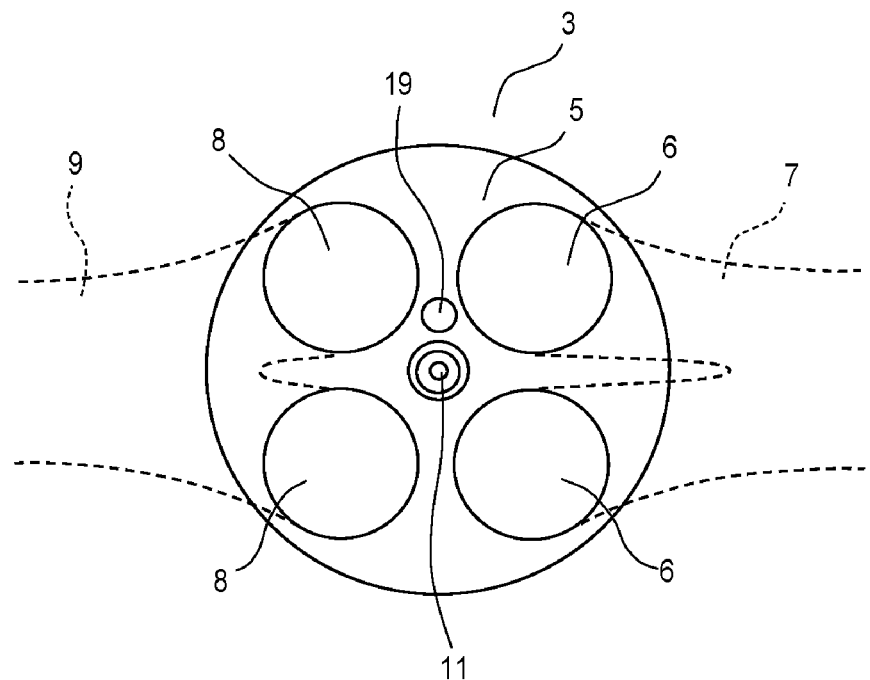
FIG. 4 is a bottom view of a cylinder head.
Figure 5:
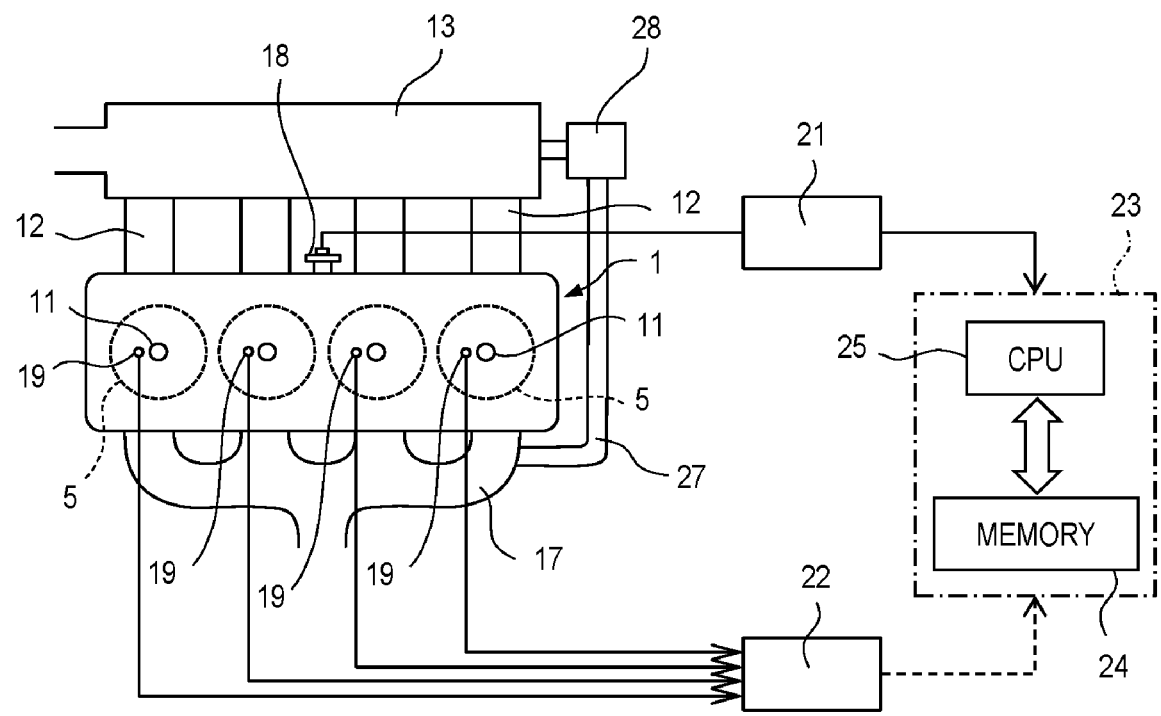
FIG. 5 is an overall view of an internal combustion engine.

FIGS. 4 and 5 respectively illustrate a bottom view of the cylinder head 3 and a part of the engine body 1, used only for acquiring data necessary for learning the weight of the neural network. Referring to FIGS. 4 and 5, the pressure sensors 19 are respectively arranged on an inner wall surface of the cylinder head 3 of each cylinder to estimate the value representing knocking intensity, originally obtained from the output value of the pressure sensor 19 but from the output value of the knocking sensor 18. From each of the pressure sensors 19, the output voltage proportional to the pressure in the corresponding combustion chamber 5, i.e. an output value indicating a combustion pressure of an air-fuel mixture generated by ignition, is output. In this case, the pressure in the combustion chamber 5 can also be measured using a pressure sensor integrated with the spark plug. These pressure sensors 19 are used only for acquiring data necessary for learning the weight of the neural network.

The knocking usually occurs between a compression top dead center and 90 degrees after the compression top dead center. When the knocking occurs, pressure fluctuations having a frequency of about 5 kHz to 25 kHz in the combustion chamber 5 and the vibration of the engine body 1 having frequencies of about 5 kHz to 25 kHz are generated. Therefore, in order to extract only the vibration of the engine body 1 due to the occurrence of the knocking, the output value of the knocking sensor 18 is typically sent to a digital bandpass filter that passes only the input signal having a frequency of, for example, about 5 kHz to 25 kHz after AD conversion. The knocking intensity is determined based on the output value of the knocking sensor 18 after being filtered by the digital bandpass filter.

Similarly, in order to extract only the pressure fluctuations in the combustion chamber 5 due to the occurrence of the knocking, the output value of the pressure sensor 19 is also sent to the digital bandpass that passes only the input signal having a frequency of, for example, about 5 kHz to 25 kHz after the AD conversion. The knocking intensity is determined based on the output value of the pressure sensor 19 after being filtered by the digital bandpass filter. The output value of the knocking sensor 18 after being filtered by the digital bandpass filter is hereinafter simply referred to as a filtered output value of the knocking sensor 18. The output value of the pressure sensor 19 after being filtered by the digital bandpass filter is hereinafter simply referred to as a filtered output value of the pressure sensor 19.

Figure 6A:
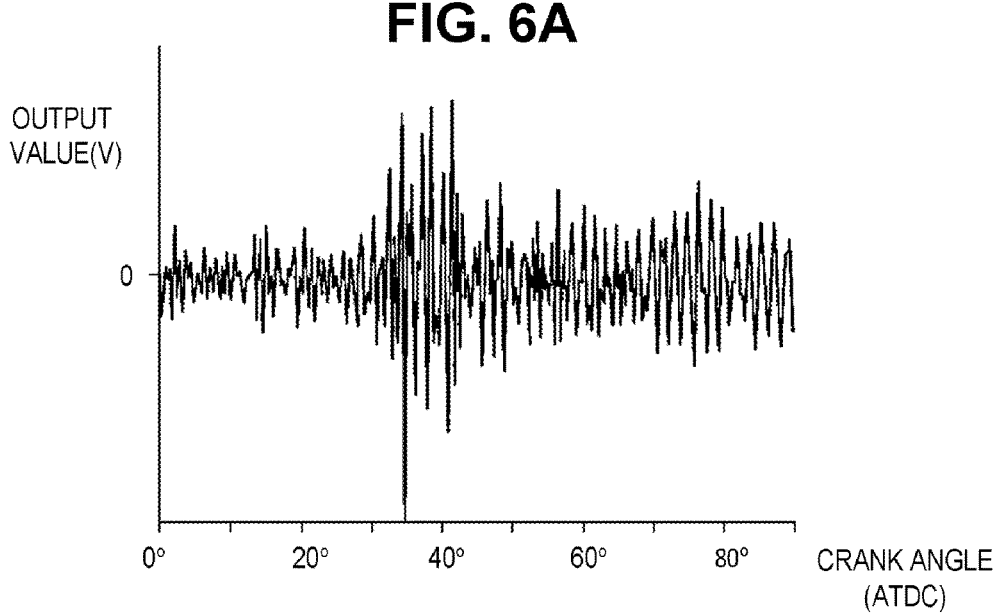
FIG. 6A is a graph illustrating output values of a knocking sensor.
Figure 7A:
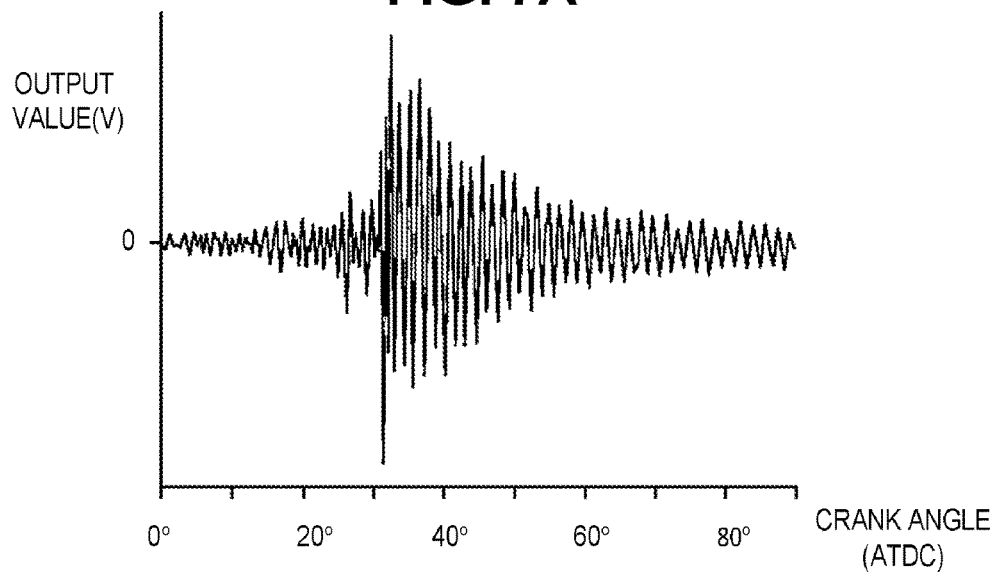
FIG. 7A is a graph illustrating output values of a pressure sensor.

FIGS. 6A and 7A illustrate a change in the filtered output value (V) of the knocking sensor 18 and a change in the filtered output value (V) of the pressure sensor 19 with respect to the occurrence of the same knocking, respectively. Both a horizontal axis in FIG. 6A and a horizontal axis in FIG. 7A indicate a crank angle (from the compression top dead center to 90 degrees after the compression top dead center), which is expressed in ATDC.

As can be seen by comparing FIG. 6A with FIG. 7A, the vibration intensity of the filtered output value of the pressure sensor 19 illustrated in FIG. 7A rapidly increases when the knocking occurs, and then gradually decreases. That is, since the output value of the pressure sensor 19 is not affected by the vibration of the engine body 1 caused by the mechanical operations, the occurrence of knocking clearly appears in the output value of the pressure sensor 19. On the other hand, the vibration intensity of the filtered output value of the knocking sensor 18 illustrated in FIG. 6A also increases when the knocking occurs but, since the output value of the knocking sensor 18 is greatly affected by the vibration of the engine body 1 caused by the mechanical operations, the vibration intensity of the output value of the knocking sensor 18 has a large value even before and after the knocking occurs. That is, since the vibration of the engine body 1 caused by the mechanical operations appears as noise in the output value of the knocking sensor 18, the occurrence of knocking does not clearly appear in the output value of the knocking sensor 18.

Figure 7B:
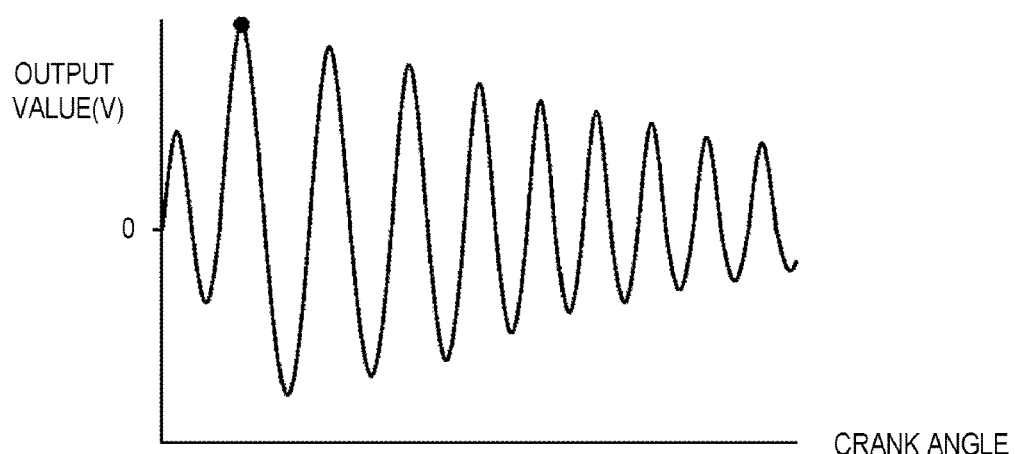
FIG. 7B is another graph illustrating output values of the pressure sensor.
Figure 7C:
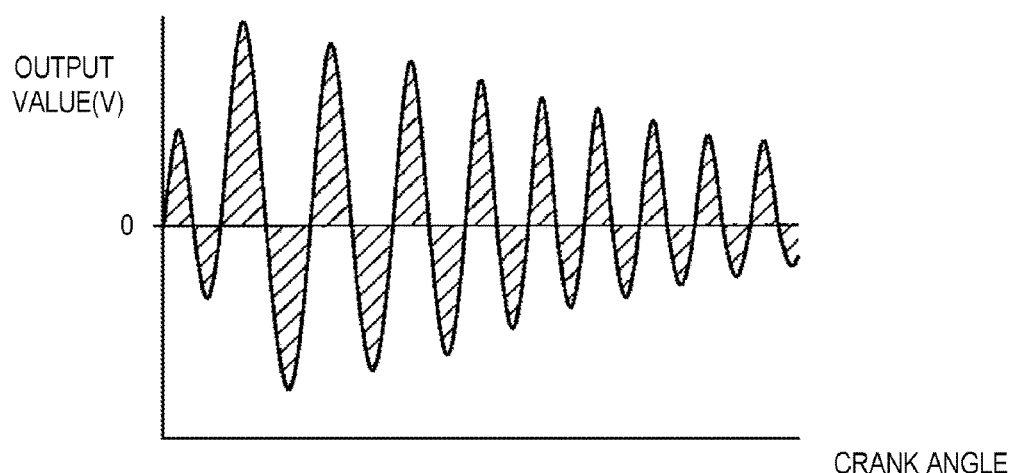
FIG. 7C is still another graph illustrating output values of the pressure sensor.

Therefore, whether the knocking has occurred can be clearly determined from the output value of the pressure sensor 19. In this case, the intensity of the occurred knocking also clearly appears in the output value of the pressure sensor 19. Next, the description thereof will be made with reference to FIGS. 7B and 7C. FIGS. 7B and 7C are graphs schematically illustrating a part of a waveform of the filtered output value of the pressure sensor 19 illustrated in FIG. 7A, which is expanded in a horizontal axis direction.

As the intensity of the occurred knocking increases, a peak value of the filtered output value of the pressure sensor 19 increases. Therefore, the peak value of the filtered output value of the pressure sensor 19 represented by a circle in FIG. 7B indicates the value representing knocking intensity. On the other hand, when the intensity of the occurred knocking increases, the sum of areas represented by a hatching surrounded by the waveform of the output value and the line of the output value of 0 (V) in FIG. 7C, that is, the integral value (even a negative integral value is considered as a positive value) of the filtered output value of the pressure sensor 19 increases. Therefore, the integral value (even a negative integral value is considered as a positive value) of the filtered output value of the pressure sensor 19 indicates the value representing knocking intensity. As such, the value representing knocking intensity can be acquired from the output value of the pressure sensor 19.

On the other hand, it is difficult to extract such a value representing knocking intensity from the output value of the knocking sensor 18. In the present disclosure, the weight of the neural network is learned so that the value representing knocking intensity obtained from the output value of the pressure sensor 19 can be acquired based on the output value of the knocking sensor 18 using the neural network, and the value representing knocking intensity originally obtained from the output value of the pressure sensor 19 is estimated from the output value of the knocking sensor 18 using a learned neural network. Hereinafter, a method of learning the weight of the neural network so as to acquire the value representing knocking intensity originally obtained from the output value of the pressure sensor 19 based on the output value of the knocking sensor 18 will be described.

Figure 8:
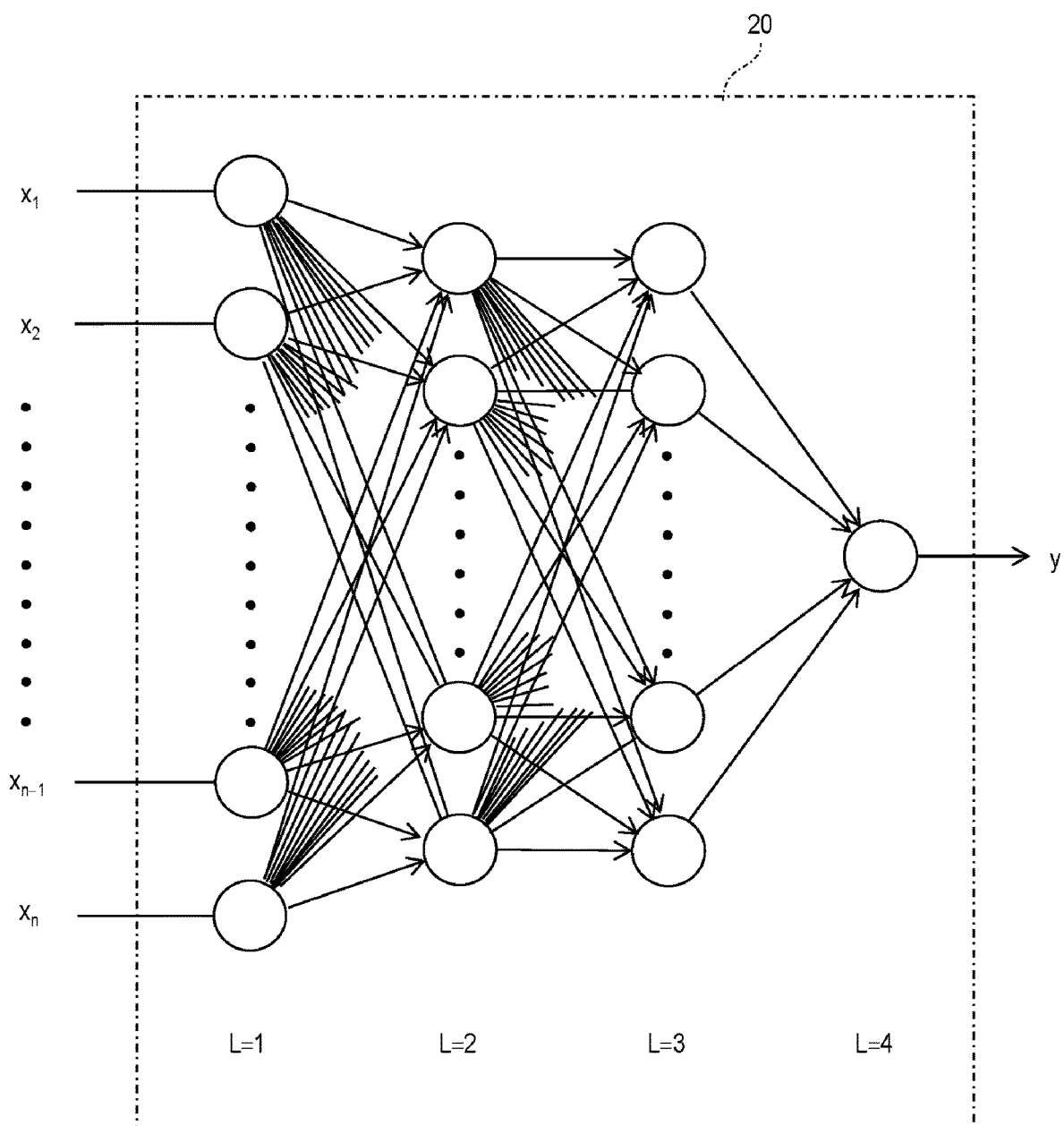
FIG. 8 is a diagram illustrating a neural network used in an embodiment according to the present disclosure.

First, the neural network used at this time will be described with reference to FIG. 8. The neural network illustrated in FIG. 8 may be referred to as a first neural network. Referring to FIG. 8, in this neural network 20, L=1 indicates an input layer, L=2 and L=3 indicate hidden layers, and L=4 indicates an output layer, as in the neural network illustrated in FIG. 3. As illustrated in FIG. 8, the input layer (L=1) includes n nodes, and n input values $x_1, x_2, \ldots, x_{n-1}, x_n$ are respectively input to the nodes of the input layer (L=1). On the other hand, FIG. 8 illustrates the hidden layer (L=2) and the hidden layer (L=3), but the number of hidden layers can be one or any number, and the number of nodes in the hidden layer can also be any number. Further, the output layer (L=4) has one node, and the output value from the node in the output layer is denoted by y.

Figure 6B:
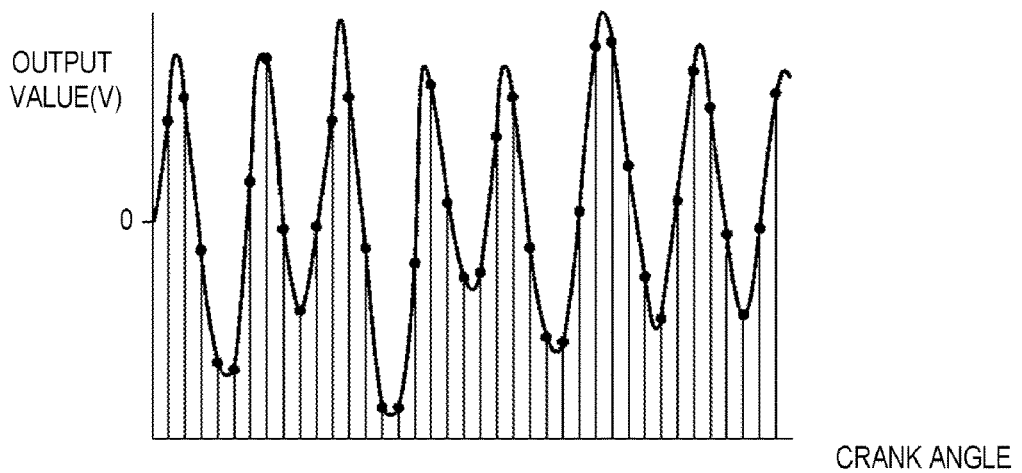
FIG. 6B is another graph illustrating output values of the knocking sensor.
Figure 6C:
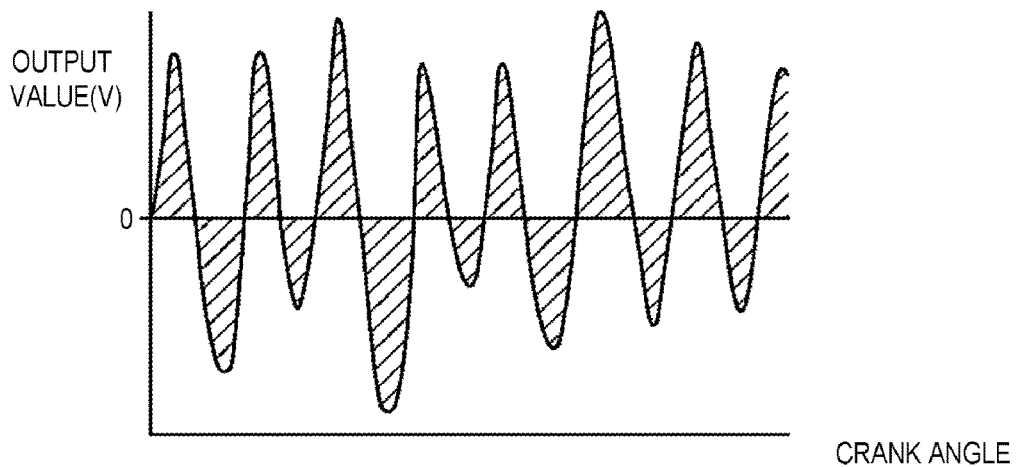
FIG. 6C is still another graph illustrating output values of the knocking sensor.

The input values $x_1, x_2, \ldots, x_{n-1}, x_n$ and the output value y in FIG. 8 will be described hereinbelow. At first, input values $x_1, x_2, \ldots, x_{n-1}, x_n$ will be described with reference to FIGS. 6B and 6C. Further, FIGS. 6B and 6C are graphs schematically illustrating a part of the waveform of the output value of the knocking sensor 18 illustrated in FIG. 6A, which is expanded in the horizontal axis direction. In the embodiment of the present disclosure, the values illustrated in FIG. 6B or the values illustrated in FIG. 6C can be used as the input values $x_1, x_2, \ldots, x_{n-1}, x_n$.

That is, in the example illustrated in FIG. 6B, the filtered output values of the knocking sensor 18 themselves are set as the input values $x_1, x_2, \ldots, x_{n-1}, x_n$. In this case, as represented by black circles in FIG. 6B, the output values of the knocking sensor 18 at every predetermined time or at every predetermined crank angle are set as the input values $x_1, x_2, \ldots, x_{n-1}, x_n$. On the other hand, in the example illustrated in FIG. 6C, the integral values (even a negative integral value is considered as a positive value) of the filtered output values of the knocking sensor 18, for example, the integral values of the filtered output values of the knocking sensor 18 within a predetermined crank angle are set as the input values $x_1, x_2, \ldots, x_{n-1}, x_n$.

On the other hand, in the embodiment of the present disclosure, the value representing knocking intensity obtained from the output value of the pressure sensor 19 is the output value y illustrated in FIG. 8. In this case, the peak value of the output value of the pressure sensor 19 represented by a circle in FIG. 7B represents the knocking intensity, and the integral value (even a negative integral value is considered as a positive value) of the output value of the pressure sensor 19 illustrated in FIG. 7C also represents the knocking intensity. Therefore, in the embodiment of the present disclosure, the peak value of the output value of the pressure sensor 19 represented by a circle in FIG. 7B is set as the output value y, or the integral value (even a negative integral value is considered as a positive value) of the output value of the pressure sensor 19 illustrated in FIG. 7C is set as the output value y. In this case, an actually measured value of the value representing knocking intensity obtained from the output value of the pressure sensor 19 is considered as training data $y_t$.

FIG. 9 illustrates a training dataset created using the input values $x_1, x_2, \ldots, x_{n-1}, x_n$, and the actually measured value of the value representing knocking intensity obtained from the output value of the pressure sensor 19 when the input values are $x_1, x_2, \ldots, x_{n-1}, x_n$, i.e. the training data $y_t$. As illustrated in FIG. 9, in this training dataset, m pieces of data representing correlations between the input values $x_1, x_2, \ldots, x_{n-1}, x_n$ and the training data $y_t$ are acquired. For example, in the second (No. 2) data, the acquired input values $x_{12}, x_{22}, \ldots, x_{m-12}, X_{m2}$, and training data $y_{t2}$ are listed. In the m−1th data (No. m−1), the acquired input values $x_{1m-1}, x_{2m-1}, \ldots, x_{n-1m-1}, x_{nm-1}$, and training data $y_{tm-1}$ are listed.

In a case where the filtered output values of the knocking sensor 18 themselves are used as the input values $x_1, x_2, \ldots, x_{n-1}, x_n$, for example, the filtered output values of the knocking sensor 18, which are respectively acquired at every predetermined crank angle in a range from the compression top dead center to 90 degrees after the compression top dead center, are set as the input values $x_1, x_2, \ldots, x_{n-1}, x_n$. In this case, the number n of input values is at least several hundred, and thus the number n of nodes in the input layer (L=1) illustrated in FIG. 8 is at least several hundred.

On the other hand, in the embodiment of the present disclosure, a case where the integral values (even a negative integral value is considered as a positive value) of the filtered output values of the knocking sensor 18 are used as the input values $x_1, x_2, \ldots, x_{n-1}, x_n$, the range from compression top dead center to 90 degrees after the compression top dead center is divided into 18 sections at every 5 degrees of the crank angle, the integral values of the filtered output values of the knocking sensor 18 (even a negative integral value is considered as a positive value) in the respective divided sections are set as the input values $x_1, x_2, \ldots, x_{n-1}, x_n$. In this case, the number n of the input values is 18, and thus the number n of nodes in the input layer (L=1) illustrated in FIG. 8 is also 18.

On the other hand, the training data $y_t$ in the training dataset illustrated in FIG. 9 is the actually measured value of the value representing knocking intensity obtained from the output value of the pressure sensor 19. As the training data $y_t$, the peak value of the output value of the pressure sensor 19 illustrated by a circle in FIG. 7B is used, or the integral value (even a negative integral value is considered as a positive value) of the output value of the pressure sensor 19 illustrated in FIG. 7C is used. By the way, in the embodiment of the present disclosure, the learning of the weight of the neural network 20 illustrated in FIG. 8 is performed using the training dataset illustrated in FIG. 9. Therefore, a method of creating the training dataset illustrated in FIG. 9 will be described with reference to FIGS. 4 and 5.

FIGS. 4 and 5 illustrate one example of the method of creating the training dataset illustrated in FIG. 9. Referring to FIGS. 4 and 5, the pressure sensor 19 is arranged to acquire the value representing knocking intensity on the inner wall surface of the cylinder head 3 facing the combustion chamber 5 of each cylinder. As described above, these pressure sensors 19 are provided only for acquiring data necessary for learning. On the other hand, in the example illustrated in FIG. 5, the knocking sensor 18 is connected to a detector 21 capable of detecting the waveform of the output value of the knocking sensor 18, such as an oscilloscope. Each pressure sensor 19 is connected to a detector 22 capable of detecting the waveform of the output value of each pressure sensor 19, such as an oscilloscope.

In the detector 21, in order to extract only the vibration of the engine body 1 due to the occurrence of the knocking, the output value of the knocking sensor 18 is typically sent to a digital bandpass filter that passes only the input signal having a frequency of, for example, about 5 kHz to 25 kHz after the AD conversion, and the waveform of the output value of the knocking sensor 18 after being filtered by the digital bandpass filter is detected. Meanwhile, in the detector 22, in order to extract only the pressure fluctuations in the combustion chamber 5 due to the occurrence of the knocking, the output value of the pressure sensor 19 is also sent to the digital bandpass filter that passes only the input signal having a frequency of, for example, about 5 kHz to 25 kHz after the AD conversion, and the waveform of the output value of the pressure sensor 19 after being filtered by the digital bandpass filter is detected.

When creating the training dataset, the engine is operated in both an operating state where the knocking does not occur and an operating state where the knocking occurs for various combinations of engine load, engine speed, and EGR rate, at which the training dataset as illustrated in FIG. 9 is created based on the waveform data of the filtered output value of the knocking sensor 18 and the waveform data of the filtered output value of the pressure sensor 19 respectively obtained from the detectors 21, 22. In this case, the training dataset can be manually created based on the waveform data respectively obtained from the detectors 21, 22, or can be electronically created based on the electronic data respectively obtained from the detectors 21, 22. The learning of the weight of neural network 20 illustrated in FIG. 8 is performed using the electronic data of the training dataset created in this manner.

In the example illustrated in FIG. 5, a learning device 23 is provided for learning of the weight of the neural network. As illustrated in FIG. 5, the learning device 23 includes a storage unit 24, i.e. a memory 24 and a CPU (microprocessor) 25. In the example illustrated in FIG. 5, the number of nodes of the neural network 20 illustrated in FIG. 8 and the electronic data of the created training dataset are stored in the memory 24 of the learning device 23, and the weight of the neural network 20 is learned in the CPU 25.

A method of learning the weight of the neural network 20 using the learning device 23 will be described, in which the integral values of filtered output values of the knocking sensor 18 in the divided sections obtained by dividing the range from the top dead center to 90 degrees after the top dead center at every 5 degrees of crank angle are respectively used as the input values $x_1, x_2, \ldots, x_{n-1}, x_n$, and the actually measured peak value of the output value of pressure sensor 19 is used as the training data $y_t$.

Figure 10:
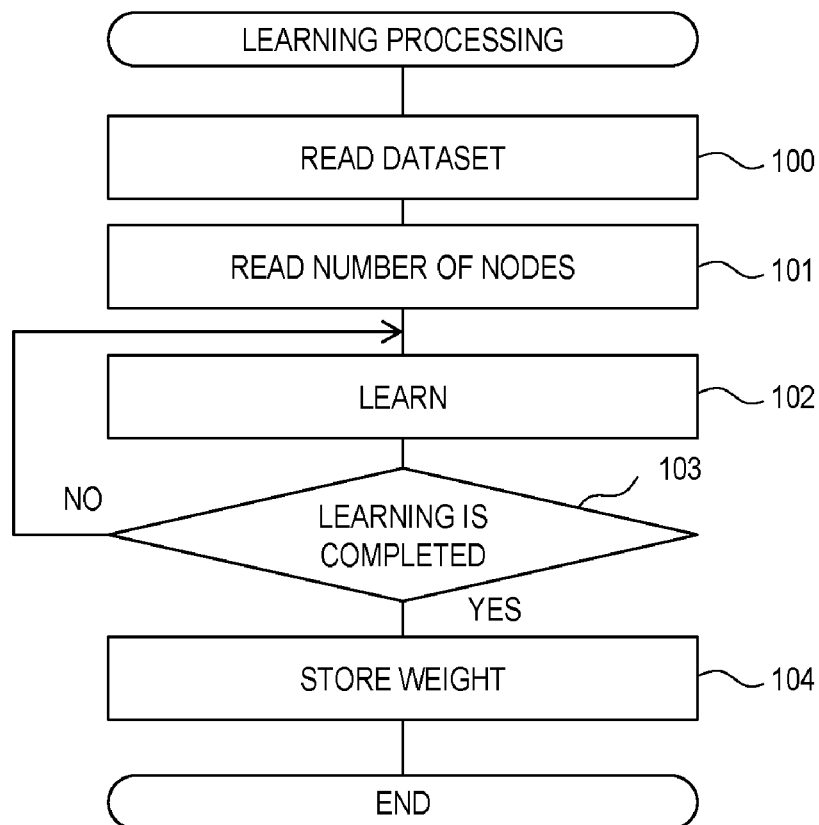
FIG. 10 is a flowchart illustrating a learning processing routine.

FIG. 10 illustrates a learning processing routine of the weight of the neural network performed in the learning device 23. Referring to FIG. 10, in step 100, each piece of the data of the training dataset, stored in the memory 24 of the learning device 23, is read. In step 101, the number of nodes in the input layer (L=1), the number of nodes in the hidden layers (L=2 and L=3), and the number of nodes in the output layer (L=4) of the neural network 20 are read. Based on the number of nodes, the neural network 20 as illustrated in FIG. 8 is created. In this case, in this example, the input layer (L=1) has 18 nodes, and the output layer (L=4) has one node.

In step 102, the weight of the neural network 20 is learned. The input values $x_1, x_2, \ldots, x_{n-1}, x_n$ of the first (No. 1) data illustrated in FIG. 9, i.e. the input values $x_1, x_2, \ldots, x_{17}, x_{18}$ are respectively input to 18 nodes of the input layer (L=1) of the neural network 20. A square error $E = \frac{1}{2}(y - y_{t1})^2$ between the output value y of the neural network 20 and training data $y_{t1}$ of the first (No. 1) data at this time is calculated. The weight of the neural network 20 is learned using the back propagation algorithm described above, whereby such a square error E is reduced.

When the learning of the weight of the neural network 20 based on the first (No. 1) data illustrated in FIG. 9 is completed, the learning of the weight of the neural network 20 based on the second (No. 2) data illustrated in FIG. 9 is performed using the back propagation algorithm. Similarly, the learning of the weight of the neural network 20 is sequentially performed up to the m-th (No. m) data illustrated in FIG. 9. When the learning of the weight of the neural network 20 is completed for all of the first (No. 1) to the m-th (No. m) data illustrated in FIG. 9, the processing proceeds to step 103.

In step 103, for example, the ESS E between the output value y and the training data $y_t$, for all the neural network 20 from the first (No. 1) data to the m-th (No. m) data illustrated in FIG. 9, is calculated. It is determined whether the ESS E has become equal to or smaller than a preset error. When it is determined that the ESS E is larger than the preset error, the processing returns to step 102, and the learning of the weight of the neural network 20 is performed again based on the training dataset illustrated in FIG. 9. The learning of the weight of the neural network 20 is continued until the ESS E becomes equal to or smaller than the preset error. When it is determined in step 103 that the ESS E has become equal to or smaller than the preset error, the processing proceeds to step 104, in which the learned weight of the neural network 20 is stored in the memory 24 of the learning device 23. As such, an estimation model for the value representing knocking intensity is created.

As described above, the internal combustion engine illustrated in FIG. 5 is an internal combustion engine in which the pressure sensor 19 is attached to the internal combustion engine illustrated in FIG. 1 for learning of the weight of the neural network 20. In the internal combustion engine illustrated in FIG. 1 or FIG. 5, when the value representing knocking intensity is estimated using the estimation model for the value representing knocking intensity, i.e. the learned neural network 20, the value representing knocking intensity can be accurately estimated without any problem. However, in other internal combustion engines, such as a commercially available internal combustion engine, a problem arises when the value representing knocking intensity is estimated using the estimation model for the value representing knocking intensity, i.e. the learned neural network 20.

That is, as described above, there are tolerances in the components of the engine, and thus, dimensions of the components of the engine vary depending on a type of commercially available vehicle, whereby different engine vibrations occur in each commercially available vehicle. However, in the learned neural network, the weights are learned for the different engine vibrations that occur for each commercially available vehicle in this way. Thus, when the vibration of the engine for which the weight has not been learned, i.e. unlearned engine vibration, occurs, the learned neural network may falsely determine that vibration occurs in the engine body due to the occurrence of the knocking. If such a false determination is made, as described above, the ignition timing may be continuously and thus excessively retarded.

Figure 11:
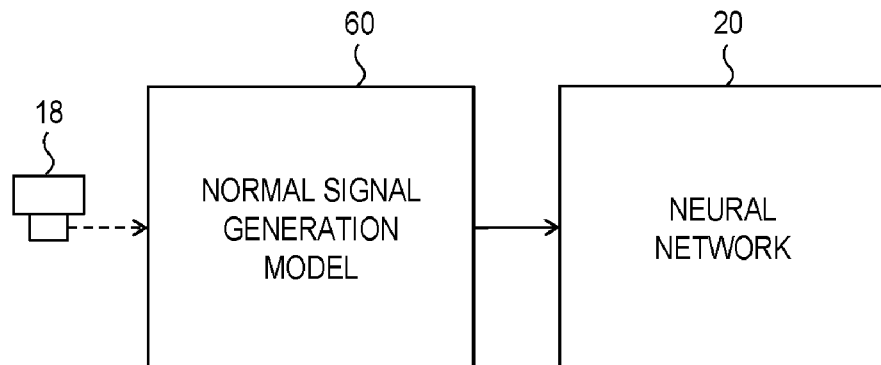
FIG. 11 is a diagram illustrating a correlation between the knocking sensor, a normal signal generation model, and the neural network.

In the embodiment of the present disclosure, in order to prevent the false determination that the vibration occurs in the engine body 1 due to the occurrence of the knocking even when the vibration of the engine for which the weight has not been learned, i.e. unlearned engine vibration occurs, as illustrated in FIG. 11, a normal signal generation model 60 is inserted between the knocking sensor 18 and the neural network 20. The normal signal generation model 60 outputs a noise-removed output value from which a value representing the unlearned engine vibration included in this output value, i.e. an unlearned noise component value, has been removed when receiving the output value of the knocking sensor 18. The output value of the knocking sensor 18 is input to the neural network 20 via the normal signal generation model 60.

Figure 12:
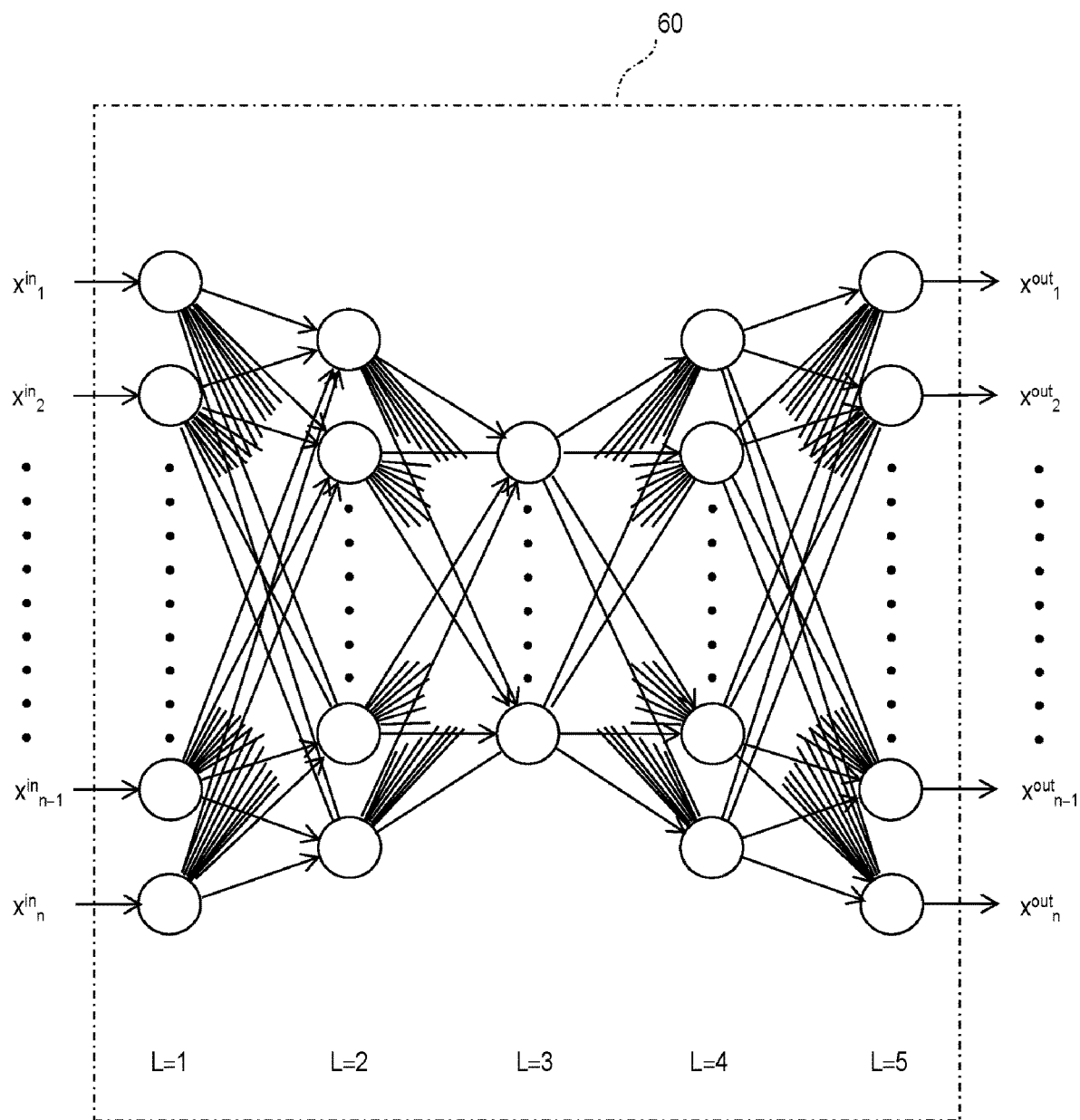
FIG. 12 is a diagram illustrating an auto-encoder.

FIG. 12 illustrates one example of the normal signal generation model 60. In the example illustrated in FIG. 12, the normal signal generation model 60 includes an auto-encoder using the neural network. Referring to FIG. 12, in this auto-encoder, L=1 indicates an input layer, L=2, L=3, and L=4 indicate hidden layers, and L=5 indicates an output layer. The number of nodes in the input layer (L=1) and the number of nodes in the output layer (L=5) are the same in this auto-encoder. Further, the number of nodes in the input layer (L=1) and the output layer (L=5) of the auto-encoder are the same as that in the input layer (L=1) of the neural network 20 illustrated in FIG. 8. The number of nodes in the hidden layers (L=2, L=3, and L=4) is smaller than that in the input layer (L=1) and the output layer (L=5). The number of hidden layers (L=2, L=3, and L=4) can be any number.

As illustrated in FIG. 12, in this auto-encoder, the input values $x^{in}_1, x^{in}_2, \ldots, x^{in}_{n-1}, x^{in}_n$ are respectively input to nodes in the input layer (L=1) of the auto-encoder, and the output values $x^{out}_1, x^{out}_2, \ldots, x^{out}_{n-1}, x^{out}_n$ are respectively output from nodes in the output layer (L=5) of the auto-encoder. The output values $x^{out}_1, x^{out}_2, \ldots, x^{out}_{n-1}, x^{out}_n$, output from the nodes in the output layer (L=5) of the auto-encoder, are respectively input to the nodes in the input layer (L=1) of the neural network 20 illustrated in FIG. 8, as the input values $x_1, x_2, \ldots, x_{n-1}, x_n$.

On the other hand, the values illustrated in FIG. 6B or the values illustrated in FIG. 6C are used as the input values $x^{in}_1, x^{in}_2, \ldots, x^{in}_{n-1}, x^{in}_n$ of the auto-encoder. That is, in the example illustrated in FIG. 6B, the filtered output values of the knocking sensor 18 themselves are set as the input values $x^{in}_1, x^{in}_2, \ldots, x^{in}_{n-1}, x^{in}_n$. In this case, as represented by black circles in FIG. 6B, the output values of the knocking sensor 18 at every predetermined time or at every predetermined crank angle are set as the input values $x^{in}_1, x^{in}_2, \ldots, x^{in}_{n-1}, x^{in}_n$. In this case, the number of nodes in the input layer (L=1) of the auto-encoder, the number of nodes in the output layer (L=5) of the auto-encoder, and the number of nodes in the input layer (L=1) of the neural network 20 illustrated in FIG. 8 are at least several hundred.

Meanwhile, in the example illustrated in FIG. 6C, the integral values (even a negative integral value is considered as a positive value) of the filtered output values of the knocking sensor 18, for example, the integral values of the filtered output values of the knocking sensor 18 within a predetermined crank angle are set as the input values $x^{in}_1, x^{in}_2, \ldots, x^{in}_{n-1}, x^{in}_n$. In the embodiment of the present disclosure, the range from the compression top dead center to 90 degrees after the compression top dead center is divided into 18 sections at every 5 degrees of the crank angle, the integral values (even a negative integral value is considered as a positive value) of the filtered output values of the knocking sensor 18 in the respective divided sections are set as the input values $x^{in}_1, x^{in}_2, \ldots, x^{in}_{n-1}, x^{in}_n$. In this case, the number of nodes in the input layer (L=1) of the auto-encoder, the number of nodes in the output layer (L=5) of the auto-encoder, and the number of nodes in the input layer (L=1) of the neural network 20 illustrated in FIG. 8 are respectively 18.

In the auto-encoder illustrated in FIG. 12, the weight is learned so that the input values $x^{in}_1, x^{in}_2, \ldots, x^{in}_{n-1}, x^{in}_n$ appear as the corresponding output values $x^{out}_1, x^{out}_2, \ldots, x^{out}_{n-1}, x^{out}_n$ without changing. The learning of the weight of the auto-encoder is performed using the learning device 23 illustrated in FIG. 5. Further, a training dataset created by using the input values $x_1, x_2, \ldots, x_{m-1}, x_m$ of the training dataset illustrated in FIG. 9 without changing can be used as a training dataset for learning the weight of the auto-encoder. Moreover, a training dataset created by using the newly obtained output values of the knocking sensor 18 or using the integral values of the newly obtained output values of the knocking sensor 18 can also be used. When the weight of the auto-encoder is learned, the number of nodes in the input layer (L=1), the number of nodes in each hidden layer (L=2, L=3, L=4), and number of nodes in the output layer (L=5) of the auto-encoder illustrated in FIG. 12 are stored in the memory 24 of the learning device 23 together with, for example, the input values $x_1, x_2, \ldots, x_{n-1}, x_n$ of the training dataset illustrated in FIG. 9. The weight of the auto-encoder is learned using the learning processing routine as illustrated in FIG. 10 in the learning device 23.

At this time, the input values $x_1, x_2, \ldots, x_{n-1}, x_n$ of the training dataset illustrated in FIG. 9 are input to respective nodes in the input layer (L=1) of the auto-encoder as the input values $x^{in}_1, x^{in}_2, \ldots, x^{in}_{n-1}, x^{in}_n$. The learning of the weight of the auto-encoder is continuously performed until the ESS E between the output values $x^{out}_1, x^{out}_2, \ldots, x^{out}_{n-1}, x^{out}_n$ and the corresponding input values $x^{in}_1, x^{in}_2, \ldots, x^{in}_{n-1}, x^{in}_n$ becomes equal to or smaller than a preset error. When the ESS E becomes equal to or smaller than the preset error, the learned weight of the auto-encoder is stored in the memory 24 of the learning device 23. As a result, the normal signal generation model 60 including the learned auto-encoder is generated.

In this way, in the auto-encoder pre-learned such that the input value matches the output value, the feature of the input data is extracted in the hidden layer by performing the dimension reduction of the input data, and the output data representing the extracted feature is output from the auto-encoder. Therefore, even when the noise is superimposed on the input data, the noise is not regarded as a feature of the input data, and thus the output data that does not include the noise, i.e. the output data from which the noise has been removed, is output from the auto-encoder. Describing the embodiment of the present disclosure, even when the vibration of the engine for which the weight has not been learned, i.e. the unlearned engine vibration, is superimposed on the output value of the knocking sensor 18 in the learned auto-encoder used in the embodiment of the present disclosure, the noise-removed output value from which the unlearned engine vibration value included in the output value of the knocking sensor 18, i.e. the unlearned noise component value has been removed is output from the learned auto-encoder. Therefore, the false determination that the vibration occurs in the engine body 1 due to the occurrence of the knocking is prevented using the output value of the learned auto-encoder, even when the vibration of the engine for which the weight has not been learned, i.e. unlearned engine vibration, occurs.

Thus, in the embodiment of the present disclosure, the normal signal generation model 60 pre-learned to output the noise-removed output value from which the unlearned noise component value included in the output value has been removed when receiving the output value of the knocking sensor 18 that detects the vibration of the engine body 1 is used. The auto-encoder as illustrated in FIG. 12 is used as the normal signal generation model 60. In this case, a variational auto-encoder or a generative adversarial network can be used as the normal signal generation model 60 instead of the auto-encoder illustrated in FIG. 12.

Meanwhile, as described above, in the embodiment of the present disclosure, the training dataset illustrated in FIG. 9 is created using the output value of the knocking sensor 18, or using the integral value of the output value of the knocking sensor 18, based on which the weight of the neural network 20 is learned. In this case, the weight of the neural network 20 can also be learned using the output value of the learned auto-encoder, i.e. the output value of the normal signal generation model 60. In this case, the training dataset illustrated in FIG. 9 is created, in which the output values $x^{out}_1, x^{out}_2, \ldots, x^{out}_{n-1}, x^{out}_n$ of the normal signal generation model 60 are set as the input values $x_1, x_2, \ldots, x_{n-1}, x_n$ of the training dataset illustrated in FIG. 9, whereby the weight of the neural network 20 is learned based on such a training dataset.

Figure 13:
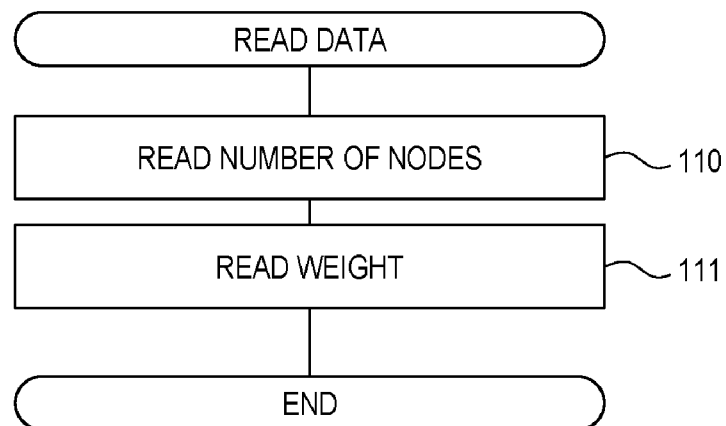
FIG. 13 is a flowchart illustrating a routine for reading data in an electronic control unit.

When the weight of the neural network 20 is learned, the learned neural network 20, i.e. the estimation model for the value representing knocking intensity is generated. In the embodiment of the present disclosure, the knocking processing is executed in the engine using this learned neural network 20, i.e. the estimation model for the value representing knocking intensity, for which the normal signal generation model 60 and the estimation model for the value representing knocking intensity are stored in the electronic control unit 30 illustrated in FIG. 1. FIG. 13 illustrates a routine for reading data in the electronic control unit, which is executed in the electronic control unit 30, in order to store the normal signal generation model 60 and the estimation model for the value representing knocking intensity in the electronic control unit 30.

In other words, as illustrated in FIG. 13, the number of nodes in the input layer (L=1), the number of nodes in the hidden layers (L=2, L=3), and the number of nodes in the output layer (L=4), of the neural network 20 illustrated in FIG. 8, are read in the memory 32 of the electronic control unit 30 in step 110. The neural network 20 as illustrated in FIG. 8 is created based on the number of nodes. Further, the number of nodes in the input layer (L=1), the number of nodes in the hidden layers (L=2, L=3, and L=4), and the number of nodes in the output layer (L=5), of the auto-encoder illustrated in FIG. 12, are read in the memory 32 of the electronic control unit 30. The auto-encoder as illustrated in FIG. 12 is created based on the number of nodes. Next, in step 111, the learned weight of the neural network 20 is read in the memory 32 of the electronic control unit 30. Accordingly, the learned neural network 20, i. e. the estimation model for the value representing knocking intensity is stored in the electronic control unit 30 of the engine. The learned weight of the auto-encoder is read in the memory 32 of the electronic control unit 30. As a result, the normal signal generation model 60 is stored in the electronic control unit 30 of the engine.

In a case where the normal signal generation model 60 and the learned neural network 20 are stored in the electronic control unit 30, when the filtered output value of the knocking sensor 18, or the integral values (even a negative integral value is considered as a positive value) of the filtered output values of the knocking sensor 18 in the respective sections divided at every 5 degrees of the crank angle are input to the normal signal generation model 60, and the output value of normal signal generation model 60 is input to the learned neural network 20, the estimated value for the value representing knocking intensity obtained from the output value of the pressure sensor 19 is output from the learned neural network 20. This estimated value for the value representing knocking intensity is extremely approximate to the actually measured value of the value representing knocking intensity, and thus, the knocking intensity can be accurately estimated from the output value of the knocking sensor 18.

Figure 14:
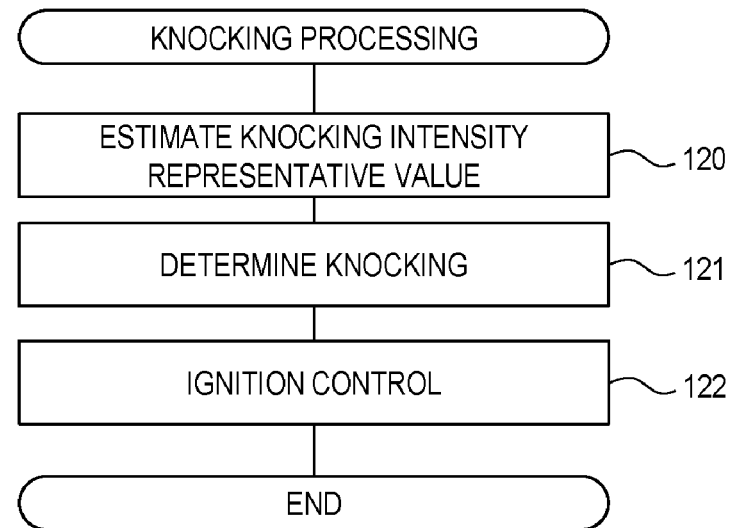
FIG. 14 is a flowchart illustrating a knocking processing routine.

Next, the knocking processing executed during the engine operation using the normal signal generation model 60 and the learned neural network 20 stored in the memory 32 of the electronic control unit 30 will be described. FIG. 14 illustrates a knocking processing routine executed during the engine operation. As illustrated in FIG. 14, when the knocking processing routine is executed, a processing of estimating a value representing knocking intensity obtained from the output value of the pressure sensor 19, i.e. a knocking intensity representative value, is executed in step 120. Next, a knocking determination processing is executed in step 121 to determine whether the knocking occurs. The ignition control is performed in step 122.

Figure 15:
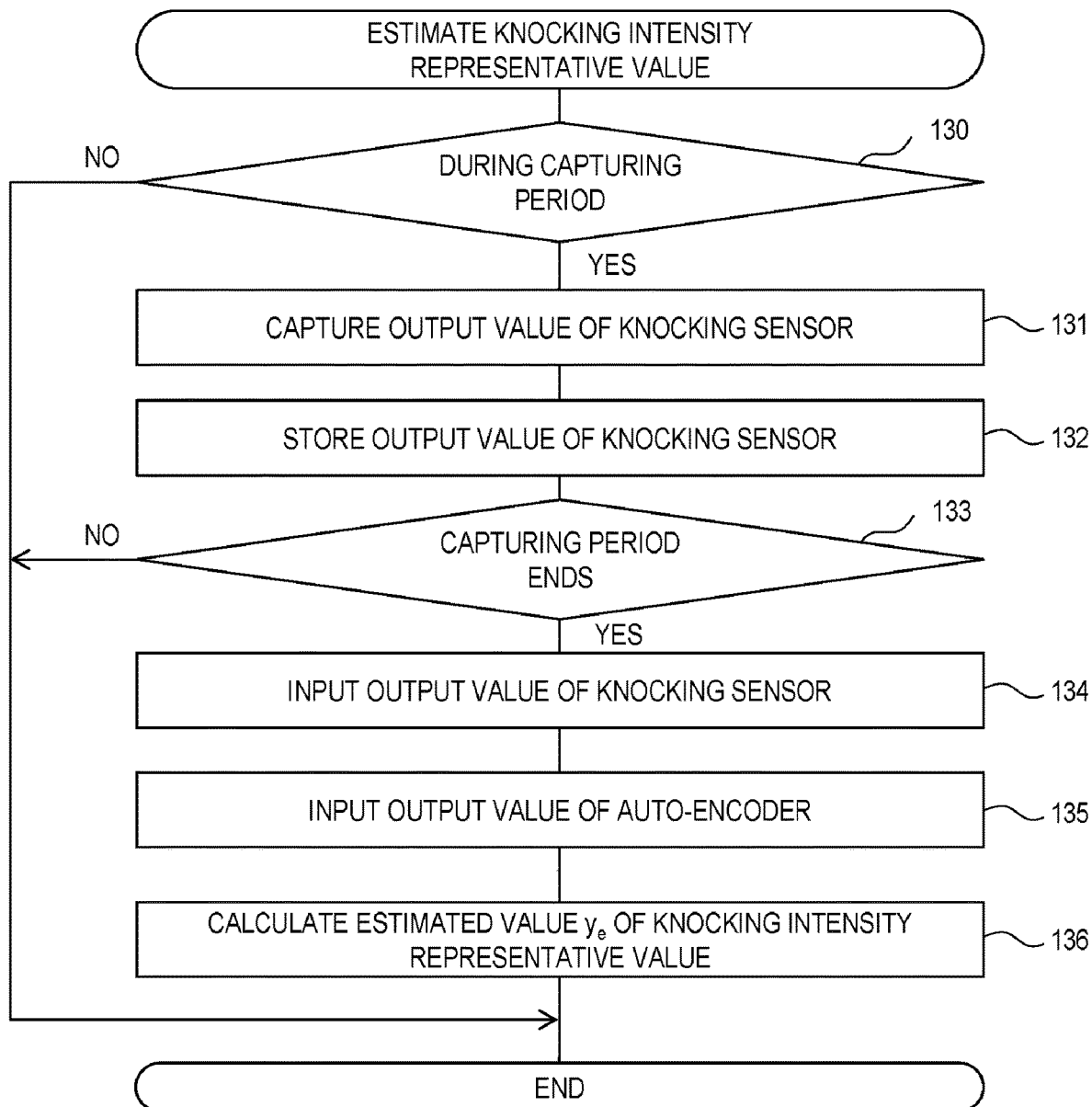
FIG. 15 is a flowchart illustrating an example of a routine for estimating a value representing knocking intensity.

FIG. 15 illustrates one example of a processing routine for estimating the knocking intensity representative value executed in step 120 of FIG. 14. This routine is executed by interruption at every predetermined crank angle or every predetermined time. Referring to FIG. 15, in step 130, it is determined whether the output signal of the knocking sensor 18 is being captured. In this example, the output signal of the knocking sensor 18 is captured for a period from the compression top dead center to 90 degrees after the compression top dead center. Therefore, when the crank angle is a degree before the compression top dead center, the processing cycle ends. When the crank angle is a degree after the compression top dead center, it is determined that the output signal of the knocking sensor 18 is being captured, and the processing proceeds to step 131.

In step 131, the output signal of the knocking sensor 18 is captured via the corresponding AD converter 36 and the digital bandpass filter 37 that passes only the input signal having a frequency of, for example, about 5 kHz to 25 kHz. That is, the filtered output value of the knocking sensor 18 is captured. Next, the captured filtered output value of the knocking sensor 18 is stored in the memory 32 of the electronic control unit 30 in step 132. In step 133, it is determined whether the period during which the output signal of the knocking sensor 18 is captured has ended. That is, it is determined whether the crank angle has reached 90 degrees after the compression top dead center. In step 133, when it is determined that the period during which the output signal of the knocking sensor 18 is captured has not ended, i.e. when it is determined that the crank angle has not reached 90 degrees after the compression top dead center, the processing cycle ends.

On the other hand, when it is determined that the period during which the output signal of the knocking sensor 18 is captured has ended, i.e. when it is determined that the crank angle has reached 90 degrees after the compression top dead center, in step 133, the processing proceeds to step 134. At this time, the memory 32 stores the filtered output values of the knocking sensor 18 as represented by black circles in FIG. 6B. In step 134, the filtered output value of the knocking sensor 18 stored in the memory 32 is input to the auto-encoder, i.e. the normal signal generation model 60. In step 135, the output values of the normal signal generation model 60, i.e. the output values $x^{out}_1, x^{out}_2, \ldots, x^{out}_{n-1}, x^{out}_n$ of the auto-encoder, are input to respective nodes in the input layer (L=1) of the learned neural network 20. At this time, the estimated value $y_e$ for the value representing knocking intensity is output from the learned neural network 20, and thus, as shown in step 136, the estimated value $y_e$ for the value representing knocking intensity is calculated.

Figure 16:
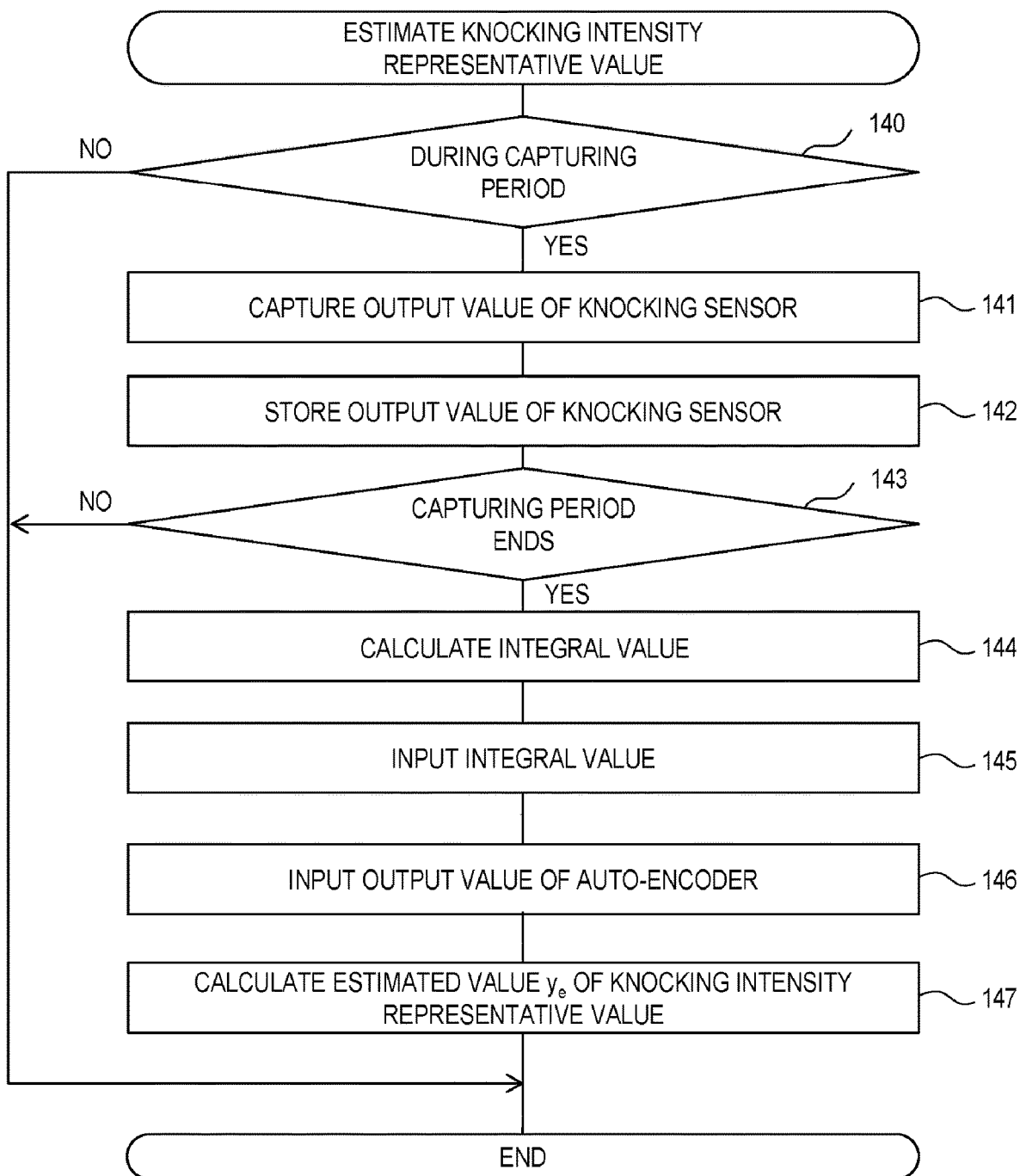
FIG. 16 is a flowchart illustrating another example of the routine for estimating the value representing knocking intensity.

FIG. 16 illustrates another example of the processing routine for estimating the knocking intensity representative value executed in step 120 of FIG. 14. This routine is executed by interruption at every predetermined crank angle or every predetermined time. Steps 140 to 143 in FIG. 16 are the same as steps 130 to 133 in FIG. 15. In other words, referring to FIG. 16, it is determined whether the output signal of the knocking sensor 18 is being captured in step 140. In this example, the output signal of the knocking sensor 18 is also captured for a period from the compression top dead center to 90 degrees after the compression top dead center. Therefore, when the crank angle is a degree before the compression top dead center, the processing cycle ends. When the crank angle is a degree after the compression top dead center, it is determined that the output signal of the knocking sensor 18 is being captured, and the processing proceeds to step 141.

In step 141, the output signal of the knocking sensor 18 is captured via the corresponding AD converter 36 and the digital bandpass filter 37 that passes only the input signal having a frequency of, for example, about 5 kHz to 25 kHz. That is, the filtered output value of the knocking sensor 18 is captured. Next, the captured filtered output value of the knocking sensor 18 is stored in the memory 32 of the electronic control unit 30 in step 142. In step 143, it is determined whether the period during which the output signal of the knocking sensor 18 is captured has ended. That is, it is determined whether the crank angle has reached 90 degrees after the compression top dead center. In step 143, when it is determined that the period during which the output signal of the knocking sensor 18 is captured has not ended, i.e. when it is determined that the crank angle has not reached 90 degrees after the compression top dead center, the processing cycle ends.

On the other hand, when it is determined that the period during which the output signal of the knocking sensor 18 is captured has ended, i.e. when it is determined that the crank angle has reached 90 degrees after the compression top dead center, in step 143, the processing proceeds to step 144. In step 144, as described with reference to FIG. 6C, the integral values (even a negative integral value is considered as a positive value) of the filtered output values of the knocking sensor 18 in the respective sections divided at every 5 degrees of the crank angle are calculated based on the filtered output value of the knocking sensor 18 stored in the memory 32. In step 145, the calculated integral values of the filtered output values of the knocking sensor 18 are respectively input to the auto-encoder, i.e. the normal signal generation model 60. In step 146, the output values of the normal signal generation model 60, i.e. the output values $x^{out}_1, x^{out}_2, \ldots, x^{out}_{n-1}, x^{out}_n$ of the auto-encoder, are input to respective nodes in the input layer (L=1) of the learned neural network 20. At this time, the estimated value $y_e$ for the value representing knocking intensity is output from the learned neural network 20, and thus, as shown in step 147, the estimated value $y_e$ for the value representing knocking intensity is calculated.

Figure 17:
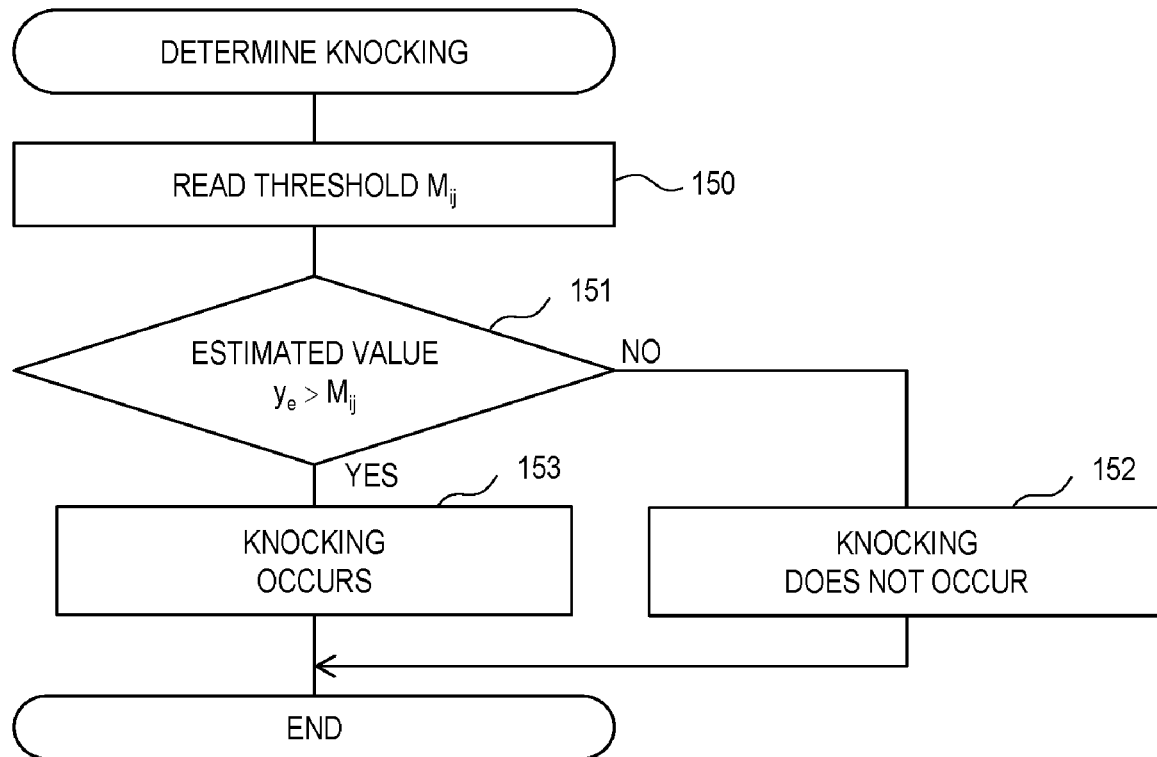
FIG. 17 is a flowchart illustrating a knocking determination routine.
Figure 18:
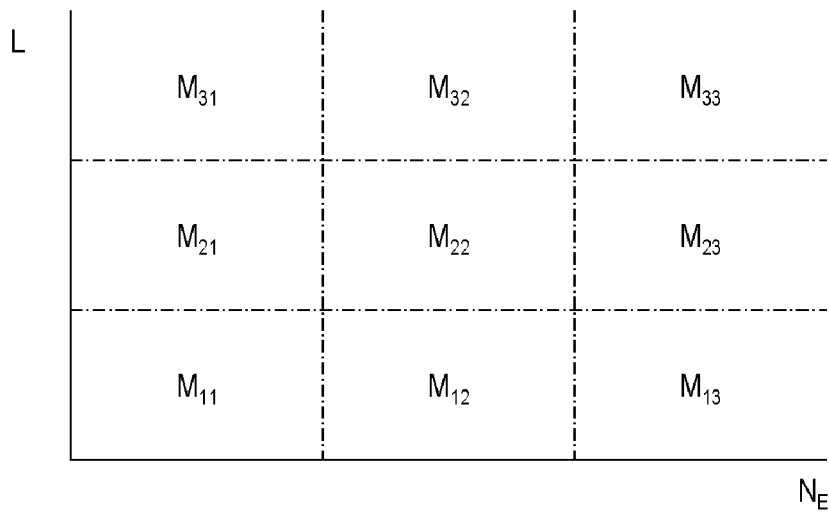
FIG. 18 is a diagram illustrating a threshold $M_{ij}$.

FIG. 17 illustrates a knocking determination routine executed in the electronic control unit 30, based on the estimated value $y_e$ for the knocking intensity representative value calculated in step 136 of FIG. 15, or the estimated value $y_e$ for the knocking intensity representative value calculated in step 147 of FIG. 16. This routine is executed by interruption at every predetermined crank angle. Referring to FIG. 17, a threshold $M_{ij}$ for the knocking intensity representative value is read in step 150. The threshold $M_{ij}$ is set in advance for each of engine operating regions divided according to engine load L and engine speed $N_E$, as illustrated in FIG. 18.

It is determined whether the calculated estimated value $y_e$ for the knocking intensity representative value is larger than the threshold $M_{ij}$ in step 151. When it is determined that the calculated estimated value $y_e$ for the knocking intensity representative value is equal to or smaller than the threshold $M_{ij}$, the processing proceeds to step 152, in which it is determined that the knocking has not occurred and then the processing cycle ends. Hereinafter, when the estimated value $y_e$ for the knocking intensity representative value is equal to or smaller than the threshold $M_{ij}$, it is said that the knocking does not occur for the sake of convenience even when weak knocking occurs. On the other hand, when it is determined that the calculated estimated value $y_e$ for the knocking intensity representative value is larger than the threshold $M_{ij}$, the processing proceeds to step 153, in which it is determined that the knocking occurs and then the processing cycle ends.

Figure 19:
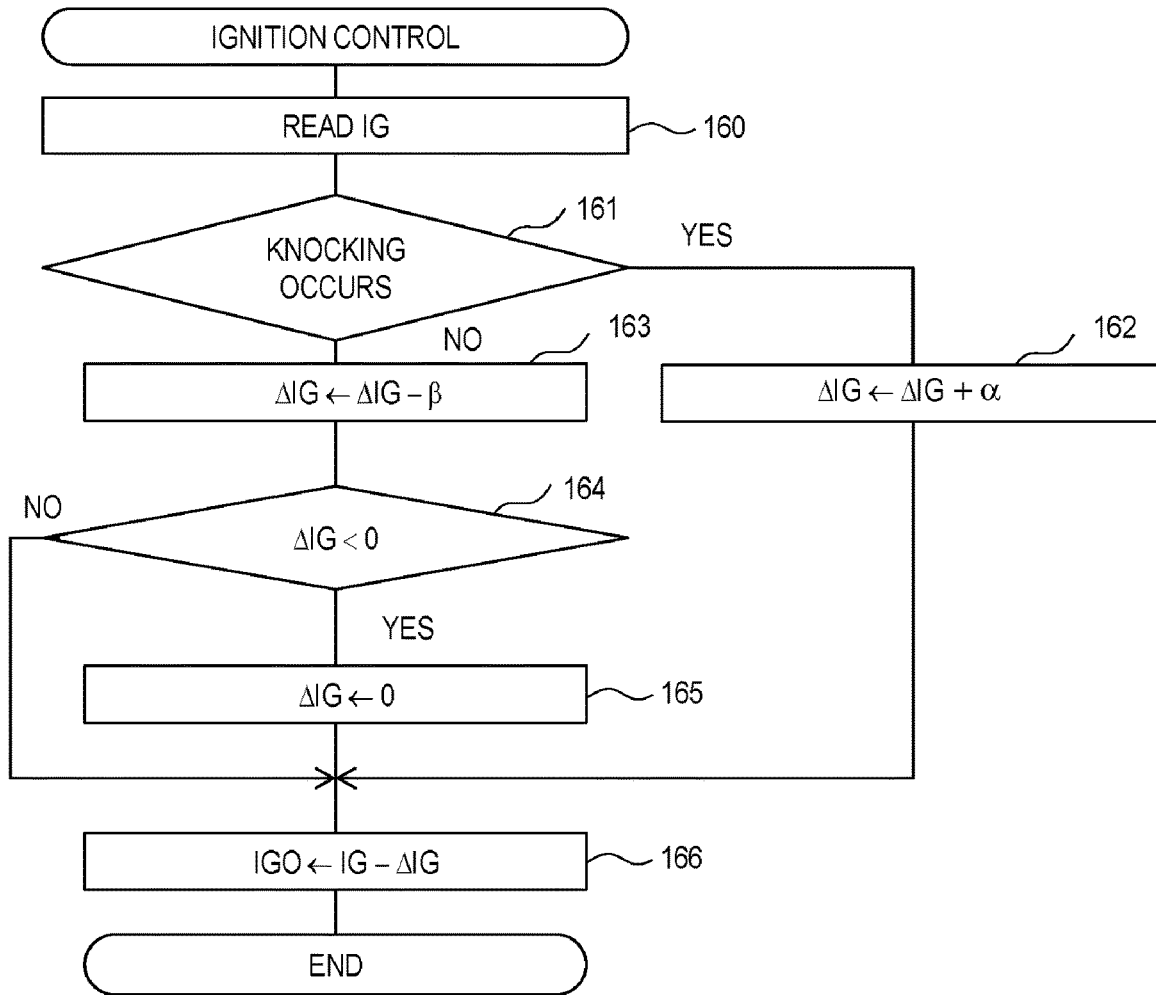
FIG. 19 is a flowchart illustrating an ignition control routine.
Figure 20:
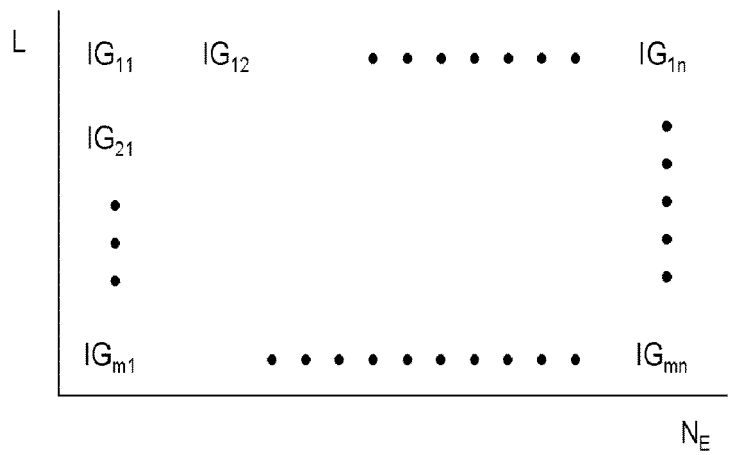
FIG. 20 is a diagram illustrating a map of reference ignition timing.

FIG. 19 illustrates an ignition control routine executed in the electronic control unit 30 based on the determination result in the knocking determination routine illustrated in FIG. 17. This routine is executed by interruption at every predetermined crank angle. Referring to FIG. 19, a reference ignition timing IG (BTDC) is calculated in step 160. The reference ignition timing IG is stored in the memory 32 in advance as a function of the engine load L and the engine speed $N_E$ in the form of a map as illustrated in FIG. 20. Next, it is determined whether the knocking has occurred based on the determination result in the knocking determination routine illustrated in FIG. 17 in step 161. When it is determined that the knocking has occurred, the processing proceeds to step 162.

In step 162, a certain amount α is added to an ignition timing retarded amount ΔIG to retard the ignition timing. Next, a final ignition timing IGO is calculated by subtracting the ignition timing retarded amount ΔIG from the reference ignition timing IG in step 166. Based on this final ignition timing IGO, the ignition action by the spark plug 11 is controlled. At this time, the ignition timing is retarded by the certain amount α. On the other hand, when it is determined that the knocking has not occurred in step 161, the processing proceeds to step 163 in which a certain amount β is subtracted from the ignition timing retarded amount ΔIG to advance the ignition timing.

It is determined whether the ignition timing retarded amount ΔIG is negative in step 164. When the ignition timing retarded amount ΔIG is not negative, the processing proceeds to step 166, in which the final ignition timing IGO is calculated. At this time, the ignition timing is advanced by the certain amount β. In the embodiment of the present disclosure, the certain amount α is set to a value larger than that of the certain amount β. In other words, the retarded amount α is set to a value larger than that of the advanced amount β. On the other hand, when it is determined in step 164 that the ignition timing retarded amount ΔIG is negative, the processing proceeds to step 165, in which the ignition timing retarded amount ΔIG is set to zero, and then the processing proceeds to step 166. At this time, the ignition timing is set as the reference ignition timing IG.

Figure 21:
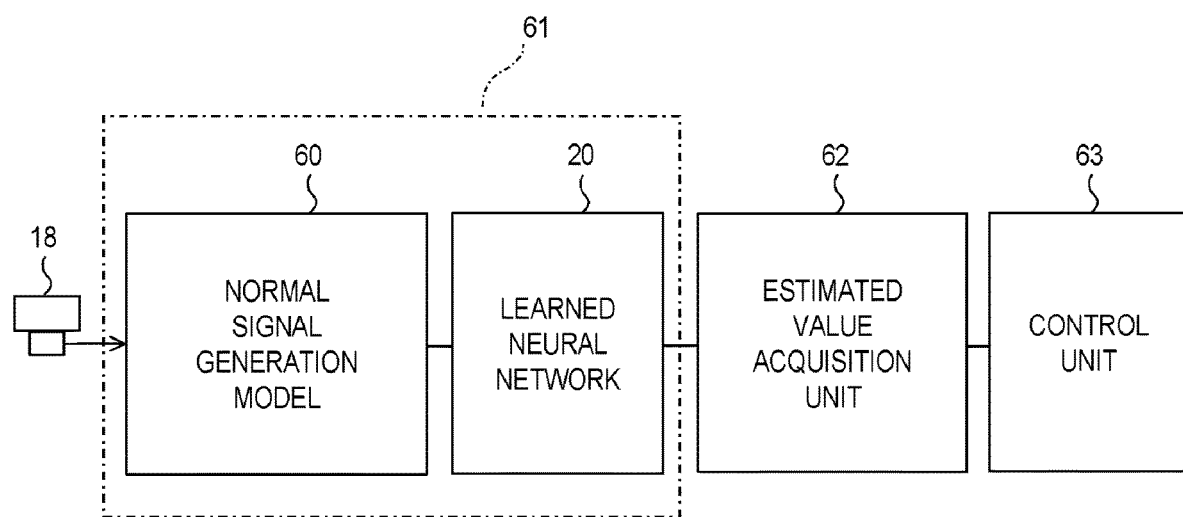
FIG. 21 is a functional configuration diagram of the present disclosure.

In the embodiment of the present disclosure, as illustrated in FIG. 21, the storage unit 61 is provided, which stores the normal signal generation model 60 pre-learned to output the noise-removed output value from which the unlearned noise component value included in the output value has been removed when receiving the output value of the knocking sensor 18 that detects the vibration of the engine body 1, and the learned neural network 20 pre-learned to output the estimated value for the knocking intensity representative value, originally obtained from the output value of the pressure sensor 19 that detects the combustion pressure of the air-fuel mixture generated by ignition, when receiving one of the output value of the knocking sensor and the noise-removed output value of the normal signal generation model. Further, provided are an estimated value acquisition unit 62 that inputs the output value of the knocking sensor 18 acquired during the engine operation to the normal signal generation model 60 and inputs the noise-removed output value output from the normal signal generation model 60 to the learned neural network 20, thereby acquiring the estimated value for the knocking intensity representative value output from the learned neural network 20, and a control unit 63 that executes retarding control of the ignition timing based on the estimated value for the knocking intensity representative value acquired in the estimated value acquisition unit 62. In this case, in the embodiment of the present disclosure, the normal signal generation model 60 includes the auto-encoder.

Moreover, in the embodiment of the present disclosure, the knocking intensity representative value is a peak value of the output value of the pressure sensor 19, or the knocking intensity representative value is an integral value of the output value of the pressure sensor 19 within a preset period. In this case, the preset period is a predetermined crank angle range, for example, a range from the compression top dead center to 90 degrees after the compression top dead center.

Meanwhile, in the embodiment of the present disclosure, the output value of the knocking sensor 18 is an output value within a preset period, or the output value of the knocking sensor 18 is an integral value of the output values of the knocking sensor within equally divided sections of the preset period. In this case, the preset period is a predetermined crank angle range, for example, a range from the compression top dead center to 90 degrees after the compression top dead center. The integral value of the output value of the knocking sensor 18 may be, for example, integral values (even a negative integral value is considered as a positive value) of the filtered output values of the knocking sensor 18 in the respective sections divided at every 5 degrees of the crank angle.

As described above, even when the vibration of the engine for which the weight has not been learned, i.e. the unlearned engine vibration is superimposed on the output value of the knocking sensor 18 in the normal signal generation model 60 used in the embodiment of the present disclosure, the normal signal generation model 60 outputs the noise-removed output value from which the unlearned engine vibration value included in the output value of the knocking sensor 18, i.e. the unlearned noise component value has been removed. In other words, even in a case where the ignition timing control device provided with the normal signal generation model 60, the learned neural network 20, the estimated value acquisition unit 62, and the control unit 63 illustrated in FIG. 21 is used in the commercially available internal combustion engine, the noise-removed output value from which the unlearned engine vibration value included in the output value of the knocking sensor 18, i.e. the unlearned noise component value has been removed is output from the normal signal generation model 60.

Therefore, even when the ignition timing control device illustrated in FIG. 21 is used in the commercially available internal combustion engine, at which the vibration of the engine for which the weight has not been learned, i.e. the unlearned engine vibration occurs, it is possible to prevent the false determination that the vibration occurs in the engine body 1 due to the occurrence of the knocking. As described above, the ignition timing control device illustrated in FIG. 21 has a great advantage that it is possible to prevent the false determination that the vibration occurs in the engine body 1 due to the occurrence of the knocking. Further, in a case where the ignition timing control device illustrated in FIG. 21 is used in the commercially available internal combustion engine, the normal signal generation model 60 and the learned neural network 20 are stored in the electronic control unit 30 of the commercially available internal combustion engine using the data reading routine in the electronic control unit illustrated in FIG. 13.

The ignition timing control device illustrated in FIG. 21 has a great advantage that it is possible to prevent the false determination that the vibration occurs in the engine body 1 due to the occurrence of the knocking, and thus, the use of the ignition timing control device illustrated in FIG. 21 is sufficient to accurately detect the vibration of the engine body in some cases. However, in practice, it is difficult to completely remove the unlearned noise component value included in the output value of the knocking sensor 18 by the normal signal generation model 60. Therefore, although it is possible to prevent the false determination that the vibration occurs in the engine body 1 due to the occurrence of the knocking, the false determination may need to be further prevented. Therefore, a second embodiment that can further prevent the false determination that the vibration occurs in the engine body 1 due to the occurrence of the knocking will be described hereinbelow.

Figure 22:
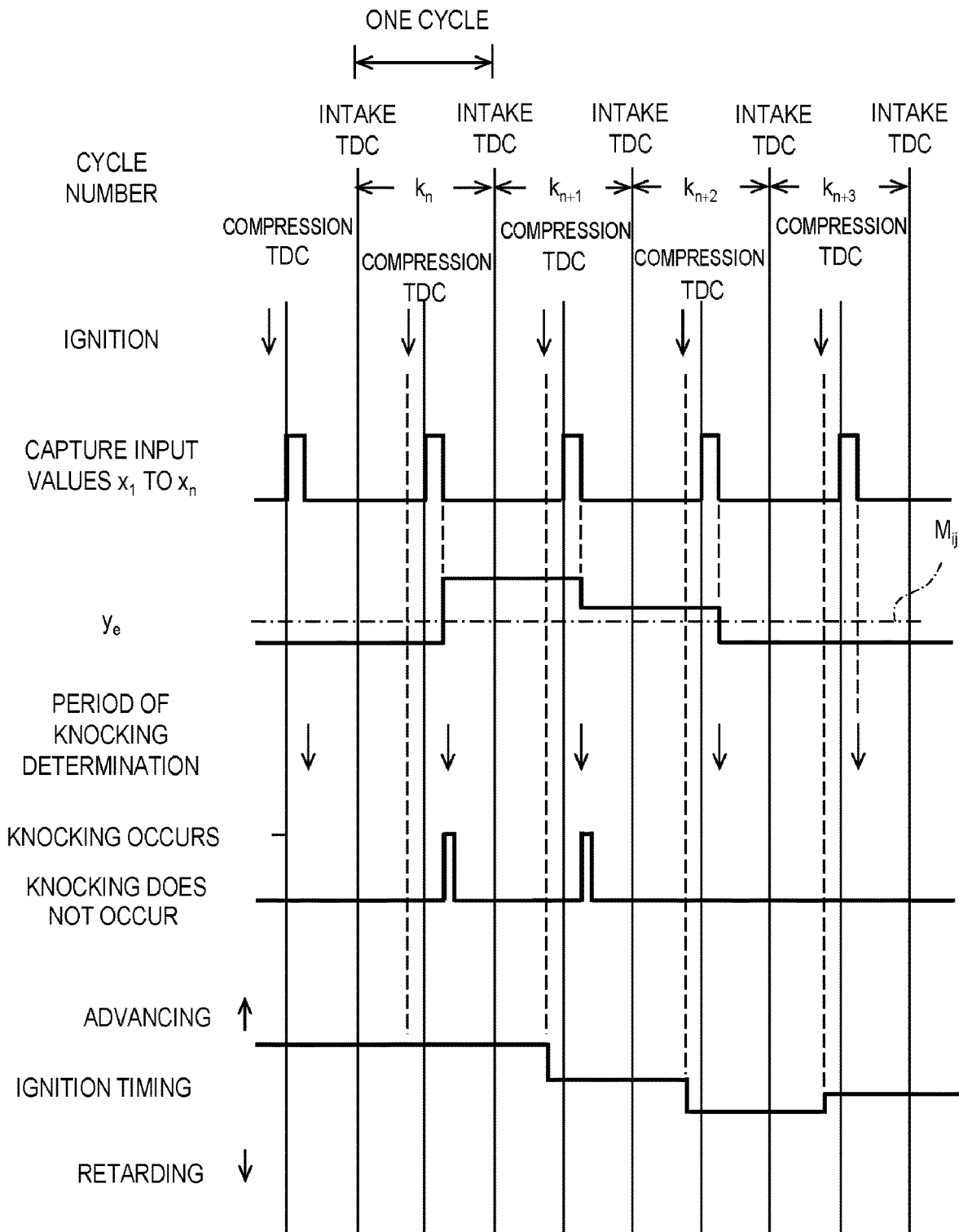
FIG. 22 is a diagram illustrating an outline of knocking processing.

Describing the second embodiment, a knocking processing executed in the internal combustion engines illustrated in FIGS. 1 and 5 will be described. In the second embodiment, the neural network 20 and the learned neural network 20 are referred to as a first neural network 20 and a first learned neural network 20, respectively. The knocking processes illustrated in FIGS. 14 to 17, and 19 are executed independently for each cylinder, and FIG. 22 illustrates one example of the knocking processing in any one cylinder. FIG. 22 illustrates a cycle number, a timing at which the ignition is performed, a period during which the input values $x_1$, $x_2$, ..., $x_{n-1}$, $x_n$ are captured to the first learned neural network 20, the estimated value $y_e$ for the knocking intensity representative value output from the first learned neural network 20, a knocking determination timing at which it is determined whether the knocking has occurred, the knocking determination result, and the ignition timing.

In the embodiment of the present disclosure, it takes a 720-degree crank angle from the intake top dead center TDC to the next intake top dead center TDC to complete 1 cycle. The cycles are numbered $k_1$, $k_2$, ..., $k_n$, $k_{n+1}$, $k_{n+2}$, $k_{n+3}$ ... from when the engine operation is started. FIG. 22 illustrates a case where these cycle numbers are $k_n$, $k_{n+1}$, $k_{n+2}$, and $k_{n+3}$. For better understanding of the knocking processing, the description thereof will be provided using these cycle numbers $k_n$, $k_{n+1}$, $k_{n+2}$, $k_{n+3}$. In the embodiment of the present disclosure, each time a position of a piston 4 reaches the compression top dead center TDC, the knocking processing illustrated in FIG. 14 is executed. When the knocking processing is executed, the routine for estimating the knocking intensity representative value illustrated in FIG. 15 or FIG. 16 is executed, and the output values of the normal signal generation model 60, i.e. the output values $x^{out}_1$, $x^{out}_2$, ..., $x^{out}_{n-1}$, $x^{out}_n$ of the auto-encoder are input to the first learned neural network 20.

When the output values $x^{out}_1$, $x^{out}_2$, ..., $x^{out}_{n-1}$, $x^{out}_n$ of the auto-encoder are input to the first learned neural network 20, the estimated value $y_e$ for the knocking intensity representative value is output from the first learned neural network 20. When the estimated value $y_e$ for the knocking intensity representative value is output from the first learned neural network 20, the knocking determination routine illustrated in FIG. 17 is executed to determine whether the knocking has occurred. At this time, when the estimated value $y_e$ for the knocking intensity representative value exceeds the threshold $M_{ij}$, it is determined that the knocking has occurred. When it is determined whether the knocking has occurred, an ignition control routine illustrated in FIG. 19 is executed.

As illustrated in FIG. 22, when the estimated value $y_e$ for the knocking intensity representative value exceeds the threshold $M_{ij}$, the ignition timing is retarded in the next cycle. When the ignition timing is retarded, the estimated value $y_e$ for the knocking intensity representative value decreases to or below the threshold $M_{ij}$ in many cases. On the other hand, although the ignition timing is retarded, the estimated value $y_e$ for the knocking intensity representative value may not decrease to or below the threshold $M_{ij}$. FIG. 22 illustrates an example where the estimated value $y_e$ for the knocking intensity representative value does not decrease to or below the threshold $M_{ij}$ even when the ignition timing is retarded.

In other words, in the example illustrated in FIG. 22, when a cycle is a cycle of the number $k_n$, it is determined that the estimated value $y_e$ for the knocking intensity representative value has exceeded the threshold $M_{ij}$, whereby the ignition timing is retarded in the next cycle $k_{n+1}$. In the next cycle $k_{n+1}$, it is determined that the estimated value $y_e$ for the knocking intensity representative value has exceeded the threshold $M_{ij}$, whereby the ignition timing is retarded in the further next cycle $k_{n+2}$. When the ignition timing is retarded in cycle $k_{n+2}$, the estimated value $y_e$ for the knocking intensity representative value drops below the threshold $M_{ij}$, thereby determining that the knocking does not occur. When it is determined that knocking does not occur, the ignition timing is advanced in the next cycle $k_{n+3}$, and the ignition timing is continuously advanced unless the knocking occurs. As can be seen from FIG. 22, in the embodiment of the present disclosure, the advanced amount is smaller than the retarded amount.

As described above, the internal combustion engine illustrated in FIG. 5 is the internal combustion engine in which the pressure sensor 19 is attached to the internal combustion engine illustrated in FIG. 1 for learning of the weight of the first neural network 20. In the internal combustion engine illustrated in FIG. 1 or FIG. 5, when the knocking processing as described with reference to FIG. 22 is executed using the normal signal generation model 60 and the first learned neural network 20, no problem arises. However, in other internal combustion engines, such as the commercially available internal combustion engine, the knocking processing as described referring FIG. 22 is executed using the normal signal generation model 60 and the first learned neural network 20, whereby a problem arises even when the normal signal generation model 60 is used. Therefore, what kind of problem arises will be described with reference to FIGS. 23A to 26.

Figure 23A:
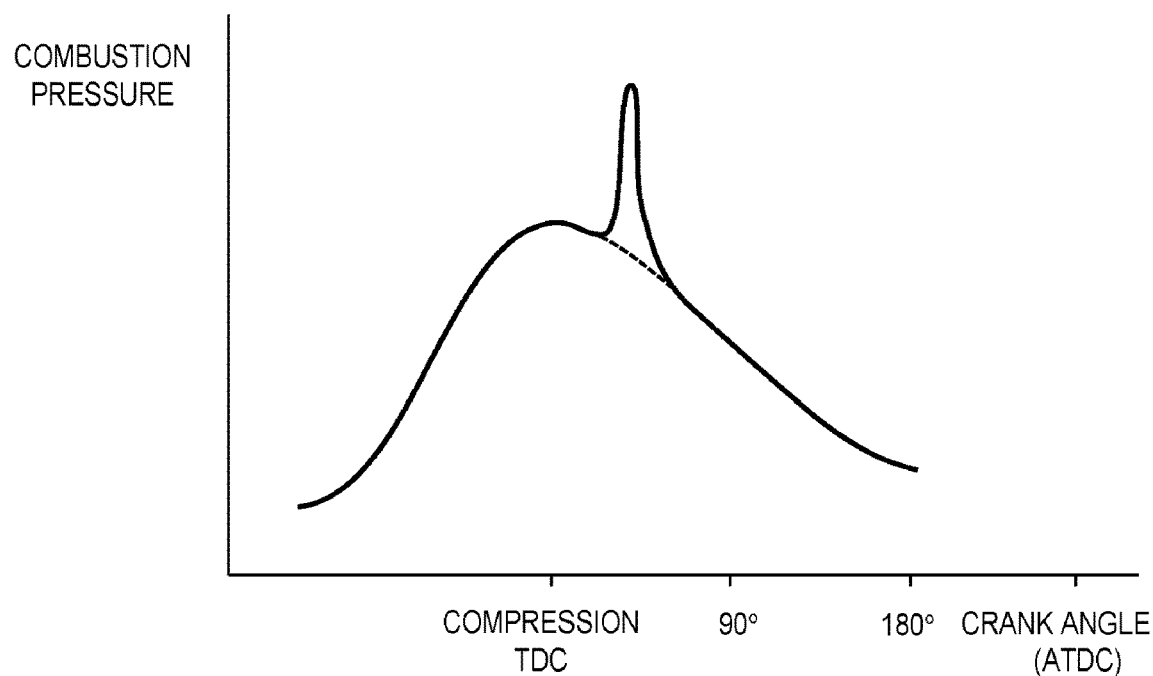
FIG. 23A is a graph for describing a combustion pressure when the knocking occurs.
Figure 23B:
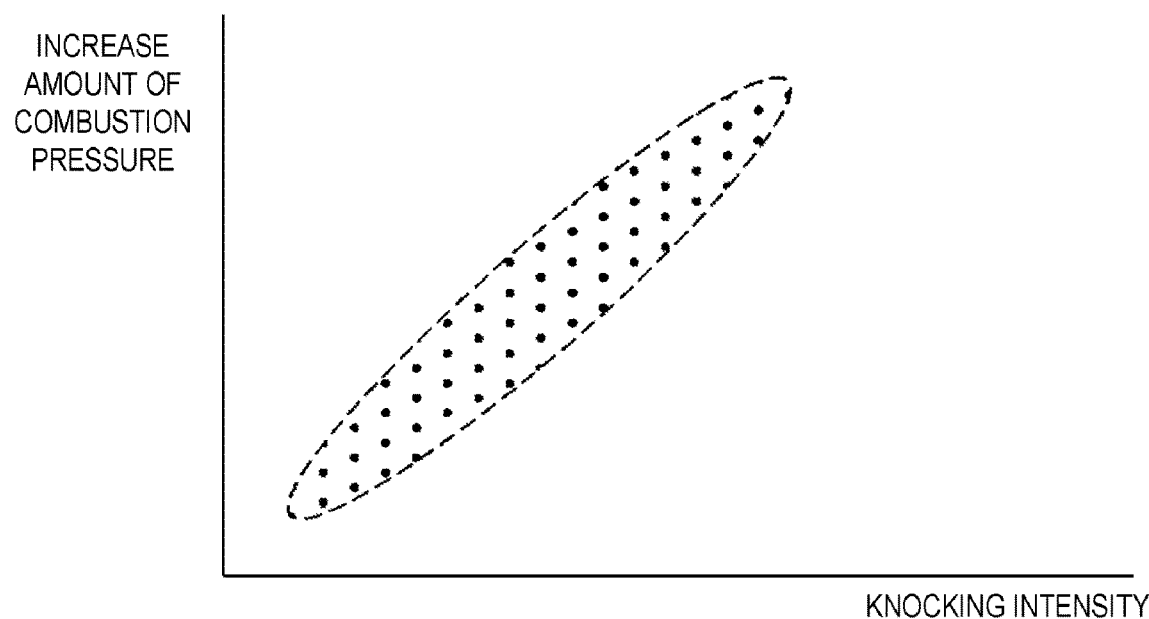
FIG. 23B is another graph for describing a combustion pressure when the knocking occurs.

FIG. 23A illustrates a correlation between a combustion pressure in the combustion chamber 5 and a crank angle (ATDC). In FIG. 23A, a solid line represents fluctuations in the combustion pressure in the combustion chamber 5 when the knocking occurs, and a dashed line represents fluctuations in the combustion pressure in the combustion chamber 5 when the knocking does not occur. As can be seen from FIG. 23A, when the knocking occurs, the combustion pressure in the combustion chamber 5 rapidly increases after the compression top dead center TDC. FIG. 23B illustrates a correlation between an actual increase amount of the combustion pressure in the combustion chamber 5 and the knocking intensity at each point. As illustrated in FIG. 23B, as the increase amount of combustion pressure in the combustion chamber 5 increases, the knocking intensity increases. In other words, as the increase amount of the combustion pressure in the combustion chamber 5 increases, the estimated value $y_e$ for the knocking intensity representative value increases. Therefore, the input value and output value of the first learned neural network 20 indicate the correlation between the increase amount of the combustion pressure in the combustion chamber 5 and the knocking intensity.

Figure 24:
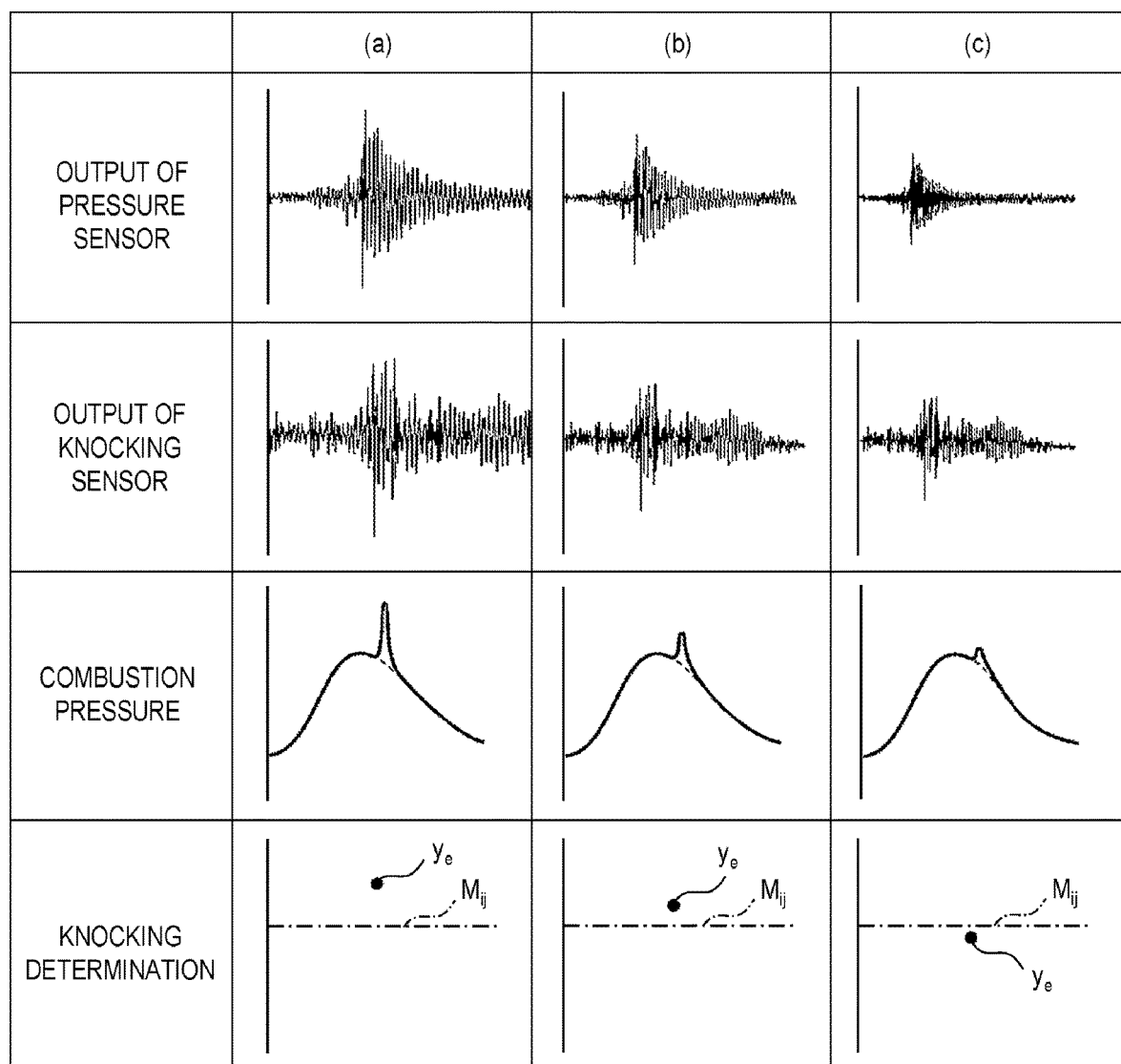
FIG. 24 is a table of diagrams for describing knocking determination.
Figure 25A:
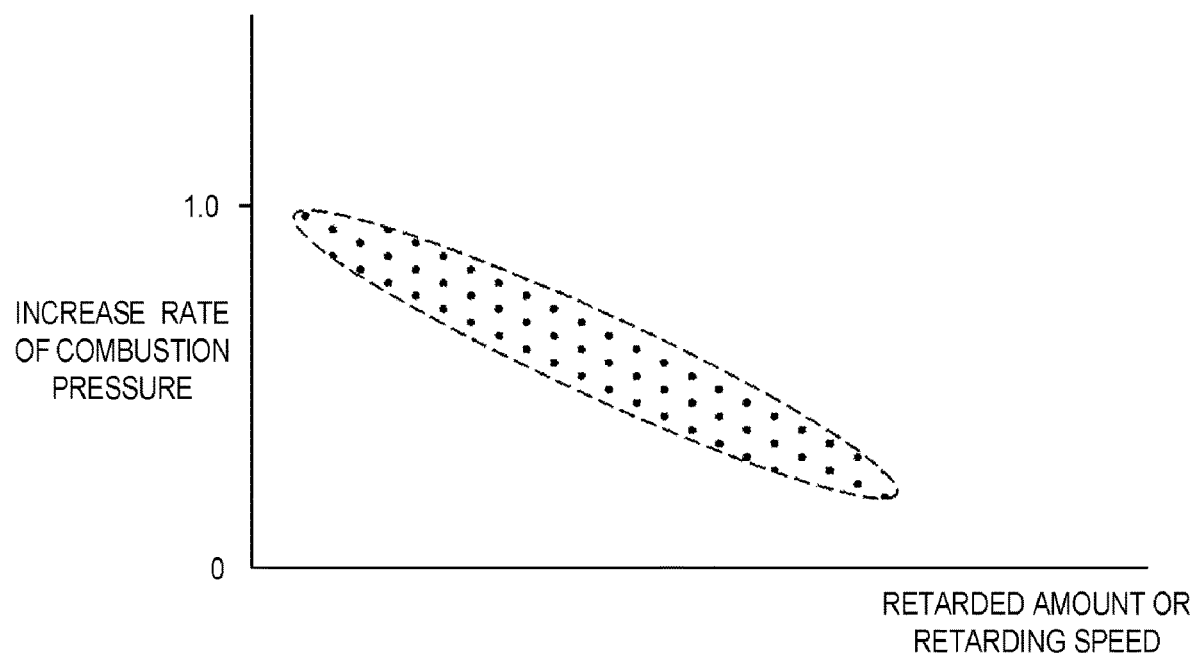
FIG. 25A is a graph illustrating a correlation between an ignition retarded amount or an ignition retarding speed and an increase rate of combustion pressure.
Figure 25B:
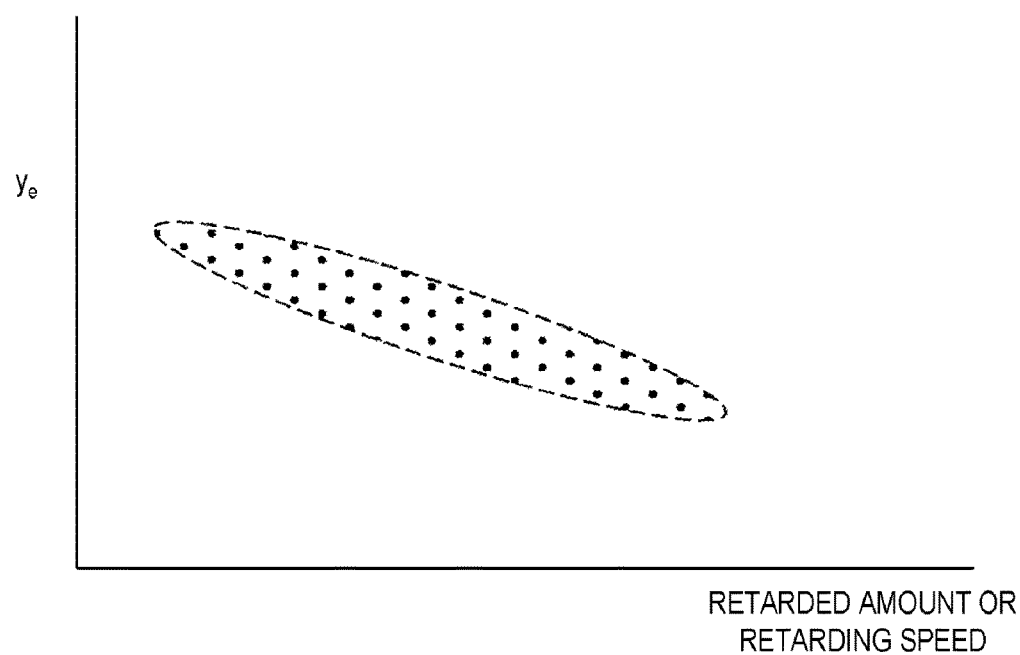
FIG. 25B is a graph illustrating a correlation between the ignition retarded amount or the ignition retarding speed and an estimated value $y_e$ for the value representing knocking intensity.

FIG. 24 illustrates fluctuations of each value, i.e. the output value of the pressure sensor 19, the output value of the knocking sensor 18, the combustion pressure in the combustion chamber 5, and the estimated value $y_e$ for the knocking intensity representative value, when the knocking processing illustrated in FIG. 22 is executed using the normal signal generation model 60 and the first learned neural network 20 in the internal combustion engine illustrated in FIG. 5. In FIG. 24, (a) illustrates fluctuations in these values in the cycle $k_n$ of FIG. 22, (b) illustrates fluctuations in these values in the cycle $k_{n+1}$ of FIG. 22, and (c) illustrate fluctuations in these values in cycle $k_{n+2}$ of FIG. 22. As can be seen from FIG. 22, as the cycle shifts to $k_{n+1}$ and then to $k_{n+2}$, the ignition timing is gradually retarded. As can be seen from FIG. 24, as the cycle shifts to $k_{n+1}$ and then to $k_{n+2}$, the output value of the pressure sensor 19, the output value of the knocking sensor 18, the increase amount of the combustion pressure in the combustion chamber 5, and the estimated value $y_e$ for the knocking intensity representative value gradually decrease, respectively.

Referring to FIGS. 22 and 24, it is understood that when the ignition timing retarded amount ΔIG increases, the increase amount of the combustion pressure in the combustion chamber 5 and the estimated value $y_e$ for the knocking intensity representative value decrease. In this case, it is also known that increasing an ignition timing retarding speed decreases the increase amount of the combustion pressure in combustion chamber 5 and the estimated value $y_e$ for the knocking intensity representative value. That is, as represented by each point in FIG. 25A, it is known that increasing the retarded amount or the retarding speed of the ignition timing decreases the increase rate of the combustion pressure in the combustion chamber 5, and as represented by each point in FIG. 25B, increasing the retarded amount or the retarding speed of the ignition timing decreases the estimated value $y_e$ for the knocking intensity representative value.

Figure 26:
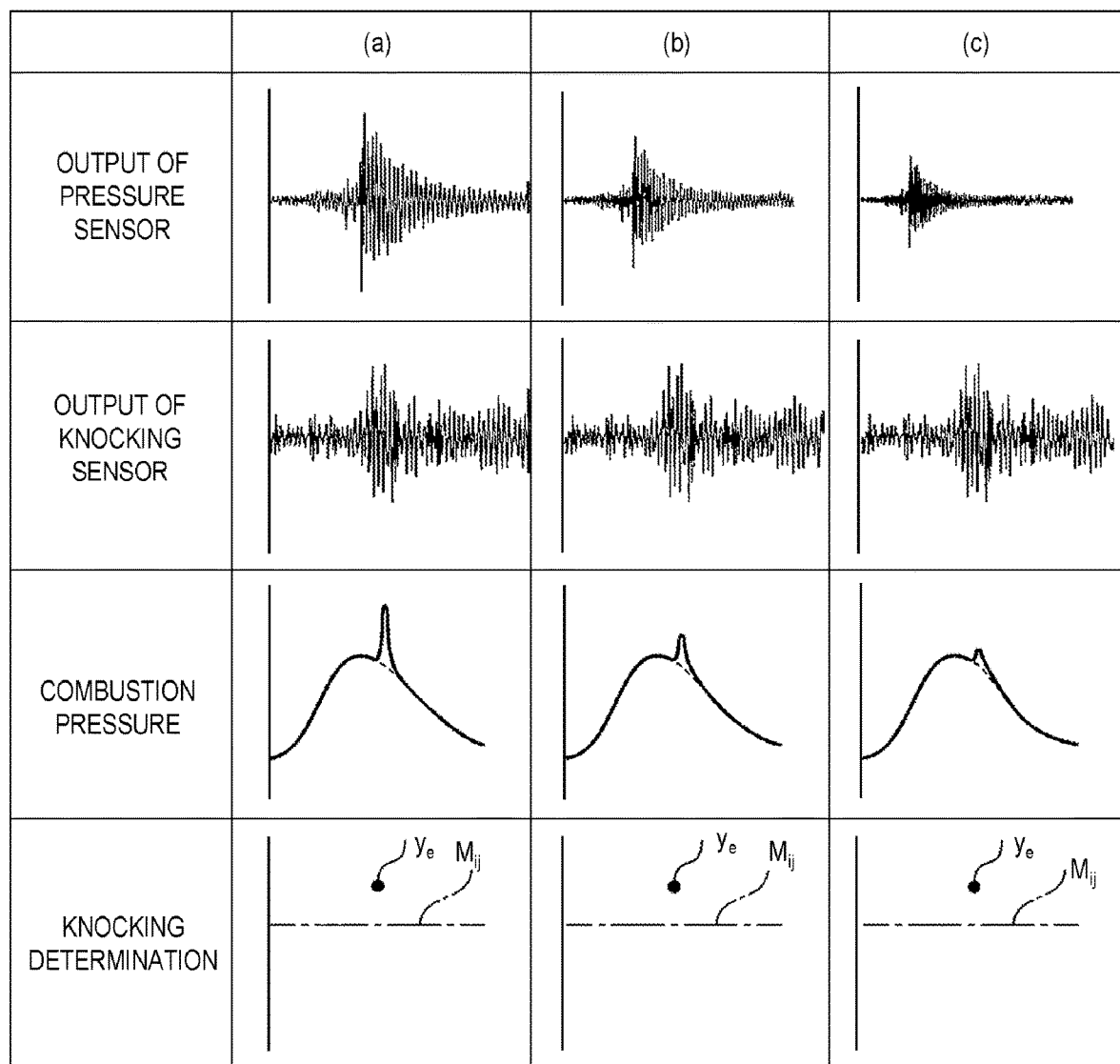
FIG. 26 is a table of diagrams for describing the knocking determination.

Meanwhile, FIG. 26 illustrates fluctuations of each value, i.e. the output value of the pressure sensor 19, the output value of the knocking sensor 18, the combustion pressure in the combustion chamber 5, and the estimated value $y_e$ for the knocking intensity representative value, when the knocking processing described with reference to FIG. 22 is executed using the normal signal generation model 60 and the first learned neural network 20 in the internal combustion engine other than the internal combustion engine illustrated in FIG. 5, for example, the commercially available internal combustion engine equipped with the pressure sensor 19. In FIG. 26, (a), (b), and (c) also illustrate fluctuations of these values in each cycle $k_n$, $k_{n+1}$, $k_{n+2}$ in FIG. 22, respectively.

As described above, there are tolerances in the components of the engine, and thus, dimensions of the components of the engine vary depending on a type of the engine, so that different engine vibrations occur in each engine. However, in the first learned neural network 20, the weights are learned for the different engine vibrations that occur for each engine, and thus, when the vibration of the engine for which the weight has not been learned, i.e. the unlearned engine vibration occurs, the first learned neural network may falsely determine that the vibration occurs in the engine body 1 due to knocking even using the normal signal generation model 60. In FIG. 26, (a) illustrates, as one example, a case where the knocking and the unlearned engine vibration occur in the cycle $k_n$, and the estimated value $y_e$ for the knocking intensity representative value exceeds the threshold $M_{ij}$, whereby it is determined that the knocking occurs.

In this case, the ignition timing is retarded in the next cycle $k_{n+1}$, whereby the increase amount of the combustion pressure in the combustion chamber 5 decreases and the output value of the pressure sensor 19 also decreases as illustrated in (b) of FIG. 26. However, if the unlearned engine vibration which is not affected by the ignition timing occurs, the unlearned engine vibration is not prevented even when the ignition timing is retarded, and thus, in the example illustrated in FIG. 26, the unlearned engine vibration continuously occurs as illustrated in (b) of FIG. 26 even after the ignition timing is retarded. As a result, in the example illustrated in FIG. 26, even when the normal signal generation model 60 is used, the estimated value $y_e$ for the knocking intensity representative value is equal to or larger than the threshold $M_{ij}$ due to the unlearned engine vibration, as illustrated in (b) of FIG. 26. Therefore, it is determined that the knocking occurs.

In this case, the ignition timing is retarded again in the next cycle $k_{n+2}$, whereby the increase amount of the combustion pressure in the combustion chamber 5 decreases and the output value of the pressure sensor 19 also decreases as illustrated in (c) of FIG. 26. However, the unlearned engine vibration is not prevented even when the ignition timing is retarded, and thus, in the example illustrated in FIG. 26, the unlearned engine vibration continuously occurs as illustrated in (c) of FIG. 26 even after the ignition timing is retarded. As a result, even when the normal signal generation model 60 is used, the estimated value $y_e$ for the knocking intensity representative value is equal to or larger than the threshold $M_{ij}$ due to the unlearned engine vibration, as illustrated in (c) of FIG. 26. Therefore, it is determined that the knocking occurs. As such, when the unlearned engine vibration continuously occurs, even when the normal signal generation model 60 is used, the estimated value $y_e$ for the knocking intensity representative value continuously exceeds the threshold $M_{ij}$, whereby the ignition timing may be continuously retarded. In such a case, the ignition timing is excessively retarded, which causes a problem that the output of the engine is greatly reduced.

Meanwhile, the same applies to a case where knocking does not occur but the estimated value $y_e$ for the knocking intensity representative value exceeds the threshold $M_{ij}$ due to the occurrence of the unlearned engine vibration, whereby it is determined that the knocking occurs. Also in this case, when the unlearned engine vibration continuously occurs, even if the normal signal generation model 60 is used, the estimated value $y_e$ for the knocking intensity representative value continuously exceeds the threshold $M_{ij}$, whereby the ignition timing may be continuously retarded. In this case, the ignition timing is also excessively retarded, which causes a problem that the output of the engine is greatly reduced.

In the second embodiment, in a case where the knocking processing is executed using the normal signal generation model 60 and the first learned neural network 20 in the internal combustion engine other than the internal combustion engine illustrated in FIG. 5, for example, the commercially available internal combustion engine, the ignition timing is controlled so that the ignition timing is not excessively retarded due to the occurrence of the unlearned engine vibration. The description thereof will be provided with reference to FIGS. 27A to 28B. FIGS. 27A to 28B illustrate fluctuations in the estimated value $y_e$ for the knocking intensity representative value and the ignition timing, as in FIG. 22, in a case where it is determined that the estimated value $y_e$ for the knocking intensity representative value has exceeded the threshold $M_{ij}$ in the cycle $k_n$, whereby the ignition timing is retarded in the next cycle $k_{n+1}$.

Figure 27A:
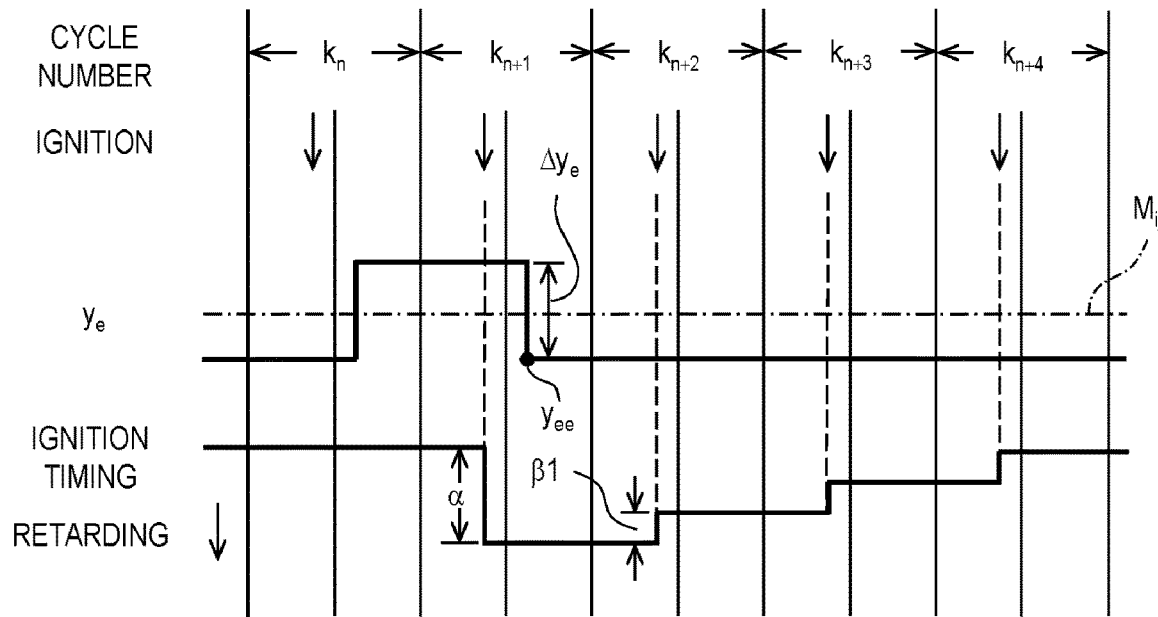
FIG. 27A is a diagram for describing a predicted value or a predicted decrease of the estimated value $y_e$.

Referring to FIG. 27A, FIG. 27A illustrates fluctuations in the estimated value $y_e$ for the knocking intensity representative value and the ignition timing in a case where the knocking processing is executed based on the output value of the knocking sensor 18 using the normal signal generation model 60 and the first learned neural network 20 in the internal combustion engine illustrated in FIG. 1 or FIG. 5. In the example illustrated in FIG. 27A, it is determined that the estimated value $y_e$ for the knocking intensity representative value has exceeded the threshold $M_{ij}$ in the cycle $k_n$, whereby the ignition timing is retarded by $\alpha$ in the next cycle $k_{n+1}$. As a result, the estimated value $y_e$ for the knocking intensity representative value in the cycle $k_{n+1}$ is reduced by $\Delta y_e$ to be $y_{ee}$. Further, FIG. 27A illustrates a case where the estimated value $y_e$ for the knocking intensity representative value is equal to or smaller than the threshold $M_{ij}$ when the estimated value $y_e$ for the knocking intensity representative value becomes $y_{ee}$, in which the ignition timing is advanced by $\beta 1$ in the next cycle $k_{n+2}$.

Figure 27B:
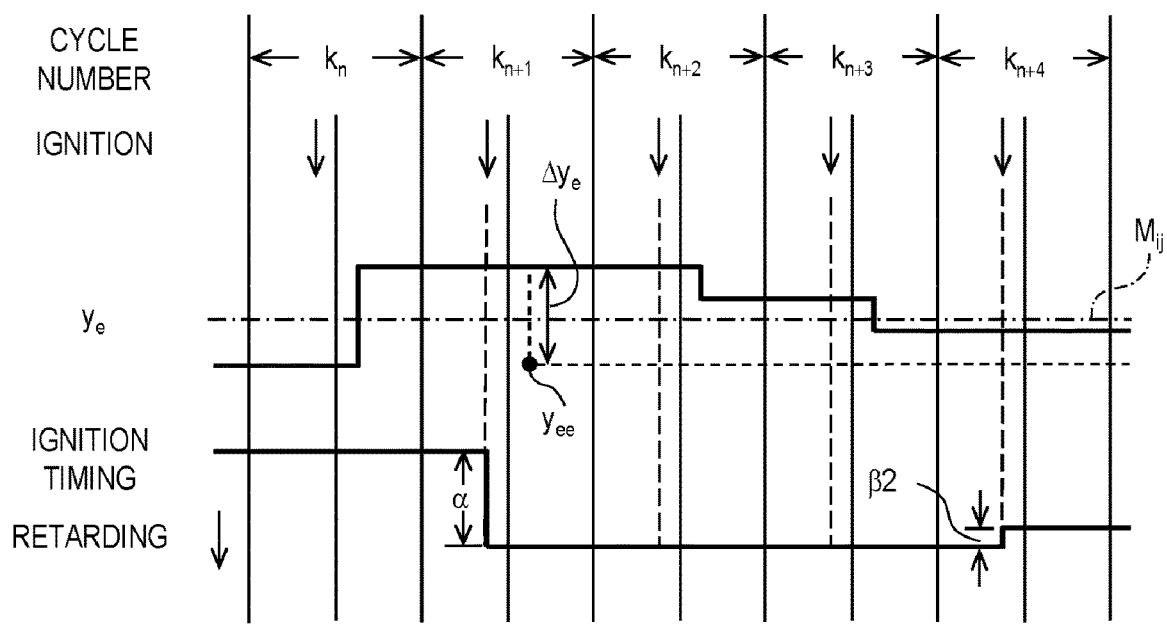
FIG. 27B is another diagram for describing the predicted value or the predicted decrease amount of the estimated value $y_e$.

Meanwhile, FIG. 27B is a diagram illustrating a new knocking processing method, in a case where the knocking processing is executed based on the output value of the knocking sensor 18 using the normal signal generation model 60 and the first learned neural network 20 in the internal combustion engine other than the internal combustion engine illustrated in FIG. 5, for example, the commercially available internal combustion engine. Further, FIG. 27B illustrates a case where, as represented by a solid line, both the knocking and the unlearned engine vibration occur and thus the estimated value $y_e$ for the knocking intensity representative value exceeds the threshold $M_{ij}$ in the cycle $k_n$, and after the cycle $k_{n+1}$, even if the normal signal generation model 60 is used, the estimated value $y_e$ for the knocking intensity representative value continuously exceeds the threshold $M_{ij}$ for a while due to the unlearned engine vibration. That is, the unlearned engine vibration occurs in a specific operating state and gradually fades out when the operating state of the engine changes in the actual internal combustion engine. Therefore, even when the estimated value $y_e$ for the knocking intensity representative value temporarily exceeds the threshold $M_{ij}$, it gradually decreases after a while as illustrated in FIG. 27B. However, in a case where the estimated value $y_e$ for the knocking intensity representative value continuously exceeds the threshold $M_{ij}$ as illustrated in FIG. 27B, when the knocking processing is executed by the routines illustrated in FIGS. 14 to 20, the ignition timing is continuously retarded, and as a result, the ignition timing is excessively retarded. In the second embodiment, it is determined whether the estimated value $y_e$ for the knocking intensity representative value exceeds the threshold $M_{ij}$ due to the occurrence of the knocking when the ignition timing is retarded, in order to prevent the ignition timing from being excessively retarded, and when it is determined that the estimated value $y_e$ for the knocking intensity representative value does not exceed the threshold $M_{ij}$ due to the occurrence of the knocking, the ignition timing is not retarded in the next cycle.

That is, as illustrated in FIG. 27B, in a case where the knocking processing is executed using the normal signal generation model 60 and the first learned neural network 20 in the internal combustion engine other than the internal combustion engine illustrated in FIG. 5, for example, the commercially available internal combustion engine, it cannot be found whether the estimated value $y_e$ for the knocking intensity representative value exceeds the threshold $M_{ij}$ due to the occurrence of the knocking only, the unlearned engine vibration only, or both the knocking and the unlearned engine vibration.

However, as illustrated in FIG. 27A, it is found that, in a case where the estimated value $y_e$ for the knocking intensity representative value exceeds the threshold $M_{ij}$ due to the occurrence of the knocking and thus the ignition timing is retarded by $\alpha$, the estimated value $y_e$ for the knocking intensity representative value decreases by $\Delta y_e$ to be $y_{ee}$ in the next cycle.

Therefore, as illustrated in FIG. 27B, for example, even in a case where the knocking processing is executed using the normally signal generation model 60 and the first learned neural network 20 in the commercially available internal combustion engine, as represented by a dashed line, the estimated value $y_e$ for the knocking intensity representative value is expected to decrease by $\Delta y_e$ to be $y_{ee}$ in the next cycle $k_{n+1}$ when the estimated value $y_e$ for the knocking intensity representative value exceeds the threshold $M_{ij}$ due to the occurrence of the knocking and thus the ignition timing is retarded by α. Therefore, if the estimated value $y_e$ for the knocking intensity representative value decreases to near the predicted value $y_{ee}$ thereof when the ignition timing is retarded by α, it can be determined that the knocking has occurred. Moreover, at this time, the estimated value $y_e$ for the knocking intensity representative value correctly indicates the knocking intensity.

Meanwhile, when the estimated value $y_e$ for the knocking intensity representative value does not decrease to near the estimated value $y_{ee}$ when the ignition timing is retarded by α, as represented by a solid line in FIG. 27B, the estimated value $y_e$ for the knocking intensity representative value exceeds the threshold $M_{ij}$ due to the occurrence of the unlearned engine vibration, not due to the occurrence of the knocking only, or due to the occurrence of both the knocking and the unlearned engine vibration, in the cycle $k_n$. Therefore, at this time, the estimated value $y_e$ for the knocking intensity representative value does not correctly indicate the knocking intensity. That is, in a case where a difference between the estimated value $y_{ee}$ for the knocking intensity representative value when the ignition timing is retarded by α and the estimated value $y_e$ for the knocking intensity representative value output from the first learned neural network 20 is smaller than a predetermined set value, the estimated value $y_e$ for the knocking intensity representative value correctly indicates the knocking intensity. On the contrary, in a case where the difference is larger than the predetermined set value, the estimated value $y_e$ for the knocking intensity representative value does not correctly indicate the knocking intensity.

In the second embodiment, in a case where the knocking processing is executed using the normally signal generation model 60 and the first learned neural network 20 in the commercially available internal combustion engine, when it is determined in the cycle $k_n$ that the estimated value $y_e$ for the knocking intensity representative value has exceeded the threshold $M_{ij}$ as illustrated in FIG. 27B, in the next cycle $k_{n+1}$, the retarding control of the ignition timing is executed for the further next cycle $k_{n+2}$ depending on whether the difference between the estimated value $y_{ee}$ for the knocking intensity representative value when the ignition timing is retarded by α and the estimated value $y_e$ for the knocking intensity representative value output from the first learned neural network 20 is smaller or larger than the predetermined set value.

In other words, when the difference is smaller than the predetermined set value, i.e. when the estimated value $y_e$ for the knocking intensity representative value correctly indicates the knocking intensity, the retarding control of the ignition timing is executed based on the estimated value $y_e$ for the knocking intensity representative value. In this case, when the estimated value $y_e$ for the knocking intensity representative value is larger than the threshold $M_{ij}$, the ignition timing is retarded, and when the estimated value $y_e$ for the knocking intensity representative value is smaller than the threshold $M_{ij}$, the ignition timing is not retarded, but advanced by β1 in the next cycle $k_{n+2}$. Meanwhile, when the difference is larger than the predetermined set value, i.e. when the estimated value $y_e$ for the knocking intensity representative value does not correctly indicate the knocking intensity, the retarding control of the ignition timing is not executed, and the ignition timing is maintained as represented by a solid line in FIG. 27B in order to observe how the estimated value $y_e$ goes. After the estimated value $y_e$ for the knocking intensity representative value drops below the threshold $M_{ij}$, the ignition timing starts to be advanced by β1.

Moreover, in the second embodiment, the ignition timing advanced amount β2 when the estimated value $y_e$ for the knocking intensity representative value continuously exceeds the threshold $M_{ij}$ due to the unlearned engine vibration, as illustrated in FIG. 27B, is set to be smaller than the ignition timing advanced amount β1 when the estimated value $y_e$ for the knocking intensity representative value exceeds the threshold $M_{ij}$ due to the occurrence of the knocking only, as illustrated in FIG. 27A. That is, when the estimated value $y_e$ for the knocking intensity representative value continuously exceeds the threshold $M_{ij}$ due to the unlearned engine vibration, the ignition timing is slowly advanced.

Figure 28A:
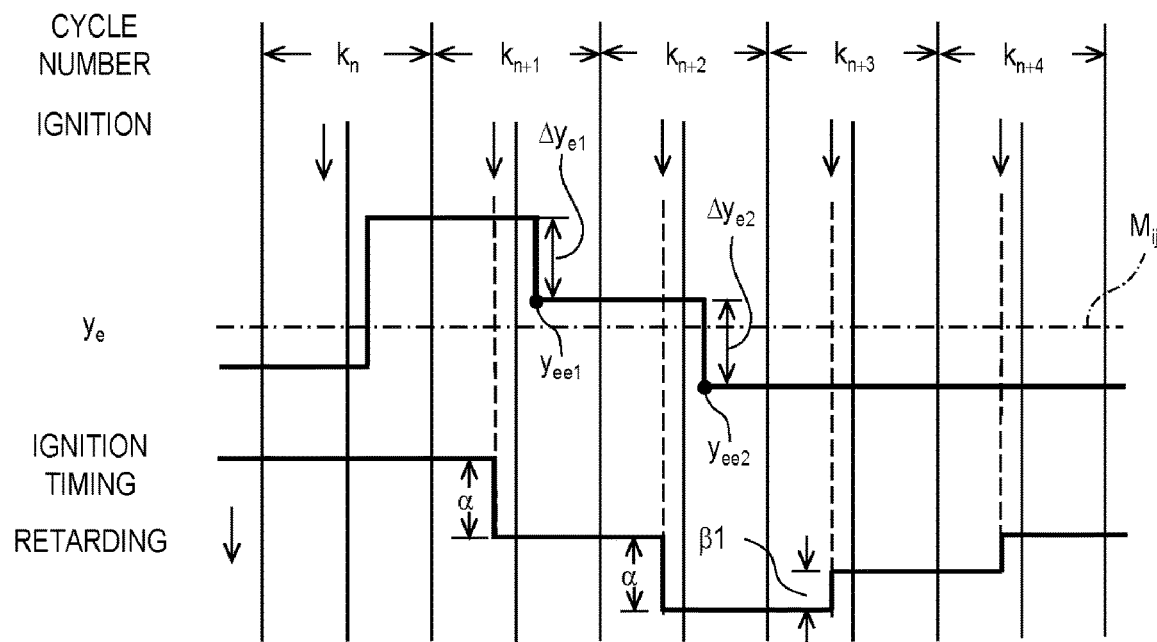
FIG. 28A is a diagram for describing the predicted value or the predicted decrease amount of the estimated value $y_e$.
Figure 28B:
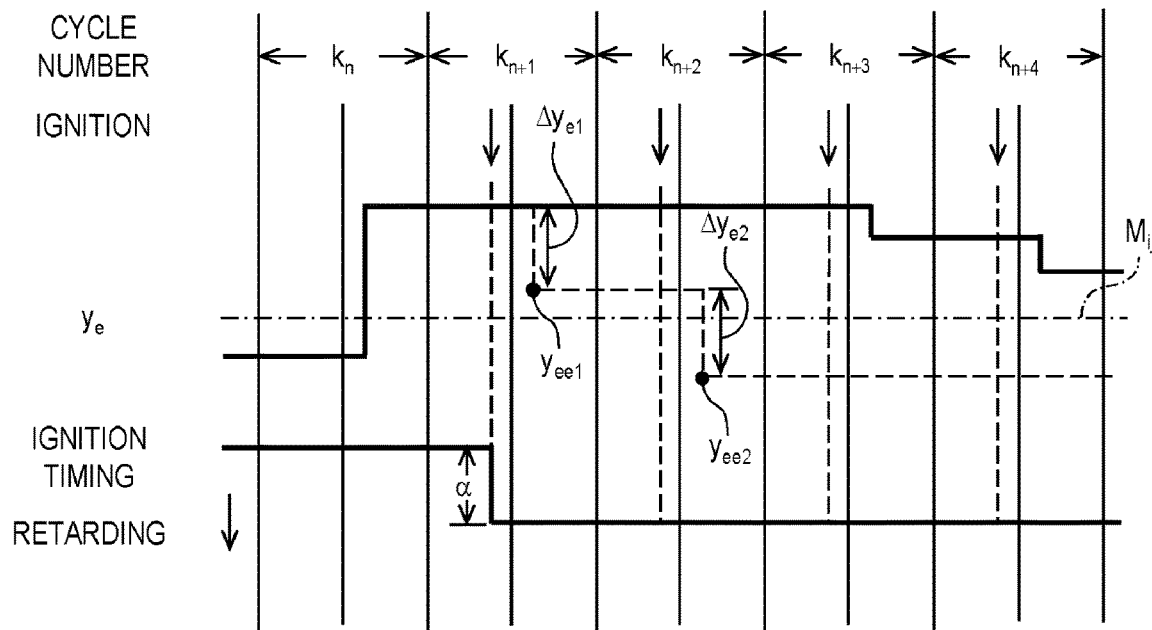
FIG. 28B is another diagram for describing the predicted value or the predicted decrease amount of the estimated value $y_e$.

Meanwhile, FIG. 28A illustrates fluctuations in the estimated value $y_e$ for the knocking intensity representative value and the ignition timing when the knocking processing is executed based on the output value of the knocking sensor 18 using the normal signal generation model 60 and the first learned neural network 20 in the internal combustion engine illustrated in FIG. 1 or FIG. 5, as in FIG. 27A. FIG. 28B illustrates fluctuations in the estimated value $y_e$ for the knocking intensity representative value and the ignition timing when the knocking processing is executed based on the output value of the knocking sensor 18 using the normal signal generation model 60 and the first learned neural network 20 in the internal combustion engine other than the internal combustion engine illustrated in FIG. 5, for example, the commercially available internal combustion engine, as in FIG. 27B. FIGS. 28A and 28B illustrate cases where the ignition timing is retarded by α twice until the estimated value $y_e$ for the knocking intensity representative value drops below the threshold $M_{ij}$, and these cases are the same as the cases illustrated in FIGS. 27A and 27B except that the ignition timing is retarded twice.

However, as illustrated in FIG. 28A, in a case where the estimated value $y_e$ for the knocking intensity representative value exceeds the threshold $M_{ij}$ due to the occurrence of the knocking and thus the ignition timing is retarded by α, the estimated value $y_e$ for the knocking intensity representative value decreases by $\Delta y_{e1}$ to be $y_{ee1}$ in the next cycle $k_{n+1}$. At this time, since the knocking has not yet stopped, the estimated value $y_e$ for the knocking intensity representative value still exceeds the threshold $M_{ij}$, whereby the ignition timing is retarded again by α. As a result, the estimated value $y_e$ for the knocking intensity representative value decreases by $\Delta y_{e2}$ to be $y_{ee2}$ in the next cycle $k_{n+2}$.

In the second embodiment, as represented by a solid line in FIG. 28B, when the difference between the estimated value $y_{ee1}$ for the knocking intensity representative value when the ignition timing is retarded by α and the estimated value $y_e$ for the knocking intensity representative value output from the first learned neural network 20 is larger than the predetermined set value, i.e. when the estimated value $y_e$ for the knocking intensity representative value does not correctly indicates the knocking intensity, the retarding control of the ignition timing is not executed, and the ignition timing is maintained as represented by a solid line in FIG. 28B in order to observe how the estimated value $y_e$ goes. After the estimated value $y_e$ for the knocking intensity representative value drops below the threshold $M_{ij}$, the ignition timing starts to be advanced by β1.

In the second embodiment, in a case where the knocking processing is executed using the normal signal generation model 60 and the first learned neural network 20 in the commercially available internal combustion engine, the retarding control of the ignition timing is executed in the next cycle depending on whether the difference between the predicted value $y_{ee}$ of the estimated value $y_e$ for the knocking intensity representative value when the ignition timing is retarded and the estimated value $y_e$ for the knocking intensity representative value output from the first learned neural network 20 is smaller or larger than the predetermined set value.

FIGS. 29 to 36 illustrate a first example in which the predicted decrease amount $\Delta y_e$ of the estimated value $y_e$ for the knocking intensity representative value when the ignition timing is retarded is estimated using the second neural network. FIGS. 37 to 45 illustrate a second example in which the predicted value $y_{ee}$ of the estimated value $y_e$ for the knocking intensity representative value when the ignition timing is retarded is estimated using the second neural network. First, the first example will be described with reference to FIGS. 29 to 36.

Figures 29, 30:
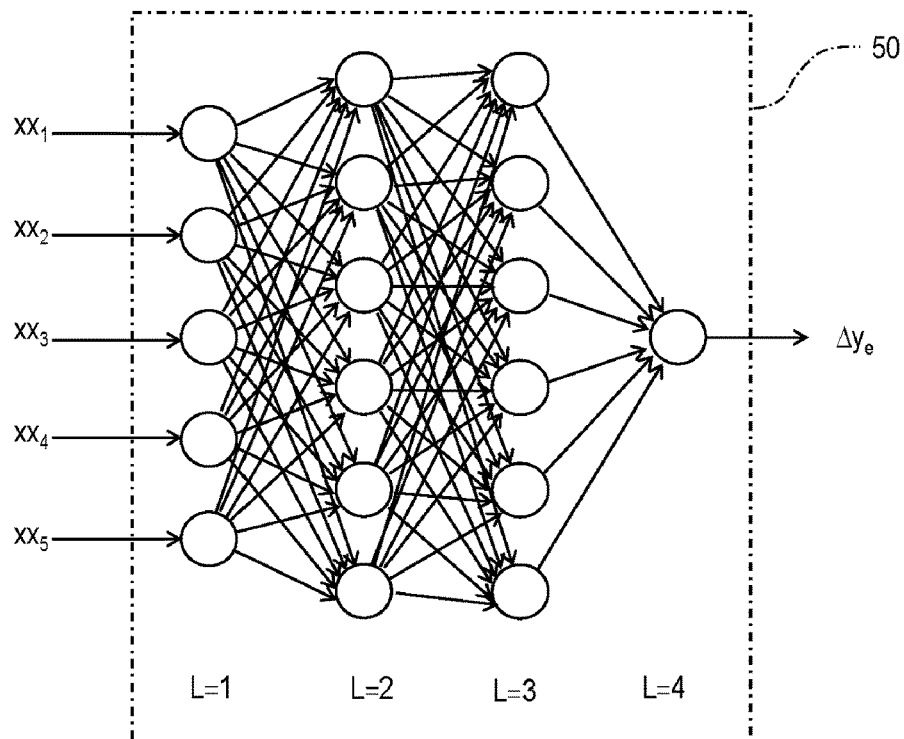
FIG. 29 is a table illustrating a list of input parameters.
FIG. 30 is a diagram illustrating a second neural network used in a second embodiment according to the present disclosure.

FIG. 30 illustrates a second neural network 50 used in the first example. Referring to FIG. 30, in this second neural network 50, as in the neural network illustrated in FIG. 3, L=1 indicates an input layer, L=2 and L=3 indicate hidden layers, and L=4 indicates an output layer. In the first example, as illustrated in FIG. 30, the input layer (L=1) consists of five nodes, and five input values $xx_1$, $xx_2$, $xx_3$, $xx_4$, $xx_5$ are input to respective nodes of the input layer (L=1). On the other hand, FIG. 30 illustrates the hidden layer (L=2) and the hidden layer (L=3). The number of these hidden layers can be one or any number. The number of nodes in the hidden layers can also be any number. The output layer (L=4) has one node, and the output value from the node in the output layer is represented by $\Delta y_e$.

Next, the input values $xx_1$, $xx_2$, $xx_3$, $xx_4$, $xx_5$ and the output value $\Delta y_e$ in FIG. 30 will be described. First, the output value $\Delta y_e$ illustrates the predicted decrease amount of the estimated value $y_e$ for the knocking intensity representative value when the ignition timing is retarded due to the occurrence of the knocking only. On the other hand, the input values $xx_1$, $xx_2$, $xx_3$, $xx_4$, $xx_5$ indicate input parameters having a strong influence on the decrease amount of the estimated value $y_e$ for the knocking intensity representative value, in which a list of those input parameters is illustrated in FIG. 29. As illustrated in FIG. 29, the input parameters include a parameter representing the operating state of the engine, the retarded amount $\alpha$ or the advanced amount $\beta$ ($\beta1$ or $\beta2$) of the ignition timing, and the estimated value $y_{eo}$ for the knocking intensity representative value in the previous cycle.

In the first example, the parameters representing the operating state of the engine include the engine speed $N_E$, the engine load L, and the EGR rate ER. That is, in the first example, the engine speed $N_E$, the engine load L, the EGR rate ER, the retarded amount $\alpha$ or the advanced amount $\beta$ of the ignition timing, and the estimated value $y_{eo}$ for the knocking intensity representative value in the previous cycle are respectively set as the input values $xx_1$, $xx_2$, $xx_3$, $xx_4$, $xx_5$. These input values $xx_1$, $xx_2$, $xx_3$, $xx_4$, $xx_5$ are input to respective nodes in the input layer of the second neural network 50.

FIG. 31 illustrates a list of data acquired to create a training dataset for the second neural network 50 using the engine body 1 illustrated in FIG. 5 used when creating the training dataset illustrated in FIG. 9. These pieces of data indicate the engine speed $N_E$, the engine load L, the EGR rate ER, the estimated value $y_e$ for the knocking intensity representative value, and the retarded amount $\alpha$ and the advanced amount $\beta$ of the ignition timing for each cycle when the engine is operated in both the operating state where the knocking does not occur and the operating state where the knocking occurs for various combinations of the engine speed $N_E$, the engine load L, the EGR rate ER, and the retarded amount $\alpha$ and the advanced amount $\beta$ of the ignition timing while the knocking processing is executed using the routines illustrated in FIGS. 14 to 20, in the engine body 1 illustrated in FIG. 5. These pieces of data are temporarily stored in, for example, the memory 32 of the electronic control unit 30.

When acquiring these pieces of data, in the embodiment of the present disclosure, the retarded amount $\alpha$ of the ignition timing is maintained at a constant value, and the ignition timing advanced amount $\beta$ is set to either the advanced amount $\beta1$ or the advanced amount $\beta2$. The list illustrated in FIG. 31 includes a decrease amount $\Delta y_e$ of the estimated value $y_e$ for the knocking intensity representative value when the ignition timing is retarded by the retarded amount $\alpha$. This decrease amount $\Delta y_e$ is obtained from the difference between the estimated value $y_e$ for the knocking intensity representative value when the ignition timing is retarded by the retarded amount $\alpha$ and the estimated value $y_{eo}$ for the knocking intensity representative value in the previous cycle. For example, when the ignition timing is retarded by retarded amount $\alpha$ in the cycle $k_{n+1}$, a decrease amount $\Delta y_{en+1}$ is obtained by subtracting the estimated value $y_{en+1}$ for the knocking intensity representative value in the cycle $k_{n+1}$ from the estimated value $y_{en}$ for the knocking intensity representative value in the cycle $k_n$. The decrease amount $\Delta y_e$ is calculated in, for example, the CPU 33.

When the ignition timing is retarded by the retarded amount $\alpha$, as illustrated in FIG. 31, the decrease amount $\Delta y_e$ of the estimated value $y_e$ for the knocking intensity representative value is calculated, and the calculated decrease amount $\Delta y_e$ is temporarily stored, together with the retarded amount $\alpha$, in, for example, the memory 32 of the electronic control unit 30. The decrease amount $\Delta y_e$ of the estimated value $y_e$ for the knocking intensity representative value represents the actual decrease amount of the estimated value $y_e$ for the knocking intensity representative value. Therefore, the decrease amount $\Delta y_e$ of the estimated value $y_e$ for the knocking intensity representative value is a correct answer value when the weight of the second learned neural network 50 is learned, i.e. the training data.

FIG. 32 illustrates a training dataset for learning the weight of the second neural network 50. In the first example, such a training dataset is created by, extracting data on the engine speed $N_E$, the engine load L, the EGR rate ER, and the ignition timing retarded amount $\alpha$ in a cycle when the ignition timing is retarded by retarded amount $\alpha$, and data on the estimated value $y_{eo}$ for the knocking intensity representative value in a cycle immediately before the cycle when the ignition timing is retarded by the retarded amount $\alpha$, from the list illustrated in FIG. 31. This training dataset consists of m pieces of data indicating a correlation between the input values $xx_1$, $xx_2$, $xx_3$, $xx_4$, $xx_5$, extracted from the list illustrated in FIG. 31, and training data $y_t$. In this case, the engine speed $N_E$, the engine load L, the EGR rate ER, the retarded amount $\alpha$ of the ignition timing, and the estimated value $y_{eo}$ for the knocking intensity representative value in the previous cycle, as illustrated in FIG. 31, are respectively set as the input values $xx_1$, $xx_2$, $xx_3$, $xx_4$, $xx_5$, and the decrease amount $\Delta y_e$ of the estimated value $y_e$ for the knocking intensity representative value illustrated in FIG. 31 is set as the training data $y_t$.

In the first example, the number of nodes in the input layer (L=1), the number of nodes in the hidden layers (L=2, L=3), and the number of nodes in the output layer (L=4) of the second neural network 50 illustrated in FIG. 30, and the training dataset illustrated in FIG. 32 are stored in the memory 24 of the learning device 23. In the learning device 23, the weight of the second neural network 50 is learned using the learning processing routine illustrated in FIG. 10 by a learning processing method similar to that already described with reference to FIG. 10. Accordingly, the second learned neural network 50, i.e. the estimation model for the decrease amount $\Delta y_e$ of the estimated value $y_e$ for the knocking intensity representative value is created.

In the first example, the knocking processing is executed in the engine of the commercially available vehicle using the estimation model for the knocking intensity representative value, which is generated by the first learned neural network 20, and the estimation model for the decrease amount $\Delta y_e$ of the estimated value $y_e$ for the knocking intensity representative value, which is generated by the second learned neural network 50. Therefore, the estimation model for the knocking intensity representative value and the estimation model for the decrease amount $\Delta y_e$ of the estimated value $y_e$ for the knocking intensity representative value, i.e. the first learned neural network 20 and the second learned neural network 50 are stored in the electronic control unit 30 of the commercially available vehicle. Further, the normal signal generation model 60 is stored in the electronic control unit 30 of the commercially available vehicle. These models are stored in the electronic control unit 30 of the commercially available vehicle using the data reading routine in the electronic control unit illustrated in FIG. 13 in a manner similar to that already described with reference to FIG. 13.

Figure 33:
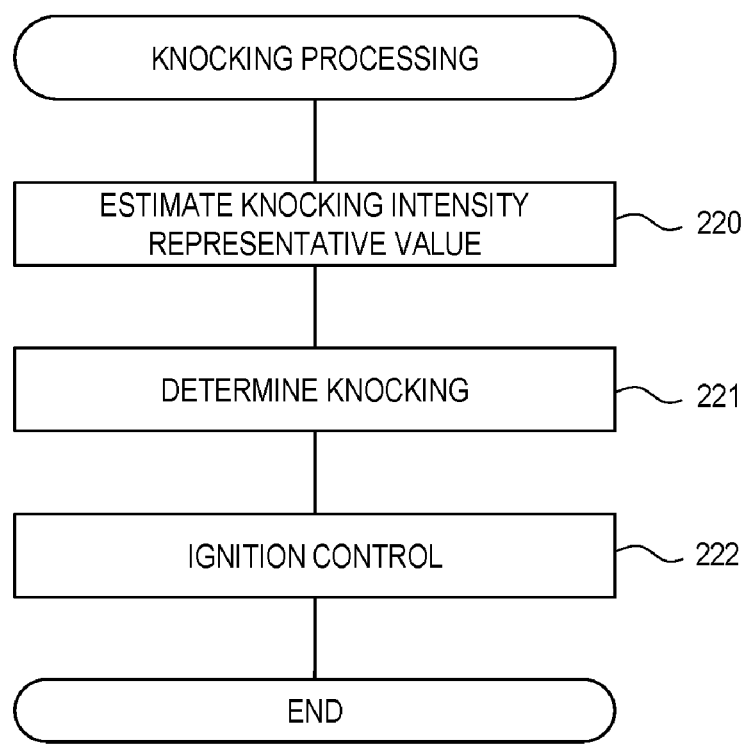
FIG. 33 is a flowchart illustrating a knocking processing routine.

When the first learned neural network 20, the second learned neural network 50 and the normal signal generation model 60 are stored in the electronic control unit 30 of the commercially available vehicle, the first learned neural network 20, the second learned neural network 50 and the normal signal generation model 60 are formed in the memory 32 of the electronic control unit 30. FIG. 33 illustrates the knocking processing which is executed during the engine operation of the commercially available vehicle using the first learned neural network 20, the second learned neural network 50, and the normal signal generation model 60 formed in the memory 32 of the electronic control unit 30 of the commercially available vehicle. This knocking processing is executed individually for each cylinder and for each cycle. In the first example, the knocking processing is started when, for example, the crank angle reaches the compression top dead center.

Referring to FIG. 33, a processing of estimating a knocking intensity representative value originally obtained from the output value of the pressure sensor 19, i.e. a processing of estimating a knocking intensity representative value is executed in step 220. The knocking determination processing of determining whether the knocking occurs is executed in step 221, and then the ignition control is executed in step 222. The processing of estimating the knocking intensity representative value executed in step 220 is executed by the routine for estimating the knocking intensity representative value illustrated in either FIG. 15 or FIG. 16. Since the routine for estimating the knocking intensity representative value has already been described, the descriptions thereof will be omitted. When the routine for estimating the knocking intensity representative value is executed, the estimated value $y_e$ for the knocking intensity representative value is output from the first learned neural network 20.

Figure 34:
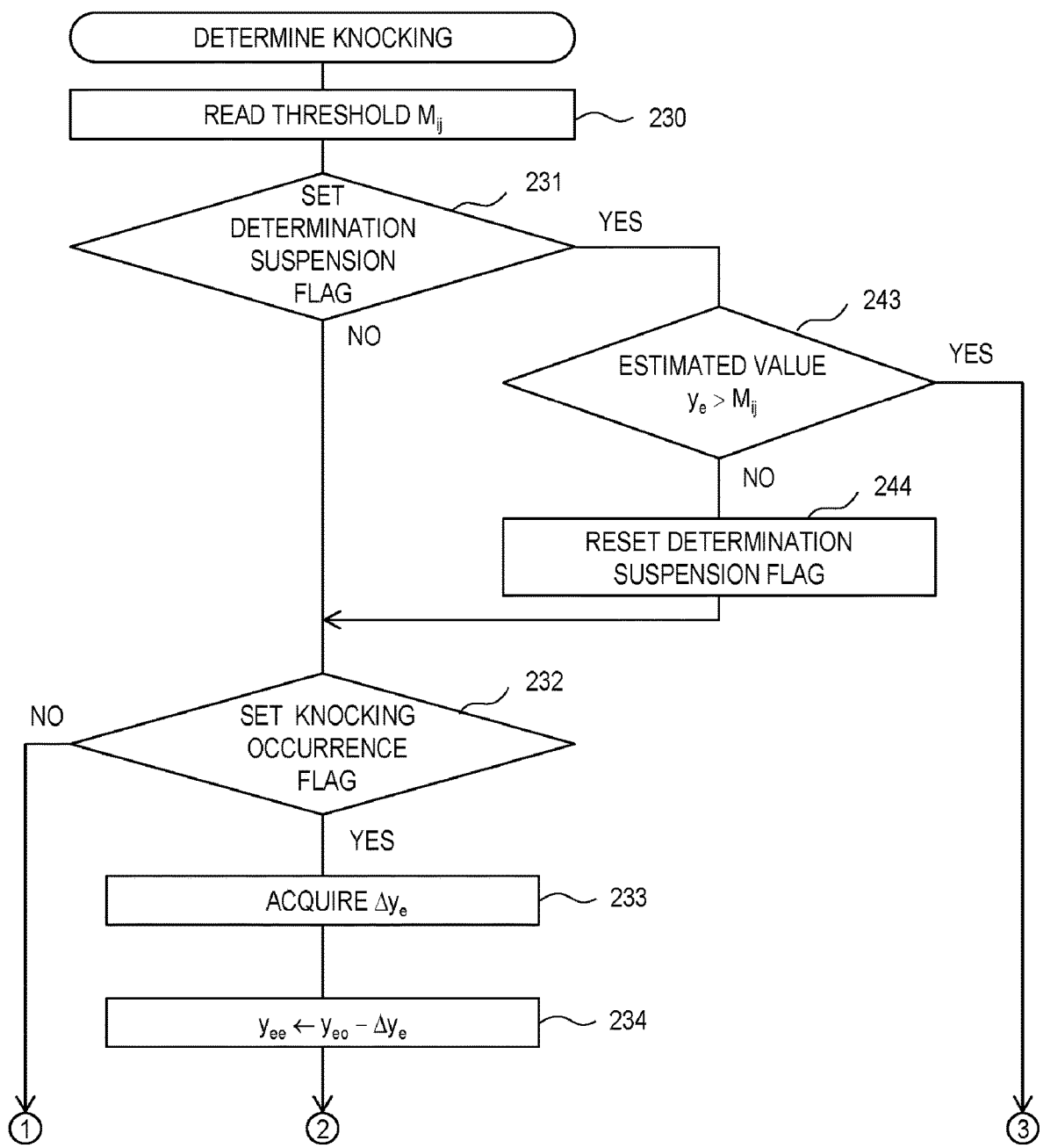
FIG. 34 is a flowchart illustrating a knocking determination routine.
Figure 35:
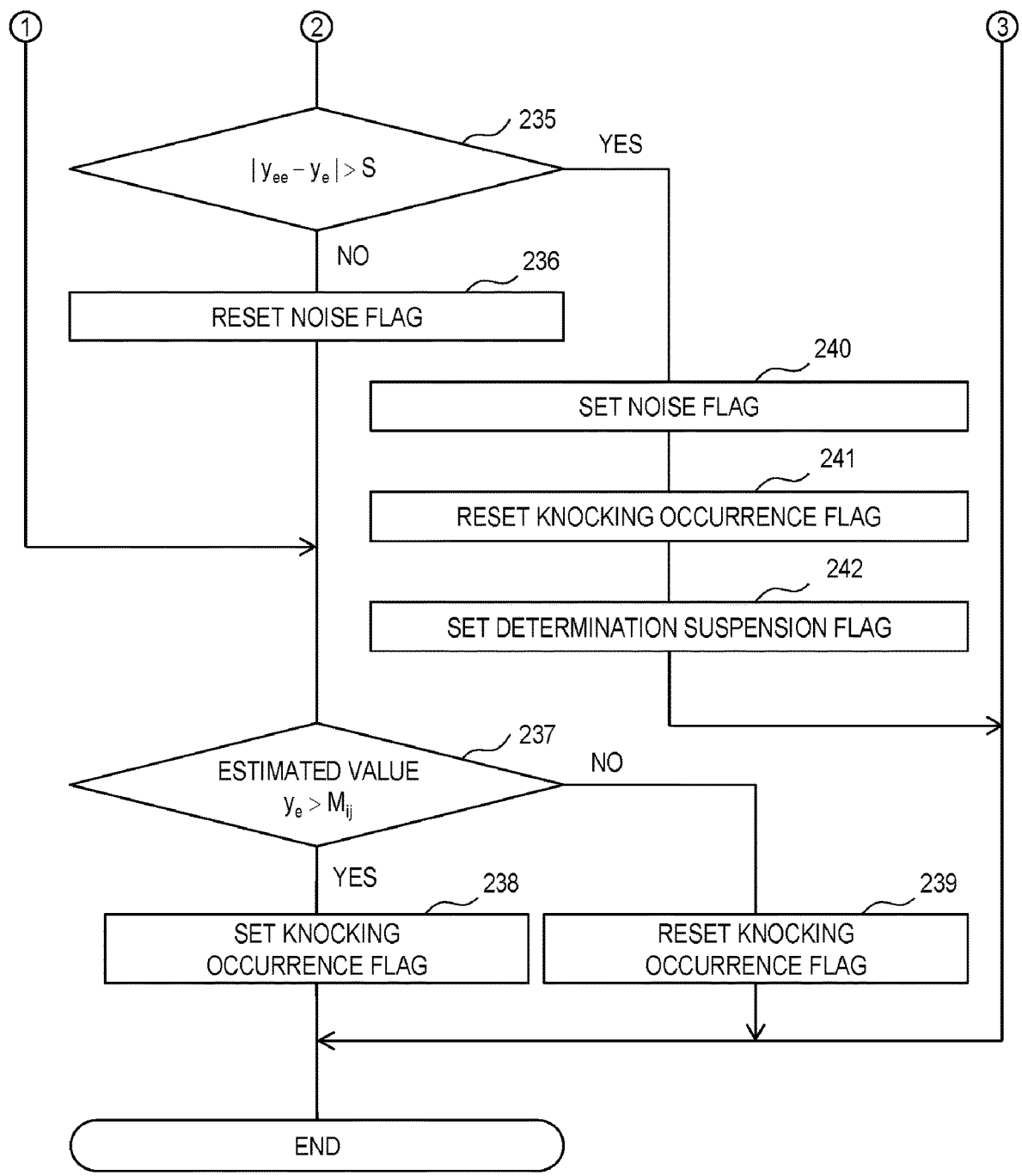
FIG. 35 is a flowchart illustrating the knocking determination routine.

FIGS. 34 and 35 illustrate the knocking determination routine which is executed in step 221 of FIG. 33, based on the estimated value $y_e$ for the knocking intensity representative value output from the first learned neural network 20, when the estimated value $y_e$ for the knocking intensity representative value is output from the first learned neural network 20 in step 220 of FIG. 33. Referring to FIG. 34, first, the threshold $M_{ij}$ for the knocking intensity representative value is read in step 230. As described above, the threshold $M_{ij}$ is set in advance for each of the plurality of engine operating regions divided according to the engine load L and the engine speed $N_E$ as illustrated in FIG. 18.

In step 231, it is determined whether a determination suspension flag, which is set when the determination on whether the knocking has occurred should be suspended, is set. The determination suspension flag is normally reset, and thus, the processing proceeds to step 232. In step 232, it is determined whether a knocking occurrence flag, which is set when it is determined that the knocking has occurred, is set. The knocking occurrence flag is normally reset, and thus the proceeding jumps to step 237. In step 237, it is determined whether the estimated value $y_e$ for the knocking intensity representative value output from the first learned neural network 20 is larger than the threshold $M_{ij}$. When it is determined that the estimated value $y_e$ for the knocking intensity representative value is equal to or smaller than the threshold $M_{ij}$, the processing proceeds to step 239, in which the knocking occurrence flag is reset. Then, the processing cycle ends.

On the other hand, when it is determined that the estimated value $y_e$ for the knocking intensity representative value output from the first learned neural network 20 is larger than the threshold $M_{ij}$ in step 237, the processing proceeds to step 238, in which the knocking occurrence flag is set. When the knocking occurrence flag is set, the ignition timing is retarded by $\alpha$ in the next cycle as described later. Further, when the knocking occurrence flag is set, the processing proceeds from step 232 to step 233 in the next cycle. In step 233, the engine speed $N_E$, the engine load L, the EGR rate ER, the retarded amount $\alpha$ of the ignition timing, the estimated value $y_{eo}$ for the knocking intensity representative value output from the first learned neural network 20 in the previous cycle are respectively input to the nodes in the input layer of the second learned neural network 50, thereby outputting the predicted decrease amount $\Delta y_e$ of the estimated value $y_e$ for the knocking intensity representative value when the ignition timing is retarded from the second learned neural network 50.

In step 234, the predicted value $y_{ee}$ of the estimated value $y_e$ for the knocking intensity representative value is calculated by subtracting the predicted decrease amount $\Delta y_e$ of the estimated value $y_e$ for the knocking intensity representative value from the estimated value $y_{eo}$ for the knocking intensity representative value output from the first learned neural network 20 in the previous cycle. In step 235, it is determined whether an absolute value of a difference ($y_{ee} - y_e$) between the predicted value $y_{ee}$ of the estimated value $y_e$ for the knocking intensity representative value and the estimated value $y_e$ for the knocking intensity representative value output from the first learned neural network 20 is larger than a set value S, in order to determine whether the unlearned engine vibration occurs.

That is, when only the knocking occurs, the predicted value $y_{ee}$ of the estimated value $y_e$ for the knocking intensity representative value and the estimated value $y_e$ for the knocking intensity representative value output from the first learned neural network 20 should be almost equal. Therefore, when only the knocking occurs, the absolute value of the difference ($y_{ee} - y_e$) is smaller than the set value S. Therefore, at this time, the processing proceeds to step 236, in which a noise flag indicating that the unlearned engine vibration, i.e. the noise occurs, is reset. When the noise flag is reset, the advanced amount of the ignition timing is set to β1 as described later. The processing proceeds to step 238.

On the other hand, at this time, the estimated value $y_e$ for the knocking intensity representative value output from the first learned neural network 20 correctly indicates the knocking intensity. Therefore, at this time, the processing proceeds to step 237, in which it is determined whether the estimated value $y_e$ for the knocking intensity is larger than the threshold $M_{ij}$. When it is determined that the estimated value $y_e$ for the knocking intensity representative value is larger than the threshold $M_{ij}$, the processing proceeds to step 238, in which the knocking occurrence flag is set. At this time, the ignition timing is retarded by α in the next cycle.

On the other hand, when the knocking and the unlearned engine vibration occur, or when only the unlearned engine vibration occurs, the estimated value $y_e$ for the knocking intensity representative value output from the first learned neural network 20 should be larger than the predicted value $y_{ee}$ of the estimated value $y_e$ for the knocking intensity representative value. Therefore, at this time, the absolute value of the difference ($y_{ee} - y_e$) is larger than the set value S. At this time, the processing proceeds from step 235 to step 240, in which the noise flag indicating that the unlearned engine vibration, i.e. the noise occurs is set. When the noise flag is set, the advanced amount of the ignition timing is set to β2 as described later. The processing proceeds to step 241.

In step 241, the knocking occurrence flag is reset. On the other hand, at this time, the estimated value $y_e$ for the knocking intensity representative value output from the first learned neural network 20 does not correctly indicate the knocking intensity. Therefore, at this time, the determination suspension flag is set in step 242 in order to temporarily suspend advancing and retarding of the ignition timing. The processing cycle ends.

When the determination suspension flag is set, the processing proceeds from step 231 to step 243 in the next cycle. In steps 243 and 244, in a case where, after the estimated value $y_e$ for the knocking intensity representative value exceeds the threshold $M_{ij}$, the estimated value $y_e$ for the knocking intensity representative value output from the first learned neural network 20 remains larger than the threshold $M_{ij}$ due to the occurrence of the unlearned engine vibration, a processing of continuing the state in which advancing and retarding of the ignition timing are suspended, and the state in which the determination on whether the knocking has occurred is suspended is executed.

That is, in step 243, it is determined whether the estimated value $y_e$ for the knocking intensity representative value output from the first learned neural network 20 is larger than the threshold $M_{ij}$. When it is determined that the estimated value $y_e$ for the knocking intensity representative value is larger than the threshold $M_{ij}$, the processing cycle ends. On the other hand, when it is determined that the estimated value $y_e$ for the knocking intensity representative value output from the first learned neural network 20 is smaller than the threshold $M_{ij}$, the processing proceeds to step 244, in which the determination suspension flag is reset. The processing proceeds to step 232, and the knocking determination processing is restarted.

Figure 36:
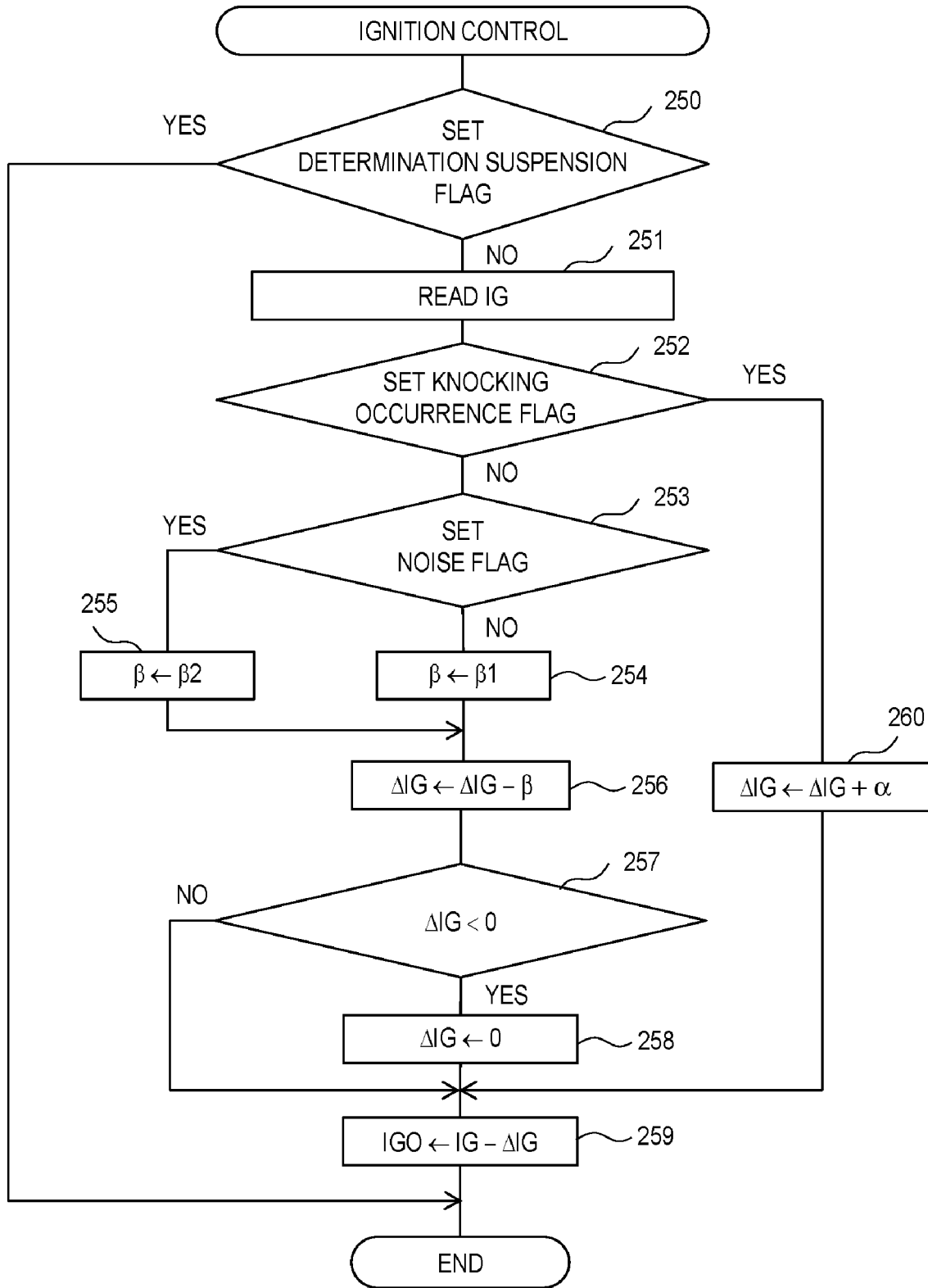
FIG. 36 is a flowchart illustrating an ignition control routine.

FIG. 36 illustrates an ignition control routine executed in the electronic control unit 30 based on the determination result in the knocking determination routine illustrated in FIGS. 34 and 35. Referring to FIG. 36, in step 250, it is determined whether the determination suspension flag used in the knocking determination routine is set. When it is determined that the determination suspension flag is set, the processing cycle ends. On the other hand, when it is determined that the determination suspension flag is not set, the processing proceeds to step 251, in which the reference ignition timing IG (BTDC) is calculated. As described above, the reference ignition timing IG is stored in the memory 32 in advance in a form of a map as illustrated in FIG. 20, as a function of the engine load L and the engine speed $N_E$. In step 252, it is determined whether the knocking occurrence flag is set in the knocking determination routine illustrated in FIGS. 34 and 35. When it is determined that the knocking occurrence flag is set, the processing proceeds to step 260.

In step 260, the certain amount α is added to the ignition timing retarded amount ΔIG to retard the ignition timing. In step 259, the final ignition timing IGO in the next cycle is calculated by subtracting the ignition timing retarded amount ΔIG from the reference ignition timing IG. In the next cycle, the ignition is performed at the final ignition timing IGO by the spark plug 11. At this time, the ignition timing is retarded by the certain amount α. On the other hand, when it is determined that the knocking occurrence flag has been reset in step 252, the processing proceeds to step 253, in which it is determined whether the noise flag is set in the knocking determination routine illustrated in FIGS. 34 and 35.

When it is determined that the noise flag is not set, the processing proceeds to step 254, in which the advanced amount β1 is set as β, and then the processing proceeds to step 256. On the other hand, when it is determined that the noise flag is set, the processing proceeds to step 255, in which the advanced amount β2 is set as β, and then the processing proceeds to step 256. In step 256, β is subtracted from the ignition timing retarded amount ΔIG to advance the ignition timing. In step 257, it is determined whether the ignition timing retarded amount ΔIG is negative. When the ignition timing retarded amount ΔIG is not negative, the processing proceeds to step 259, in which the final ignition timing IGO in the next cycle is calculated. At this time, the ignition timing is advanced by β. On the other hand, when it is determined that the ignition timing retarded amount ΔIG is negative in step 257, the processing proceeds to step 258, in which the ignition timing retarded amount ΔIG is set to zero, and then the processing proceeds to step 259. At this time, the ignition timing is set as the reference ignition timing IG.

Figure 37:
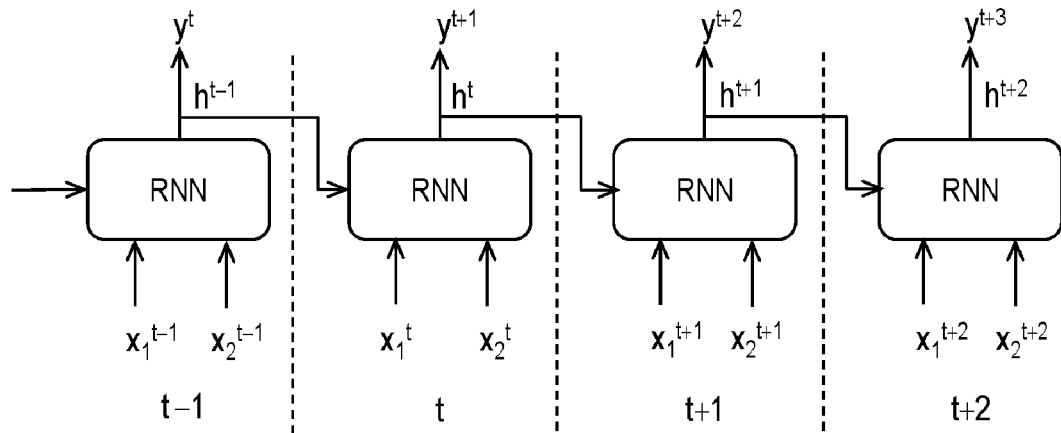
FIG. 37 is an explanatory diagram of a recurrent neural network.
Figure 38:
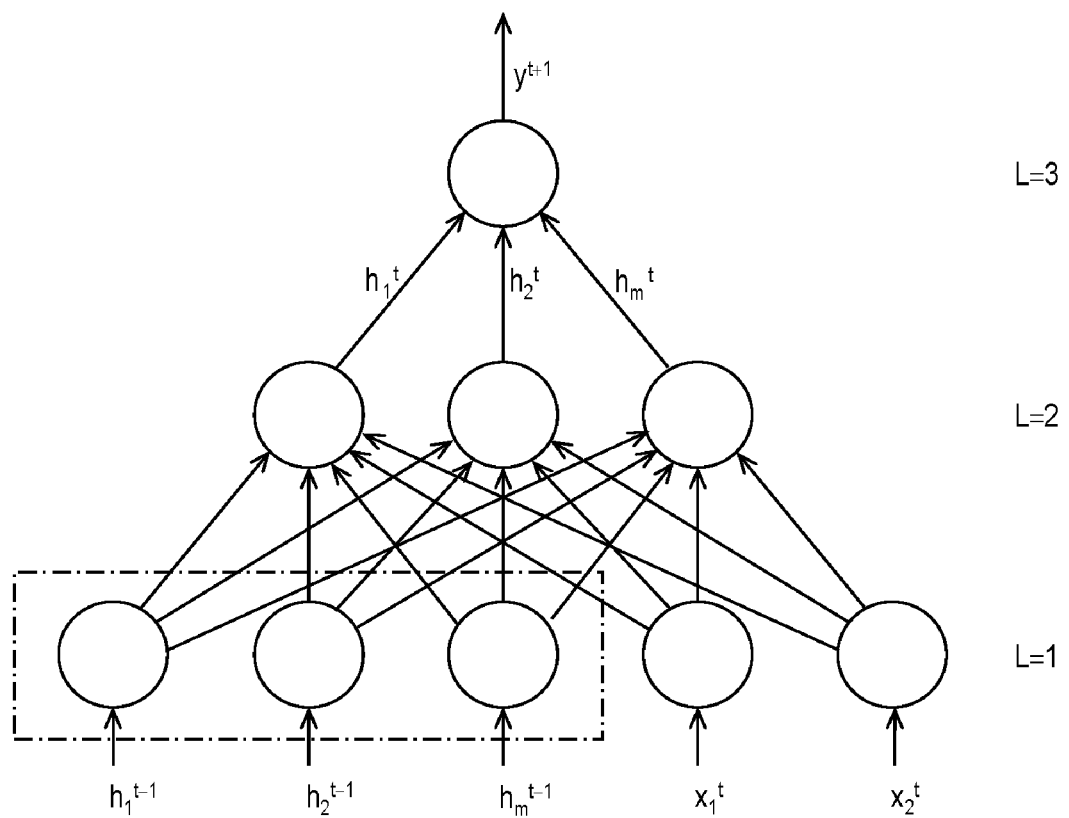
FIG. 38 is an explanatory diagram of the recurrent neural network.

Referring to FIGS. 37 to 45, a second example will be described in which the predicted value $y_{ee}$ of the estimated value $y_e$ for the knocking intensity representative value when the ignition timing is retarded is estimated using the second neural network. In the second example, a recurrent neural network is used as the second neural network. FIG. 37 illustrates an expanded view of the recurrent neural network (RNN) used in the second example, and FIG. 38 illustrates the recurrent neural network. The recurrent neural network is well known, and thus, the recurrent neural network will be briefly described below.

In FIG. 37, $x_1^{t-1}$, $x_2^{t-1}$, $x_1^t$, $x_2^t$, $x_1^{t+1}$, $x_2^{t+1}$, $x_1^{t+2}$, and $x_2^{t+2}$ respectively represent time series input values for the input layer of the recurrent neural network at times t−1, t, t+1, t+2, while $y^t$, $y^{t+1}$, $y^{t+2}$, and $y^{t+3}$ respectively represent output values from the output layer of the recurrent neural network at times t−1, t, t+1, t+2. Further, $h^{t-1}$, $h^t$, $h^{t+1}$, and $h^{t+2}$ (h is a vector) respectively represent output values from the hidden layer of the recurrent neural network at times t−1, t, t+1, t+2. These $h^{t-1}$, $h^t$, $h^{t+1}$, and $h^{t+2}$ are referred to hidden state vectors.

On the other hand, referring to FIG. 38, in the recurrent neural network, L=1 indicates an input layer, L=2 indicates a hidden layer, and L=3 indicates an output layer. In FIG. 38, the nodes in a chain-lined frame do not actually exist, but are nodes represented for the sake of description. Therefore, in the example illustrated in FIG. 38, the input layer (L=1) has two nodes. In the example illustrated in FIG. 38, the hidden layer (L=2) has m nodes (only three nodes are illustrated in FIG. 38). On the other hand, although only one hidden layer (L=2) is illustrated in FIG. 38, the number of hidden layers can be any number. The output layer (L=3) has one node.

FIG. 38 illustrates input values $x_1^t$, $x_2^t$ and output value $y^{t+1}$ at time t in FIG. 37. In FIG. 38, $h_1^t$, $h_2^t$, ..., and $h_m^t$ indicate output values from respective nodes in the hidden layer at time t in FIG. 37, i.e. hidden state vectors. In the recurrent neural network, as illustrated in FIG. 38, each of the output values from the nodes of the hidden layer at the immediately preceding time t−1, i.e. the hidden state vectors $h_1^{t-1}$, $h_2^{t-1}$, ..., $h_m^{t-1}$ is multiplied by the corresponding weight w and input to each node in the hidden layer. Therefore, each of values obtained by multiplying each of the input values $x_1^t$, $x_2^t$ by the corresponding weight w, and each of values obtained by multiplying each of the hidden state vectors $h_1^{t-1}$, $h_2^{t-1}$, ..., $h_k^{t-1}$ at the immediately preceding time t−1 by the corresponding weight w are input to each node in the hidden layer. The total input value $u_k$ calculated at each node (k=1, 2, ..., m) in the hidden layer (L=2) in FIG. 38 is as follows:

[Formula 10]

$$u_k = \Sigma_{n=1}^2 x_n^t \cdot w_{kn} + \Sigma_{n=1}^m h_n^{t-1} \cdot w_{kn} + b_k \qquad (9)$$

The total input value $u_k$ calculated at each node of the hidden layer is converted by an activation function and output from each node of the hidden layer as the hidden state vector $h_k^t$ (k=1, 2, ..., m). In this case, for example, when a tanh function (hyperbolic tangent function) is used as the activation function, the hidden state vector $h_k^t$ output from each node of the hidden layer is $h_k^t = \tanh(u_k)$. These hidden state vectors $h_k^t$ are input to the node in the output layer (L=3). At the node in the output layer, the total input value u represented by the following equation is calculated using the corresponding weight w:

[Formula 11]

$$U = \Sigma_{n=1}^m h_n^t \cdot w_n \qquad (10)$$

In the embodiment of the present disclosure, an identity function is used as the activation function at the node in the output layer, and thus, the total input value u calculated in the node in the output layer is output from the node in the output layer as the output value y without changing.

Next, input values $x_1^{t-1}$, $x_2^{t-1}$, $x_1^t$, $x_2^t$, $x_1^{t+1}$, $x_2^{t+1}$, $x_1^{t+2}$, $x_2^{t+2}$ and output values $y^t$, $y^{t+1}$, $y^{t+2}$, $y^{t+3}$, illustrated in FIG. 37, will be described. In FIG. 37, times t−1, t, t+1, t+2 correspond to successive cycles of the same cylinder. In the embodiment of the present disclosure, the estimated values $y_e$ for the values representing knocking intensity sequentially output from the first learned neural network 20 at times t−1, t, t+1, t+2, i.e. in each successive cycle of the same cylinder are respectively set as the input values $x_1^{t-1}$, $x_1^t$, $x_1^{t+1}$, $x_1^{t+2}$. Additionally, the retarded amounts α or the advanced amounts β of the ignition timing at times t−1, t, t+1, t+2, i.e. in each successive cycle of the same cylinder, are set as the input values $x_2^{t-1}$, $x_2^t$, $x_2^{t+1}$, $x_2^{t+2}$.

In this case, the EGR rate ER can be added as the input value. On the other hand, the output values $y^t$, $y^{t+1}$, $y^{t+2}$, $y^{t+3}$ are respectively the predicted values $y_{ee}$ of the estimated values $y_e$ for the values representing knocking intensity at the times t, t+1, t+2, t+3, i.e. in the next cycles. FIG. 39 illustrates, as a representative example, a list of input values and an output value at time t.

FIG. 40 illustrates a training dataset for learning the weight of the recurrent neural network illustrated in FIG. 37. This training dataset is created, in the second example, by extracting only a part of data over the entire cycle, i.e. the estimated value $y_e$ for the knocking intensity representative value output from the first learned neural network 20, and the retarded amount α or advanced amount β of the ignition timing, from the list illustrated in FIG. 31. In the training dataset, the estimated value $y_e$ for the knocking intensity representative value output from the first learned neural network 20 in the next cycle is set as the predicted value $y_{ee}$ of the estimated value $y_e$ for the knocking intensity representative value, and the predicted value $y_{ee}$ of the estimated value $y_e$ for the knocking intensity representative value is set as the training data $y_t$.

For example, in FIG. 40, when the cycle is the cycle $k_n$, the estimated value $y_{en}$ for the knocking intensity representative value output from the first learned neural network 20 at the cycle $k_n$, and the retarded amount α of the ignition timing at the cycle $k_n$ are set as the input values $x_1^t$, $x_2^t$ at the cycle $k_n$, while the estimated value $y_{en+1}$ for the knocking intensity representative value output from the first learned neural network 20 at the cycle $k_{n+1}$ is set as the training data $y_t$ at the cycle $k_n$.

Also in the second example, the number of nodes in the input layer (L=1), the number of nodes in the hidden layer (L=2) and the number of nodes in the output layer (L=3) of the recurrent neural network illustrated in FIG. 38, and the training dataset illustrated in FIG. 40 are stored in the memory 24 of the learning device 23 illustrated in FIG. 5, and the learning of the weight of the recurrent neural network is performed in the learning device 23. The learning of the weight of the recurrent neural network is usually performed by using a Trancated BBPT (Back Propagation Through Time) method in which a part of the expanded and displayed recurrent neural network is cut and back propagation algorithm is performed.

For example, if FIG. 37 illustrates a part of the recurrent neural network cut out, in FIG. 37, the input values $x_1^{t-1}$, $x_2^{t-1}$, $x_1^t$, $x_2^t$, $x_1^{t+1}$, $x_2^{t+1}$, $x_1^{t+2}$, $x_2^{t+2}$ at times t−1, t, t+1, t+2 are sequentially input to the recurrent neural network, the weight of the recurrent neural network is learned using the back propagation algorithm to reduce the square error E ($=\frac{1}{2}(y^{t+3}-y_t)^2$) between the output value $y^{t+3}$ output from the recurrent neural network and the corresponding training data $y_t$ at time t+2. The back propagation at this time is performed retrospectively, but the detailed descriptions thereof will be omitted.

In the second example, in FIG. 40, for example, the weight of the recurrent neural network is learned using the back propagation algorithm for data of 10 consecutive cycles. When the weight of the recurrent neural network is completely learned for data of 10 consecutive cycles, the weight of the recurrent neural network is learned for data of next 10 consecutive cycles. In this way, the weight of the recurrent neural network is learned until the weight is completely learned for data of all 10 consecutive cycles.

Figure 41:
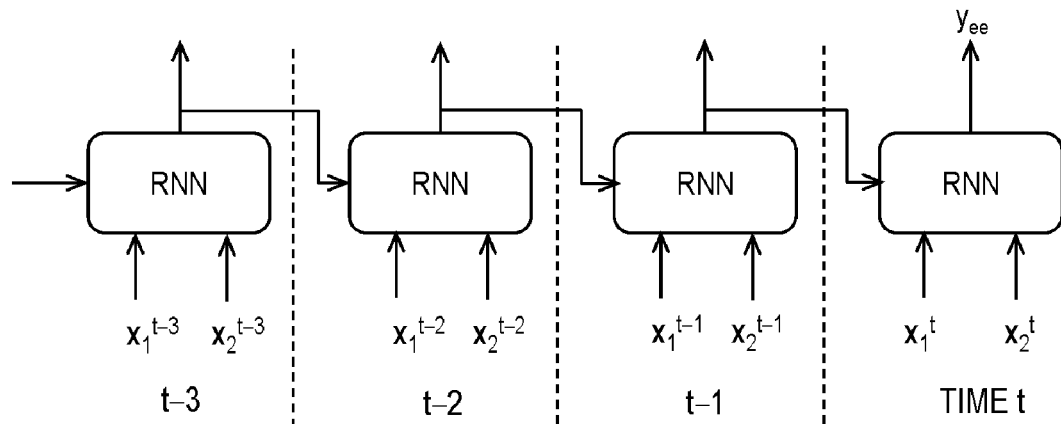
FIG. 41 is an explanatory diagram of a recurrent neural network.

FIG. 41 illustrates a learned recurrent neural network the weight of which has been completely learned. In FIG. 41, in a case where the time t is the current time, input values $x_1^{t-3}$, $x_2^{t-3}$, $x_1^{t-2}$, $x_2^{t-2}$, $x_1^{t-1}$ $x_2^{t-1}$ at past times t−3, t−2, t−1, and input values $x_1^t$, $x_2^t$ at current time t are sequentially input to the recurrent neural network in the recurrent neural network, whereby the predicted value $y_{ee}$ of the estimated value $y_e$ for the knocking intensity representative value at the current time t is output from the recurrent neural network. That is, in the second example, an estimation model for the predicted value $y_{ee}$ of the estimated value $y_e$ for the knocking intensity representative value when the ignition timing is retarded is generated using the learned recurrent neural network.

In the second example of the present disclosure, the estimation model for the knocking intensity representative value generated by the first learned neural network 20, the estimation model for the predicted value $y_{ee}$ of the estimated value $y_e$ for the knocking intensity representative value generated by the learned recurrent neural network, and the normal signal generation model 60 are used to execute the knocking processing in the engine of the commercially available vehicle. For this purpose, the estimation model for the knocking intensity representative value and the estimation model for the predicted value $y_{ee}$ of the estimated value $y_e$ for the knocking intensity representative value, i.e. the first learned neural network 20 and the learned recurrent neural network, and the normal signal generation model 60 are stored in the electronic control unit 30 of the commercially available vehicle. These estimation models are stored in the electronic control unit 30 of the commercially available vehicle using the data reading routine in the electronic control unit illustrated in FIG. 13 in the manner similar to that already described with reference to FIG. 13.

Figure 42:
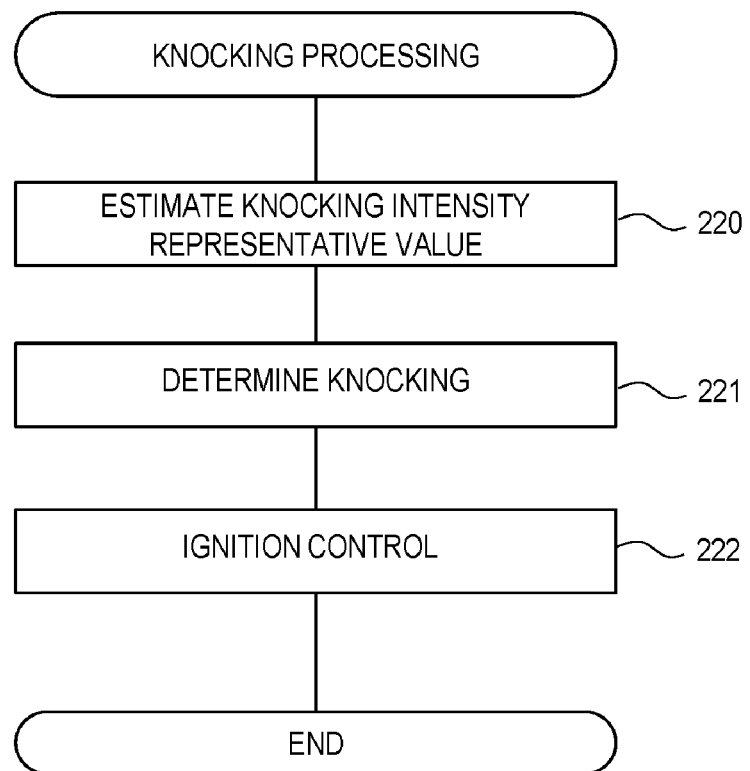
FIG. 42 is a flowchart illustrating a knocking processing routine.

Thus, when the first learned neural network 20, the learned recurrent neural network, and the normal signal generation model 60 are stored in the electronic control unit 30 of the commercially available vehicle, the first learned neural network 20, the learned recurrent neural network, and the normal signal generation model 60 are formed in the memory 32 of the electronic control unit 30. FIG. 42 illustrates the knocking processing executed during the engine operation of the commercially available vehicle using the first learned neural network 20, the learned recurrent neural network, and the normal signal generation model 60, which are formed in the memory 32 of the electronic control unit 30 of the commercially available vehicle. This knocking processing is executed individually for each cylinder and for each cycle. In the second example, the knocking processing is also started when, for example, the crank angle reaches the compression top dead center.

The knocking processing illustrated in FIG. 42 is the same as the knocking processing illustrated in FIG. 33. Referring to FIG. 42, a processing of estimating a knocking intensity representative value originally obtained from the output value of the pressure sensor 19, i.e. a processing of estimating a knocking intensity representative value is executed in step 220. The knocking determination processing of determining whether the knocking occurs is executed in step 221, and then the ignition control is executed in step 222. The processing of estimating the knocking intensity representative value executed in step 220 is executed by the routine for estimating the knocking intensity representative value illustrated in either FIG. 15 or FIG. 16. Since the routine for estimating the knocking intensity representative value has already been described, the descriptions thereof will be omitted. When the routine for estimating the knocking intensity representative value is executed, the estimated value $y_e$ for the knocking intensity representative value is output from the first learned neural network 20.

Figure 43:
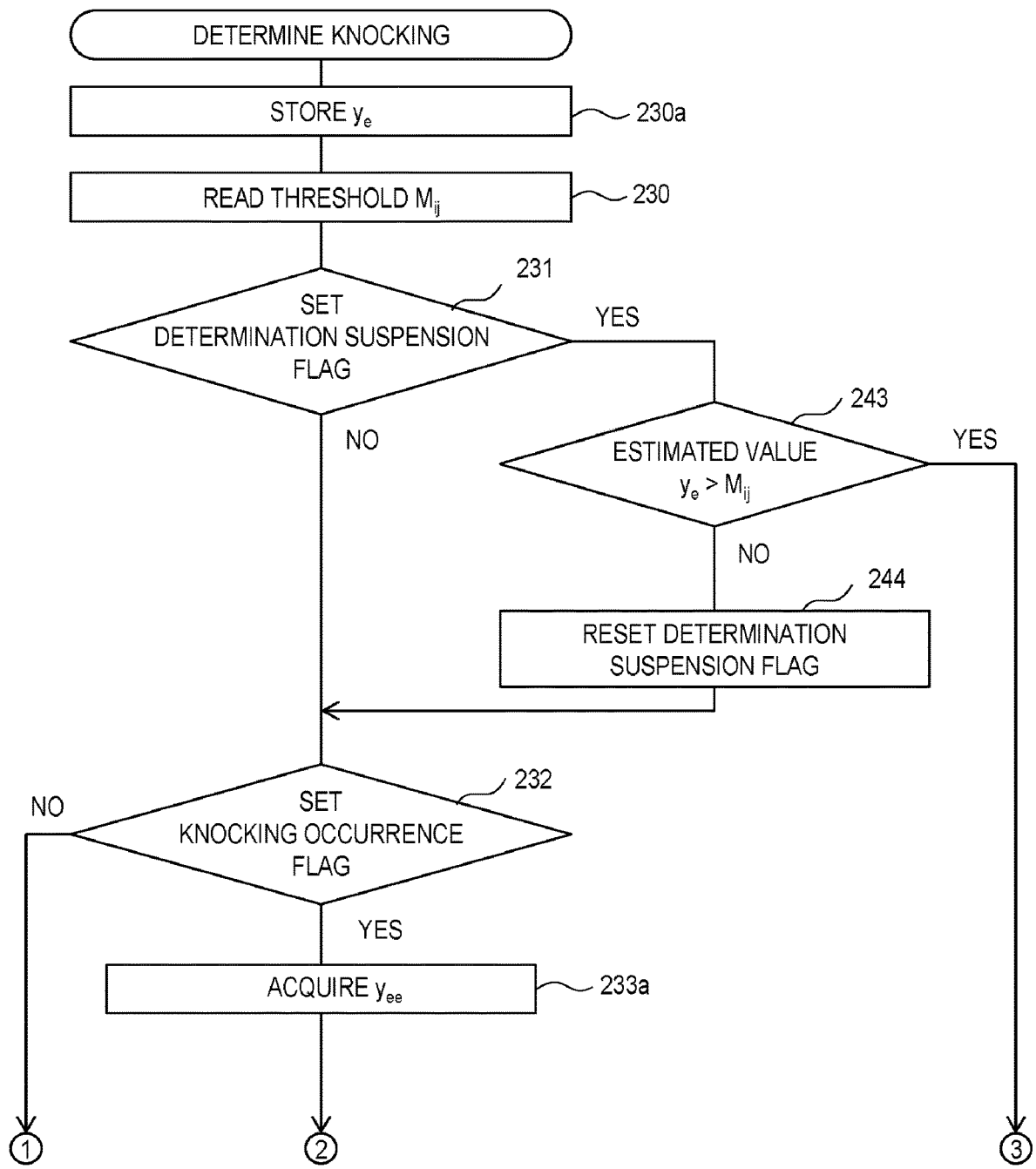
FIG. 43 is a flowchart illustrating a knocking determination routine.
Figure 44:
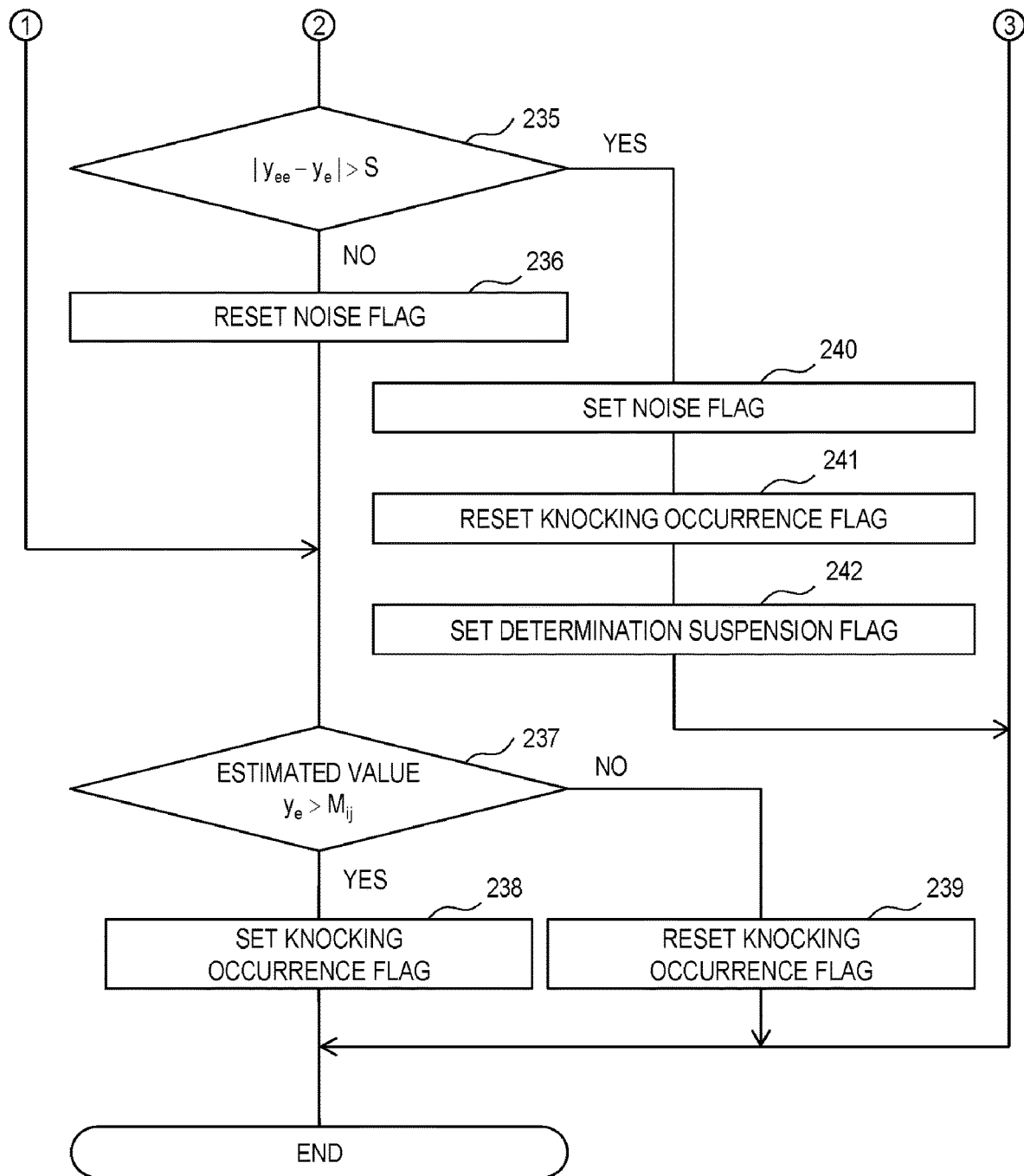
FIG. 44 is a flowchart illustrating the knocking determination routine.

FIGS. 43 and 44 illustrate the knocking determination routine executed in step 221 of FIG. 42, based on the estimated value $y_e$ for the knocking intensity representative value output from the first learned neural network 20 when the estimated value $y_e$ for the knocking intensity representative value is output from the first learned neural network 20 in step 220 of FIG. 42. Steps 230 to 232 and steps 235 to 244 of the knocking determination routine illustrated in FIGS. 43 and 44 are the same as steps 230 to 232 and steps 235 to 244 of the knocking determination routine illustrated in FIGS. 34 and 35. The difference between the knocking determination routine illustrated in FIGS. 43 and 44 and the knocking determination routine illustrated in FIGS. 34 and 35 is that, in the knocking determination routine illustrated in FIGS. 43 and 44, step 230a is added before step 230, and step 233a is executed instead of steps 233 and 234 of the knocking determination routine illustrated in FIGS. 34 and 35. Therefore, in FIGS. 43 and 44, only steps 230a and 233a will be described, and description of the other steps will be omitted.

Referring to FIGS. 43 and 44, in step 230a, the estimated value $y_e$ for the knocking intensity representative value output from the first learned neural network 20 is stored until ignition is performed a predetermined number of times (for example, five times) on the same cylinder. On the other hand, in step 233a, the estimated values $y_e$ for the values representing knocking intensity output from the first learned neural network 20 and the retarded amounts α or advanced amounts β of the ignition timing in cycles from a cycle in which the ignition has performed a predetermined number of times (for example, five times) ago to the current cycle are sequentially input to the respective nodes in the input layer of the recurrent neural network, whereby the predicted value $y_{ee}$ of the estimated value $y_e$ for the knocking intensity representative value in the current cycle is output from the recurrent neural network.

In the second example, in step 235, it is determined whether the absolute value of the difference $(y_{ee}-y_e)$ between the predicted value $y_{ee}$ of the estimated value $y_e$ for the knocking intensity representative value and the estimated value $y_e$ for the knocking intensity representative value output from the first learned neural network 20 is larger than the set value S, in order to determine whether the unlearned engine vibration occurs. When it is determined that the absolute value of the difference $(y_{ee}-y_e)$ is smaller than the set value S, the processing proceeds to step 236, in which the noise flag is reset. Then processing proceeds to step 239, and it is determined whether the estimated value $y_e$ for the knocking intensity representative value is larger than the threshold $M_{ij}$. When it is determined that the absolute value of the difference $(y_{ee}-y_e)$ is larger than the set value S, the processing proceeds from step 235 to step 240, in which the noise flag is set. The knocking occurrence flag is reset in step 241, and then the determination suspension flag is set in step 242.

Figure 45:
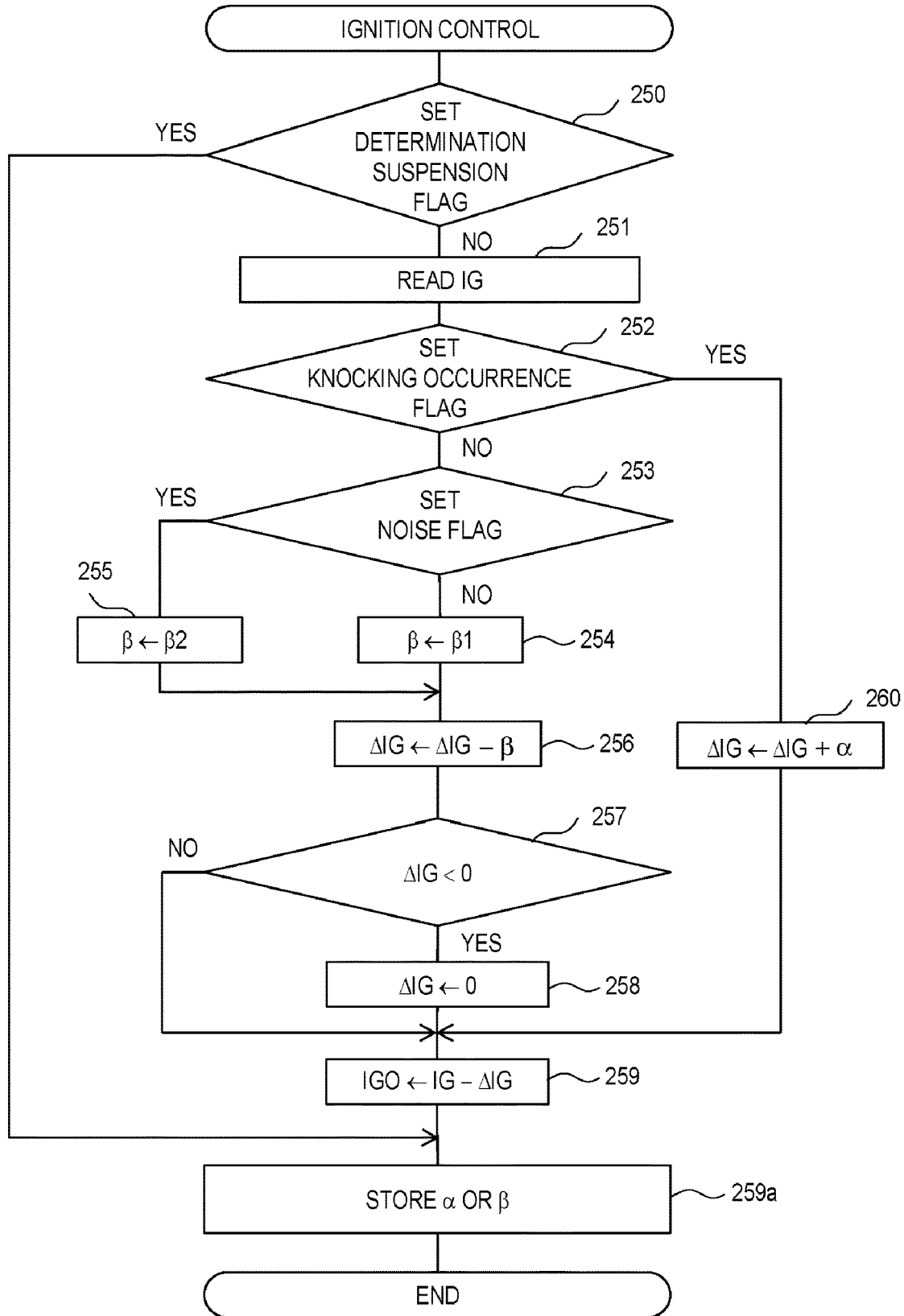
FIG. 45 is a flowchart illustrating an ignition control routine.

FIG. 45 illustrates the ignition control routine executed in the electronic control unit 30 based on the determination result in the knocking determination routine illustrated in FIGS. 43 and 44. Steps 250 to 259 of the ignition control routine illustrated in FIG. 45 are the same as steps 250 to 259 of the ignition control routine illustrated in FIG. 36. The only difference between the ignition control routine illustrated in FIG. 45 and the ignition control routine illustrated in FIG. 36 is that step 259a is added after step 259 in the knocking determination routine illustrated in FIG. 45. Therefore, in FIG. 45, only step 259a will be described, and descriptions of the other steps will be omitted.

Referring to FIG. 45, in step 259a, the retarded amount α or the advanced amount β of the ignition timing is stored until ignition is performed a predetermined number of times (for example, five times) on the same cylinder. Also, in the second embodiment, when the knocking occurrence flag is set, the ignition timing is retarded by a certain amount α, and when the knocking occurrence flag is reset, the ignition timing is advanced by a certain amount β1 or β2α.

According to the second embodiment, the second learned neural network that estimates the predicted value or predicted decrease amount of the estimated value for the knocking intensity representative value when the ignition timing is retarded is stored in the storage unit 32. When the estimated value for the knocking intensity representative value calculated using the first learned neural network exceeds the predetermined threshold, the ignition timing is retarded in the next cycle. In the next cycle in which the ignition timing is retarded, the retarding control of the ignition timing is executed for the further next cycle, based on the difference between the predicted value of the estimated value for the knocking intensity representative value calculated using the second learned neural network and the estimated value for the knocking intensity representative value calculated using the first learned neural network. In the retarding control, when the difference is smaller than the predetermined set value, if the estimated value for the knocking intensity representative value is larger than the predetermined threshold, the ignition timing is retarded in the further next cycle. When the difference is larger than the predetermined set value, even if the estimated value for the knocking intensity representative value is larger than the predetermined threshold, the ignition timing is not retarded in the further next cycle.

Moreover, in the second embodiment, when receiving the operating state of the engine, the retarded amount of the ignition timing, and the estimated value for the knocking intensity representative value in the previous cycle, the second learned neural network outputs the predicted decrease amount of the estimated value for the knocking intensity representative value when the ignition timing is retarded. The predicted value of the estimated value for the knocking intensity representative value when the ignition timing is retarded is obtained from the predicted decrease amount. In this case, the operating state of the engine includes the engine speed, the engine load, and the EGR rate.

In the second embodiment, the second learned neural network includes the recurrent neural network that outputs the predicted value of the estimated value for the knocking intensity representative value in a current cycle when receiving the retarded amount or the advanced amount of the ignition timing and the estimated value of the knocking intensity representative value in each of the cycles, from a cycle in which the ignition has performed a predetermined number of times ago to the current cycle. In the second embodiment, a recurrent neural network with a gate, such as a long short-term memory (LSTM), can be used instead of the recurrent neural network.

In the second embodiment, when the estimated value for the knocking intensity representative value is equal to or smaller than the predetermined threshold after the ignition timing has been retarded, the ignition timing is advanced. The advanced amount of the ignition timing is adjusted to be smaller in a case where the difference between the estimated value for the knocking intensity representative value and the predicted value of the estimated value for the knocking intensity representative value when the ignition timing is retarded when the ignition timing is retarded is larger than the set value, as compared with a case where the difference is equal to or smaller than the set value.

Figure 46:
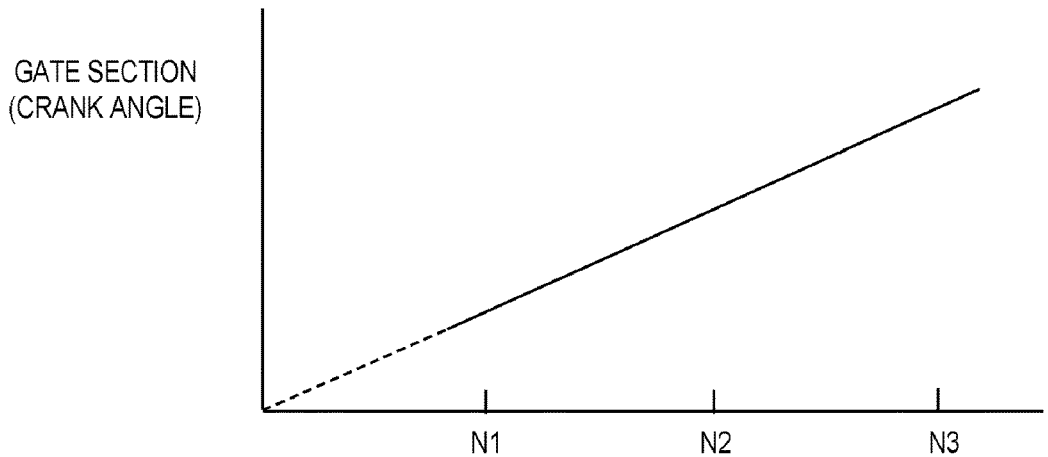
FIG. 46 is a graph illustrating a correlation between a gate section and an engine speed.
Figure 47:
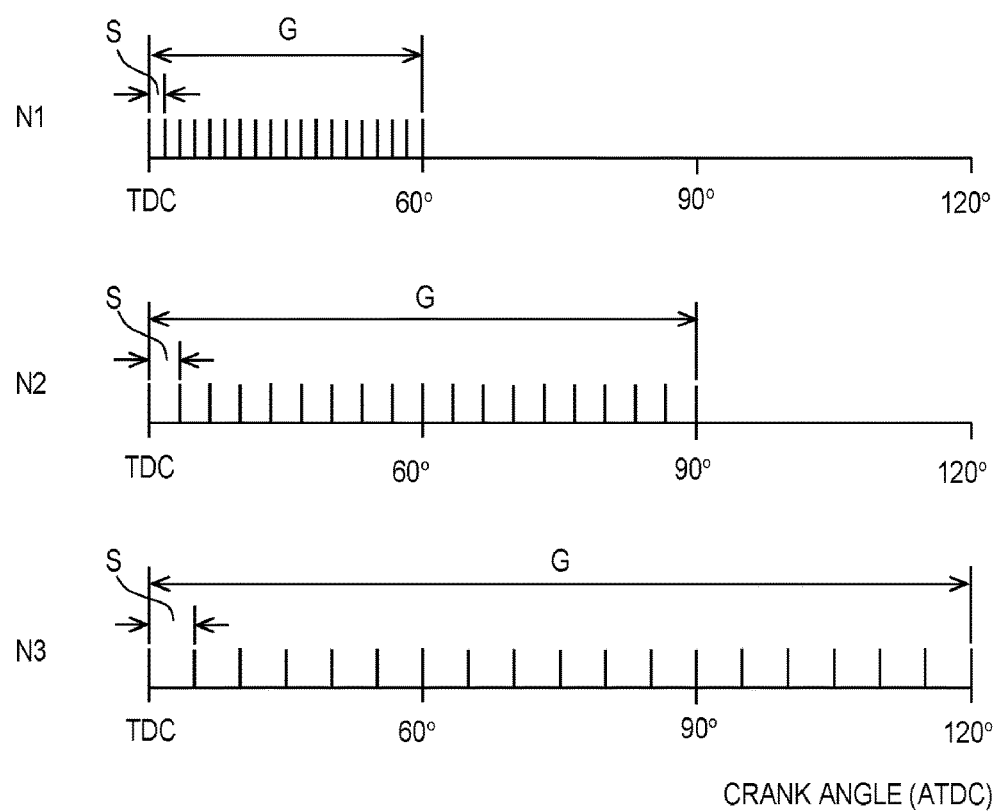
FIG. 47 is a diagram illustrating the gate section and a divided section.

Referring to FIGS. 46 and 47, an embodiment will be described in which the weight of the first neural network 20 is learned based on the output value of the knocking sensor 18 and the output value of the pressure sensor 19 captured during a certain time after the compression top dead center, while the occurrence of the knocking is detected based on the output value of the knocking sensor 18 captured during the certain time after the compression top dead center. In one cycle of the engine operation, the crank angle range in which the output values of both the knocking sensor 18 and the pressure sensor 19, or only the output value of the knocking sensor 18 are/is captured is referred to as a gate section. In FIG. 46, a correlation between the gate section (vertical axis) and the engine speed (horizontal axis) in this embodiment is represented by a solid line. N1, N2, and N3 on the horizontal axis indicate typical engine speeds.

On the other hand, FIG. 47 illustrates a gate section G for each engine speed N1, N2, N3. In addition, FIG. 47 illustrates sections S divided at equal intervals, for each of which the integral value (even a negative integral value is considered as a positive value) of the output value of the knocking sensor 18 is calculated. As can be seen from FIGS. 46 and 47, in this embodiment, as the engine speed becomes higher, the gate section G becomes longer. In the examples illustrated in FIGS. 46 and 47, a period during which the output value of the knocking sensor 18 and the output value of the pressure sensor 19 are captured is set in advance, and the preset period is set to a fixed time. However, the preset period does not have to be the fixed time, and the gate section can be set so that as the engine speed becomes higher, the gate section becomes longer.

On the other hand, in the embodiment described above, the knocking intensity representative value is estimated using a single first learned neural network for the entire operating region of the engine. However, if only one first learned neural network is used for the entire operating region of the engine, the estimation accuracy of the knocking intensity representative value may decrease. In order to avoid such a possibility, the operating region of the engine may be divided into a plurality of operating regions and a separate neural network for each of the divided operating regions may be used. FIGS. 48A to 48C illustrate an embodiment in which a separate first neural network is used for each of the divided operating regions.

That is, in this embodiment, as illustrated in FIGS. 48A to 48C, the operating region of the engine is divided into a plurality of operating regions according to the engine load L and the engine speed $N_E$. As illustrated in FIG. 48A, a separate first neural network $NN_{ij}$ is formed for each of the divided operating regions, and a separate normal signal generation model 60 is formed for each of the divided operating regions. In this case, as illustrated in FIG. 48B, a training dataset $DS_{ij}$ as illustrated in FIG. 9 is created for each of the divided operating regions. The weight of the first neural network $NN_{ij}$ formed for each of the divided operating regions is learned using the corresponding training dataset $DS_{ij}$ and the learning processing routine illustrated in FIG. 10. Similarly, the weight of the normal signal generation model 60 formed for each of the divided operating regions is also learned using the corresponding training dataset and the learning processing routine illustrated in FIG. 10. Furthermore, in this embodiment, as illustrated in FIG. 48C, the threshold $M_{ij}$ for the knocking intensity representative value is set for each of the divided operating regions. In this embodiment, the estimated value $y_e$ for the knocking intensity representative value is calculated for each of the divided operating regions, using the corresponding normal signal generation model 60 and the first learned neural network $NN_{ij}$, and using the routine for estimating the knocking intensity representative value illustrated in FIG. 15 or FIG. 16.

On the other hand, in this embodiment, the second neural network can also be formed for each of the divided operating regions illustrated in FIG. 48A. In this case, a training dataset for the second neural network is also created for each of the divided operating regions. The weight of the second neural network formed for each of the divided operating regions is learned using the corresponding training dataset. In this case, when the estimated value $y_e$ for the knocking intensity representative value is calculated by the first learned neural network $NN_{ij}$ of any operating region, it is determined whether the knocking has occurred using the second learned neural network created for the same operating region, and using the corresponding threshold $M_{ij}$ illustrated in FIG. 48C.

In this embodiment, the operating region of the engine is divided into a plurality of operating regions, and the normal signal generation model 60 and the first learned neural network are stored in the storage unit for each of the divided operating regions. When the second neural network is used, the second neural network is also stored in the storage unit. In this embodiment, the retarding control of the ignition timing is executed in the next cycle for each of the divided operating regions, based on the difference between the predicted value of the estimated value for the knocking intensity representative value calculated using the second learned neural network and the estimated value for the knocking intensity representative value calculated using the first learned neural network.

Figure 49:
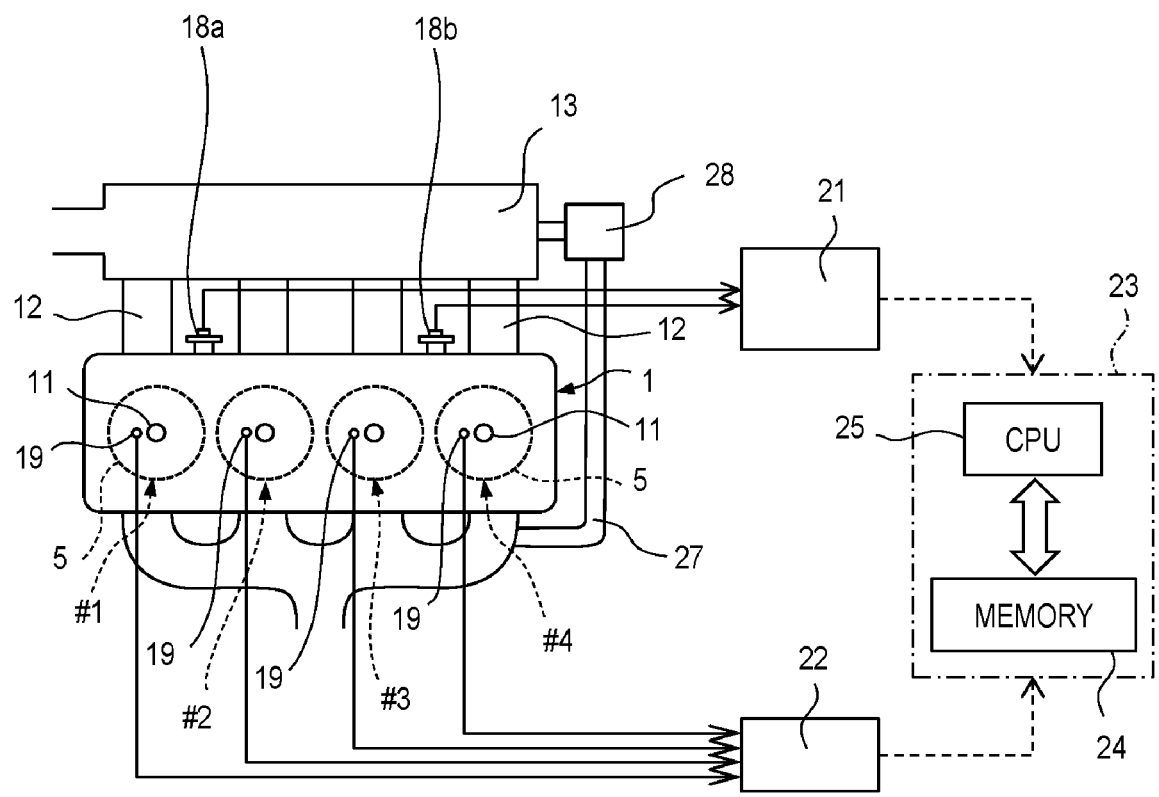
FIG. 49 is an overall view of an internal combustion engine.
Figure 50:
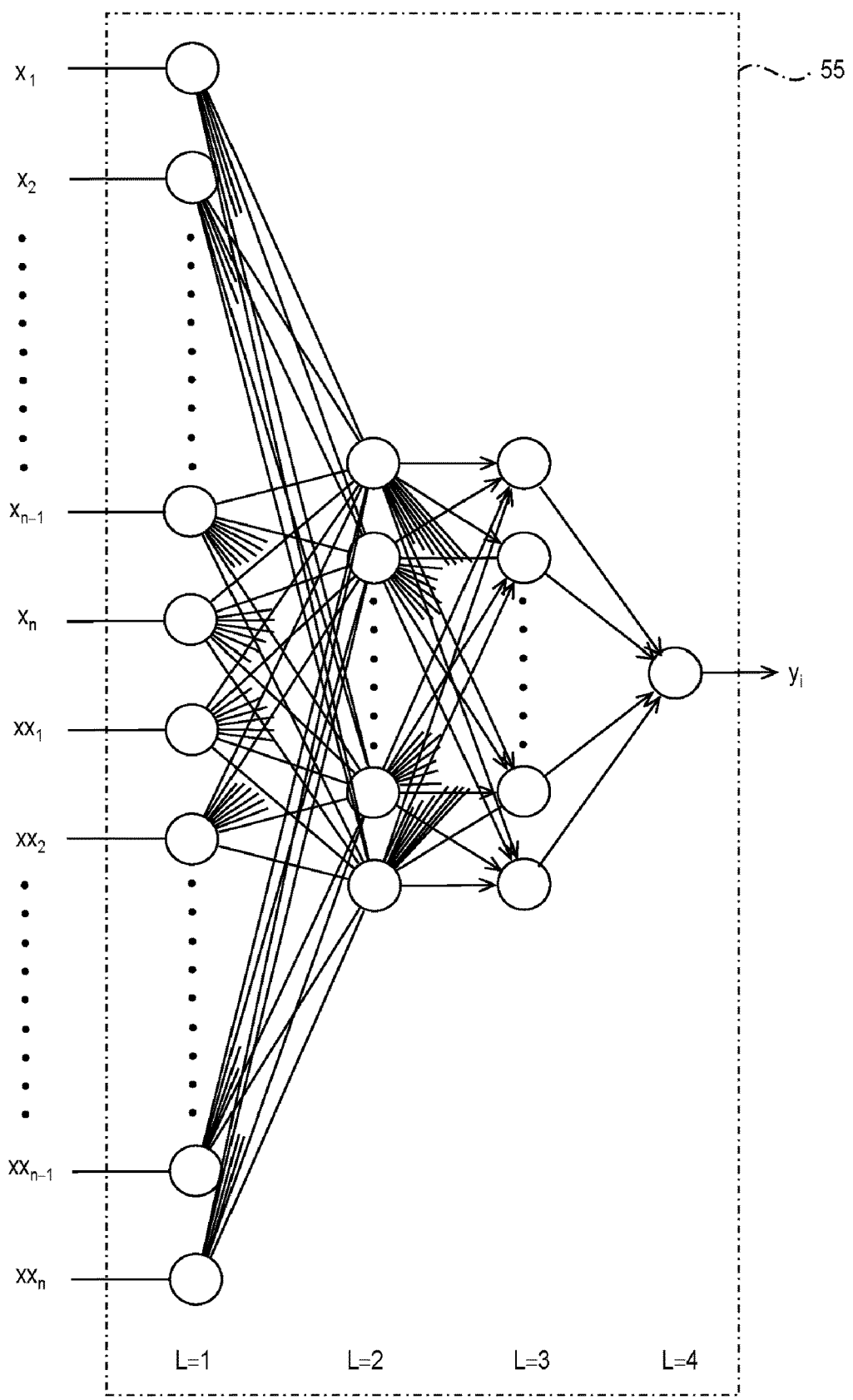
FIG. 50 is a diagram illustrating a first neural network used in still another embodiment according to the present disclosure.

FIGS. 49 to 51 illustrate still another embodiment. In this embodiment, as illustrated in FIG. 49, a knocking sensor 18a and a knocking sensor 18b are attached to the engine body 1, and the knocking sensors 18a, 18b are connected to the detector 21 capable of detecting the waveform of the output value of the knocking sensor 18a and the waveform of the output value of the knocking sensor 18b, such as an oscilloscope. In FIG. 49, when cylinders are referred to as a first cylinder #1, a second cylinder #2, a third cylinder #3, and a fourth cylinder #4 in order from the left, the knocking sensor 18a is arranged at the same distance from the first cylinder #1 and the second cylinder #2, and the knocking sensor 18b is arranged at the same distance from the third cylinder #3 and the fourth cylinder #4. The other configuration illustrated in FIG. 49 is the same as that illustrated in FIG. 5, and thus, the descriptions of the other configuration illustrated in FIG. 49 will be omitted. In this embodiment, the output values of the knocking sensors 18a, 18b are input to the common normal signal generation model 60.

FIG. 50 illustrates a first neural network 55 used in this embodiment. Referring to FIG. 50, in the first neural network 55, L=1 indicates an input layer, L=2 and L=3 indicate hidden layers, and L=4 indicates an output layer as in the neural networks illustrated in FIGS. 3 and 8. In this embodiment, as can be seen from FIG. 50, the input layer (L=1) has 2n nodes. On the other hand, although FIG. 50 illustrates a hidden layer (L=2) and a hidden layer (L=3), the number of these hidden layers can be one or any number. The number of nodes in the hidden layers can be any number. The output layer (L=4) has one node, and the output value from the node in the output layer is represented by y.

In FIG. 50, $x_1, x_2, \ldots, x_{n-1}$, and $x_n$ indicate input values output from the knocking sensor 18a after being filtered and input to the first neural network 55 via the normal signal generation model 60, and $xx_1, xx_2, \ldots, xx_{n-1}$, and $xx_n$ indicate input values output from the knocking sensor 18b after being filtered and input to the first neural network 55 via the normal signal generation model 60. In this embodiment, the values illustrated in FIG. 6B or the values illustrated in FIG. 6C are used as the input values $x_1, x_2, \ldots, xx_{n-1}, xx_n$. That is, as illustrated in FIG. 6B, the filtered output values of the knocking sensors 18a, 18b themselves are set as the input values $x_1, x_2, \ldots, xx_{n-1}, xx_n$, or, as illustrated in FIG. 6C, the integral values (even a negative integral value is considered as a positive value) of the filtered output values of the knocking sensors 18a, 18b, for example, the integral values of the output values of the knocking sensors 18a, 18b within a predetermined crank angle are set as the input values $x_1, x_2, \ldots, xx_{n-1}, xx_n$.

On the other hand, as the output value y illustrated in FIG. 50, the knocking intensity representative value obtained from the output value of the pressure sensor 19 is employed as in the case illustrated in FIG. 8. In this case, similar to the case illustrated in FIG. 8, the peak value of the filtered output value of the pressure sensor 19 represented by a circle in FIG. 7B is used as the output value y, or the integral value (even a negative integral value is considered as a positive value) of the filtered output value of the pressure sensor 19 illustrated in FIG. 7C is used as the output value y. Also, in this embodiment, the actually measured value of the knocking intensity representative value obtained from the output value of the pressure sensor 19 is set as the training data $y_t$.

FIG. 51 illustrates a training dataset created using the input values $x_1, x_2, \ldots, xx_{n-1}, xx_n$, and the actually measured value of the knocking intensity representative value obtained from the output value of the pressure sensor 19, i.e. the training data $y_t$. As illustrated in FIG. 51, m pieces of data representing the correlation between input values $x_1, x_2, \ldots, xx_{n-1}, xx_n$ and the training data $y_t$ are included in this training dataset. A method of creating the training dataset is the same as that of creating the training dataset illustrated in FIG. 9 described above. That is, when creating the training dataset, in FIG. 49, the engine is operated in both the operating state in which the knocking does not occur and the operating state in which the knocking occurs for various combinations of the engine load and the engine speed, at which the training dataset as illustrated in FIG. 51 is created based on the data obtained from the detectors 21, 22.

When the training dataset is created, the weight the first neural network 55 illustrated in FIG. 50 is learned using the electronic data of the created training dataset. A method of learning the weight of the first neural network is the same as the method of learning the weight of the first neural network described above with reference to FIG. 5. That is, when the weight of the first neural network 55 illustrated in FIG. 50 is learned, the number of nodes of the first neural network 55 and the electronic data of the created training dataset are stored in the memory 24 of the learning device 23 illustrated in FIG. 49. In the CPU 25, the weight of the first neural network 55 is learned using the learning processing routine illustrated in FIG. 10.

In this embodiment, a plurality of knocking sensors 18a, 18b that detects vibration of the engine body 1 is provided. When receiving the output values of the knocking sensors 18a, 18b through the normal signal generation model 60, the first learned neural network 55 outputs the knocking intensity representative value. As described above, when the weight of the first neural network 55 is learned using the knocking sensors 18a, 18b and using the output values of both the knocking sensors 18a, 18b, the knocking intensity representative value can be estimated with higher accuracy since the amount of information that can be acquired is larger than when only one knocking sensor is used.

What is claimed is:

1. An ignition timing control device for an internal combustion engine, the ignition timing control device comprising:
    a storage unit that stores:
        a pre-learned normal signal generation model configured to output, upon receiving an output value of a knocking sensor that detects vibration of a body of the internal combustion engine, a noise-removed output value from which an unlearned noise component value included in the output value of the knocking sensor has been removed; and
        a first learned neural network pre-learned to output, upon receiving one of the output value of the knocking sensor and the noise-removed output value of the normal signal generation model, an estimated value for a value representing knocking intensity, originally obtained from an output value of a pressure sensor that detects a combustion pressure of an air-fuel mixture generated by ignition; and
    a processor configured to:
        acquire the estimated value for the value representing knocking intensity output from the first learned neural network by inputting the output value of the knocking sensor, during operation of the internal combustion engine, to the normal signal generation model read out from the storage unit and inputting the noise-removed output value output from the normal signal generation model to the first learned neural network read out from the storage unit; and
        execute retarding control of an ignition timing of the internal combustion engine based on the acquired estimated value for the value representing knocking intensity.

2. The ignition timing control device according to claim 1, wherein the normal signal generation model includes an auto-encoder.

3. The ignition timing control device according to claim 1, wherein:
    the storage unit stores a second learned neural network pre-learned to estimate a predicted value or a predicted decrease amount of the estimated value for the value representing knocking intensity when the ignition timing of the internal combustion engine is retarded;
    the processor is configured to, in a case where the estimated value for the value representing knocking intensity calculated using the first learned neural network read out from the storage unit exceeds a predetermined threshold during the operation of the internal combustion engine, execute retarding control of the ignition timing of the internal combustion engine in a next cycle of the internal combustion engine;
    the processor is configured to, in the next cycle of the internal combustion engine, execute control of the ignition timing in a further next cycle of the internal combustion engine based on a difference between the predicted value of the estimated value for the value representing knocking intensity calculated using the second learned neural network read out from the storage unit and the estimated value for the value representing knocking intensity calculated using the first learned neural network read out from the storage unit; and
    the processor is configured to retard, in a case where the difference is smaller than a predetermined set value, when the estimated value for the value representing knocking intensity is larger than the predetermined threshold, the ignition timing in the further next cycle, and not to retard, in case where the difference is larger than the predetermined set value, even when the estimated value for the value representing knocking intensity is larger than the predetermined threshold, the ignition timing in the further next cycle.

4. The ignition timing control device according to claim 3, wherein the second learned neural network includes a neural network pre-learned to output the predicted value of the estimated value for the value representing knocking intensity when the ignition timing is retarded, based on the predicted decrease amount of the estimated value for the value representing knocking intensity when the ignition timing is retarded, which is obtained when an operating state of the internal combustion engine, a retarded amount of the ignition timing of the internal combustion engine, and the estimated value for the value representing knocking intensity in a previous cycle of the internal combustion engine are input to the neural network.

5. The ignition timing control device according to claim 4, wherein the operating state of the internal combustion engine includes engine speed, engine load, and exhaust gas recirculation rate.

6. The ignition timing control device according to claim 3, wherein the second learned neural network includes a recurrent neural network pre-learned to output the predicted value of the estimated value for the value representing knocking intensity in a current cycle when the retarded amount or an advanced amount of the ignition timing and the estimated value for the value representing knocking intensity in each of cycles are input, the cycles being from a cycle in which the ignition has been performed a predetermined number of times ago to the current cycle.

7. The ignition timing control device according to claim 3, wherein:
    the processor is configured to, after the ignition timing has been retarded, start to advance the ignition timing when the estimated value for the value representing knocking intensity is equal to or smaller than the predetermined threshold; and
    the processor is configured to adjust an advanced amount of the ignition timing to be smaller in a case where the difference when the ignition timing is retarded is larger than the set value, as compared with a case where the difference is equal to or smaller than the set value.

8. The ignition timing control device according to claim 1, wherein the value representing knocking intensity is a peak value of the output value of the pressure sensor.

9. The ignition timing control device according to claim 1, wherein the value representing knocking intensity is an integral value of the output value of the pressure sensor.

10. The ignition timing control device according to claim 1, wherein the output value of the knocking sensor is an output value within a preset period.

11. The ignition timing control device according to claim 1, wherein the output value of the knocking sensor is an integral value of the output values of the knocking sensor within equally divided sections of a preset period.

12. The ignition timing control device according to claim 10, wherein the preset period is a predetermined crank angle range.

13. The ignition timing control device according to claim 10, wherein the preset period is a fixed time.

14. The ignition timing control device according to claim 1, wherein the storage unit stores the normal signal generation model and first learned neural network for each of a plurality of operating regions into which an operating region of the internal combustion engine is divided.

15. The ignition timing control device according to claim 1, wherein:
the internal combustion engine includes a plurality of knocking sensors that detects the vibration of the body of the internal combustion engine; and
the first learned neural network is a neural network pre-learned to output the estimated value for the value representing knocking intensity when receiving the output values of the knocking sensors through the normal signal generation model.

* * * * *